US012701615B2

(12) United States Patent　　　　(10) Patent No.: US 12,701,615 B2
Nayak et al.　　　　　　　　　　　(45) Date of Patent: Aug. 4, 2026

(54) PROCEDURES FOR PREEMPTION IN NEXT GENERATION WI-FI NETWORKS

(71) Applicant: Samsung Electronics Co., Ltd., Suwon-si (KR)

(72) Inventors: Peshal Nayak, Plano, TX (US); Boon Loong Ng, Plano, TX (US); Rubayet Shafin, Allen, TX (US); Vishnu Vardhan Ratnam, Plano, TX (US); Yue Qi, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 18/623,948

(22) Filed: Apr. 1, 2024

(65) Prior Publication Data

US 2024/0340956 A1　　　Oct. 10, 2024

Related U.S. Application Data

(60) Provisional application No. 63/458,318, filed on Apr. 10, 2023, provisional application No. 63/462,410, (Continued)

(51) Int. Cl.
*H04W 74/0816*　　　(2024.01)
*H04W 74/04*　　　　(2009.01)
*H04W 74/08*　　　　(2024.01)

(52) U.S. Cl.
CPC ....... *H04W 74/0816* (2013.01); *H04W 74/04* (2013.01); *H04W 74/0866* (2013.01)

(58) Field of Classification Search
CPC ............. H04W 74/0816; H04W 74/04; H04W 74/0888
See application file for complete search history.

(56) References Cited

U.S. PATENT DOCUMENTS

| 2022/0078844 A1 | 3/2022 | Cherian |
| 2022/0124746 A1 | 4/2022 | Azizi et al. |

(Continued)

FOREIGN PATENT DOCUMENTS

| CN | 114698068 A | 7/2022 |
| CN | 114765897 A | 7/2022 |
| EP | 4255037 A1 | 10/2023 |

OTHER PUBLICATIONS

International Search Report and Written Opinion issued Jul. 15, 2024 regarding International Application No. PCT/KR2024/004638, 8 pages.

(Continued)

*Primary Examiner* — Gbemileke J Onamuti

(57) ABSTRACT

Methods and apparatuses for facilitating channel access for transmission opportunity (TXOP) preemption procedures in a wireless local area network (WLAN). A station (STA) comprises a processor and a transceiver operably coupled to the processor. The processor is configured to determine that low latency traffic for uplink to an access point (AP) on a channel has arrived, and generate a channel access message that causes the AP to suspend downlink transmissions and/or causes other STAs to avoid accessing the channel. The transceiver is configured to transmit the channel access message during or at the end of an inter frame space (IFS) after a transmission from another device, and transmit the low latency traffic to the AP.

20 Claims, 36 Drawing Sheets

Related U.S. Application Data filed on Apr. 27, 2023, provisional application No. 63/462,435, filed on Apr. 27, 2023, provisional application No. 63/550,864, filed on Feb. 7, 2024, provisional application No. 63/550,871, filed on Feb. 7, 2024.

(56)                    References Cited

U.S. PATENT DOCUMENTS

| | | |
|---|---|---|
| 2022/0174732 A1 | 6/2022 | Xia et al. |
| 2022/0303780 A1 | 9/2022 | Koruthu et al. |
| 2023/0021531 A1 | 1/2023 | Khosravirad et al. |
| 2023/0353323 A1 | 11/2023 | Yang et al. |

OTHER PUBLICATIONS

Fang et al., "Preemption for Low Latency Application", IEEE 802.11-23/0092r0, Mar. 2023, 8 pages.
IEEE P802.11be—D3.0 "Part 11: Wireless LAN Medium Access Control (MAC) and Physical Layer (PHY) Specifications—Amendment 8: Enhancements for extremely high throughput (EHT)" Jan. 2023, 999 pages.
IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.
IEEE P802.11be—D2.0 "Part 11: Wireless LAN Medium Access Control (MAC) and Physical Layer (PHY) Specifications—Amendment 8: Enhancements for extremely high throughput (EHT)" May 2022, 873 pages.
Supplementary European Search Report dated Mar. 26, 2026, in connection with European Application No. 24788971.0, 12 pages.

1700

1800

2000

2100

2700

2800

2900

3000

4000

4100

PROCEDURES FOR PREEMPTION IN NEXT GENERATION WI-FI NETWORKS

CROSS-REFERENCE TO RELATED APPLICATION AND CLAIM OF PRIORITY

This application claims priority under 35 U.S.C. § 119(e) to U.S. Provisional Patent Application No. 63/458,318 filed on Apr. 10, 2023; U.S. Provisional Patent Application No. 63/462,410 filed on Apr. 27, 2023; U.S. Provisional Patent Application No. 63/462,435 filed on Apr. 27, 2023; U.S. Provisional Patent Application No. 63/550,864 filed on Feb. 7, 2024; and U.S. Provisional Patent Application No. 63/550,871 filed on Feb. 7, 2024, which are hereby incorporated by reference in their entirety.

TECHNICAL FIELD

This disclosure relates generally to low latency channel access in wireless communications systems. Embodiments of this disclosure relate to methods and apparatuses that facilitate channel access for transmission opportunity (TXOP) preemption procedures by a wireless device with low latency requirements in a wireless local area network communications system.

BACKGROUND

Wireless local area network (WLAN) technology allows devices to access the internet in the 2.4 gigahertz (GHz), 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. The component of an MLD that is responsible for transmission and reception on one link is referred to as a station (STA). With bandwidth aggregation across multiple channels/bands, MLO offers significant gain in throughput and latency performance compared to single link operation in the previous generation (802.11ax).

The ultra-high reliability study group (UHR SG) which is the study group for next generation WI-FI standards design (IEEE 802.11bn) has set a number of objectives for next generation WI-FI network design. The group intends to achieve the ultra-high reliability target by reducing latencies to ultra-low values, increasing throughputs at different signal-to-noise ratio (SNR) levels, enhancing power savings, etc. One of the fundamental bottlenecks in reducing latencies is the duration of channel access procedures that a device encounters when attempting to transmit.

SUMMARY

Embodiments of the present disclosure provide methods and apparatuses that facilitate channel access for TXOP preemption procedures in a WLAN.

In one embodiment, a wireless STA device is provided, comprising a processor and a transceiver operably coupled to the processor. The processor is configured to determine that low latency traffic for uplink to an AP on a channel has arrived, and generate a channel access message that causes the AP to suspend downlink transmissions and/or causes other STAs to avoid accessing the channel. The transceiver is configured to transmit the channel access message during or at the end of an IFS after a transmission from another device, and transmit the low latency traffic to the AP.

In another embodiment, a wireless AP device is provided, comprising a processor and a transceiver operably coupled to the processor. The transceiver is configured to receive a channel access message from a STA during an IFS after a transmission to the STA by the AP or another device, wherein the channel access message is transmitted by the STA based on arrival at the STA of low latency traffic for uplink to the AP on the channel. The processor is configured to suspend downlink transmissions based on the channel access message. The transceiver is further configured to receive the low latency traffic from the STA.

In another embodiment, a method performed by a wireless STA device is provided, comprising the steps of determining that low latency traffic for uplink to an AP on a channel has arrived, generating a channel access message that causes the AP to suspend downlink transmissions and/or causes other STAs to avoid accessing the channel, transmitting the channel access message during or at the end of an IFS after a transmission from another device, and transmitting the low latency traffic to the AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents are incorporated by reference herein in their entirety:

[1] IEEE P802.11be/D3.0, 2023.

[2] IEEE Std 802.11-2020.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

5

Figure 23:
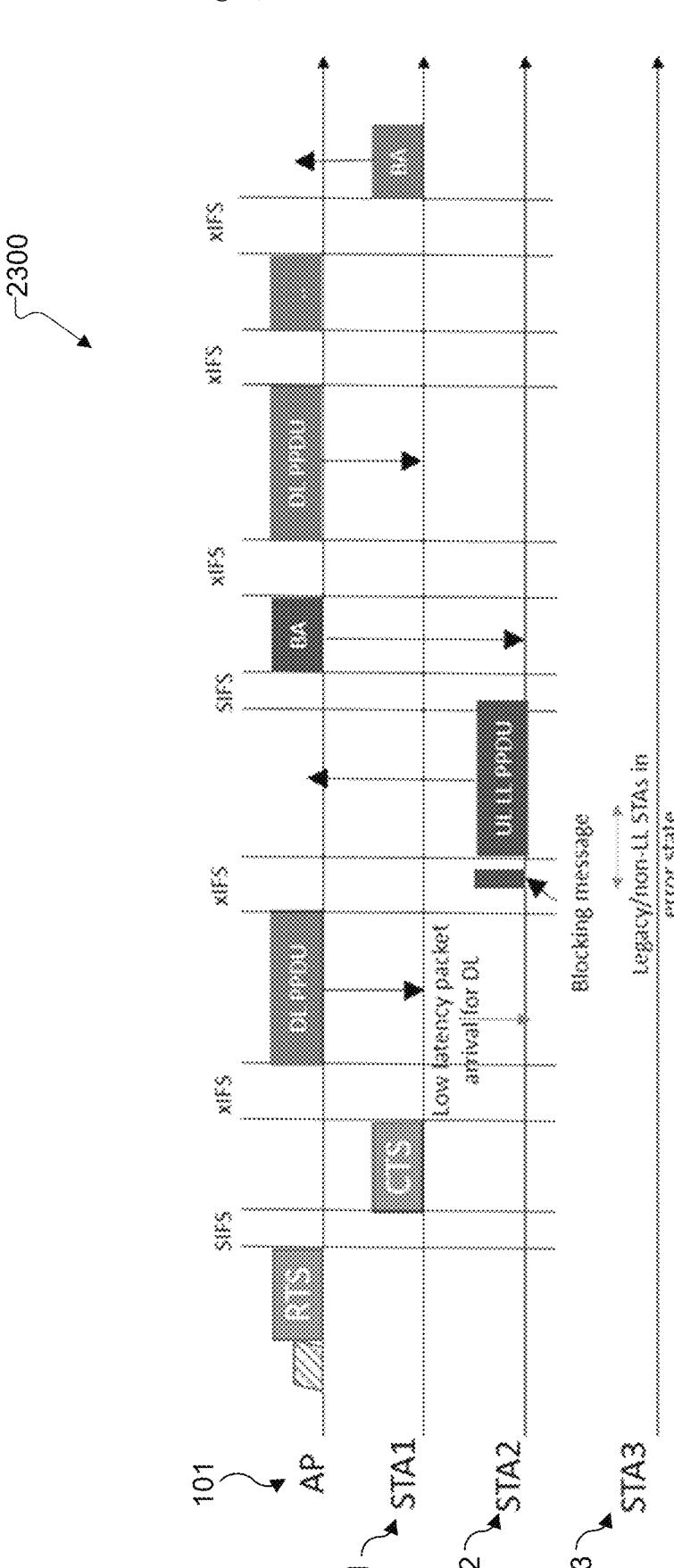
Figure 24:
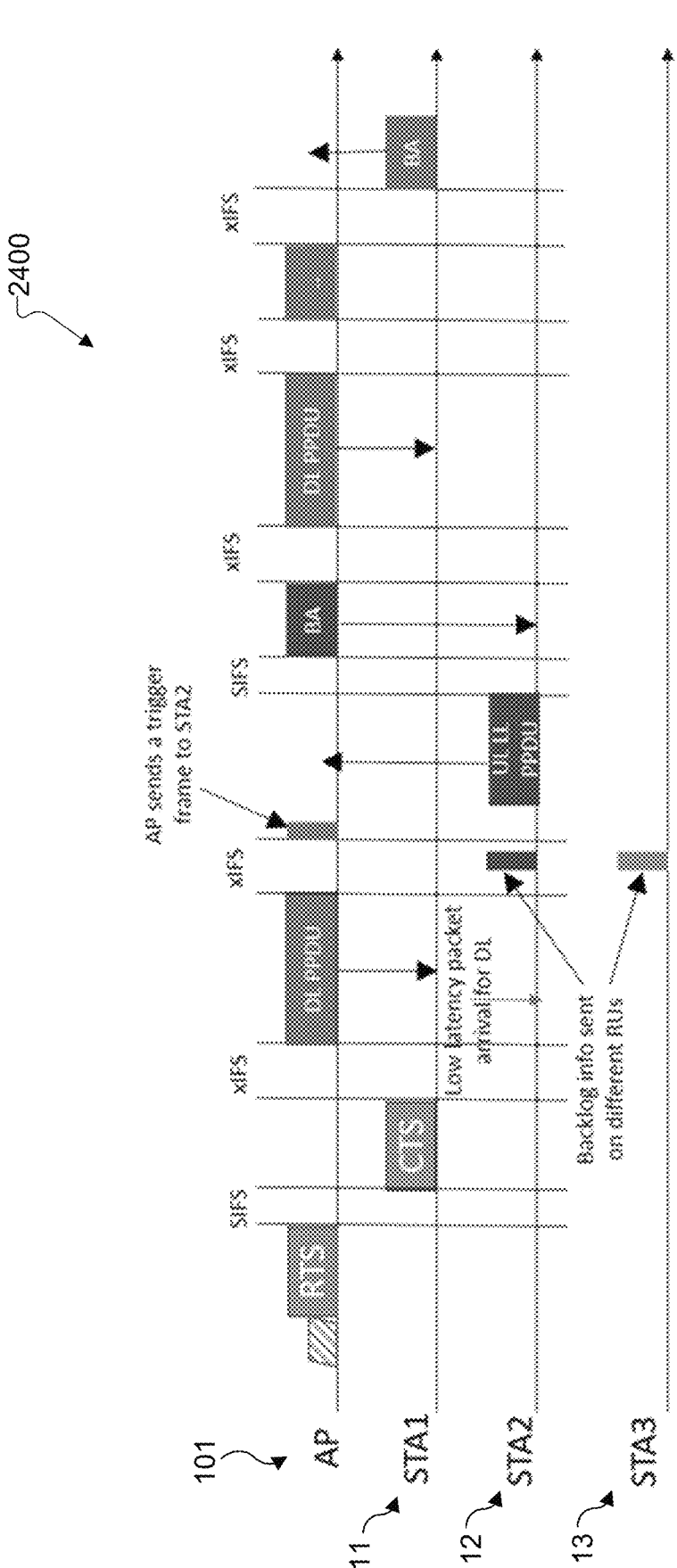
Figure 25:
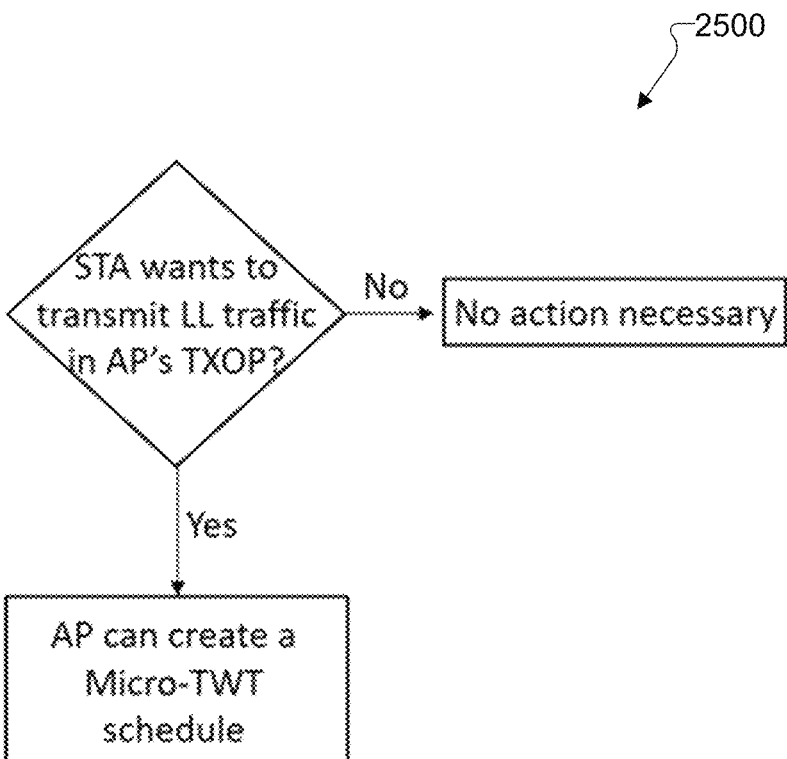
Figure 26:
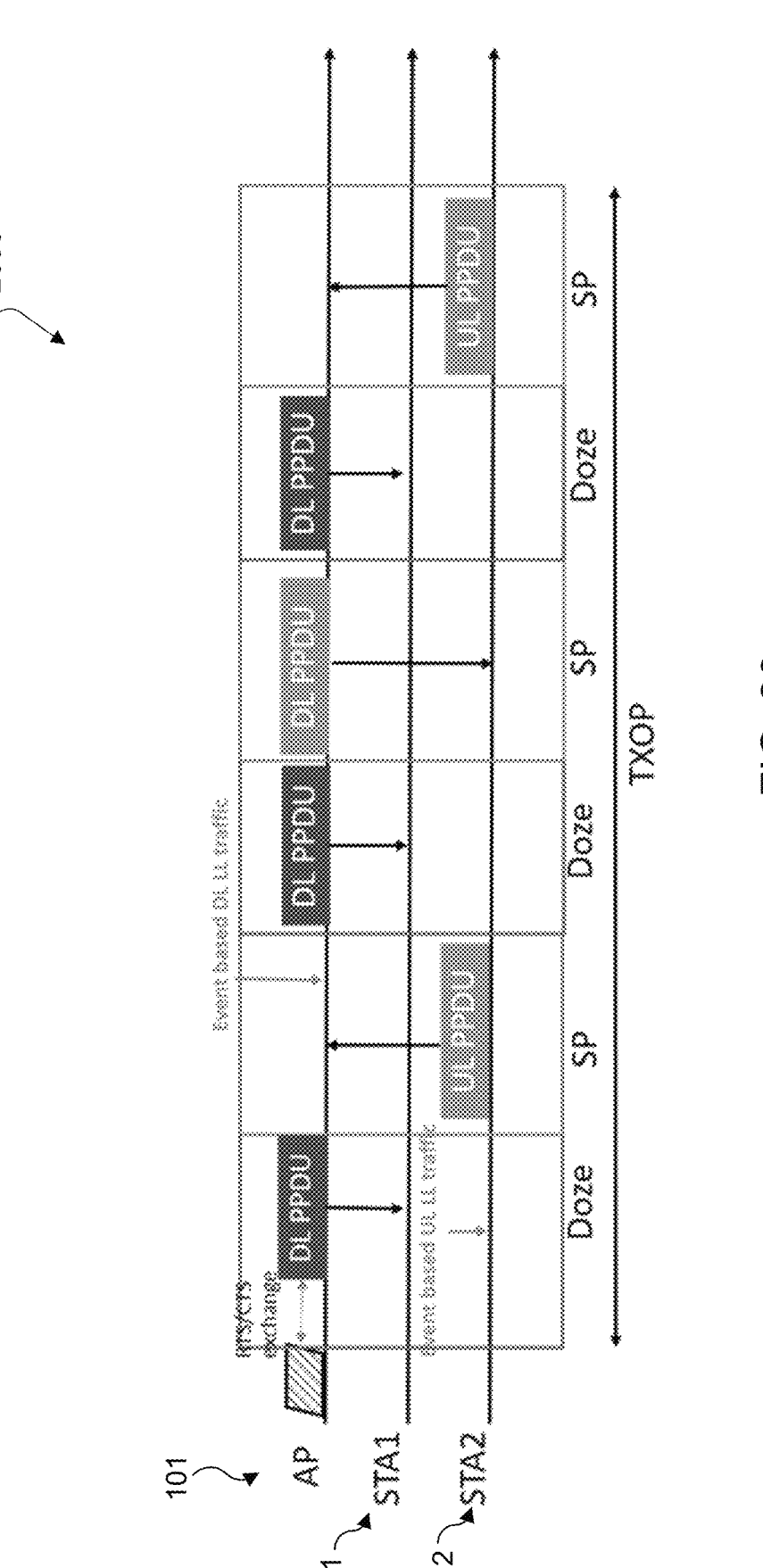
Figure 27:
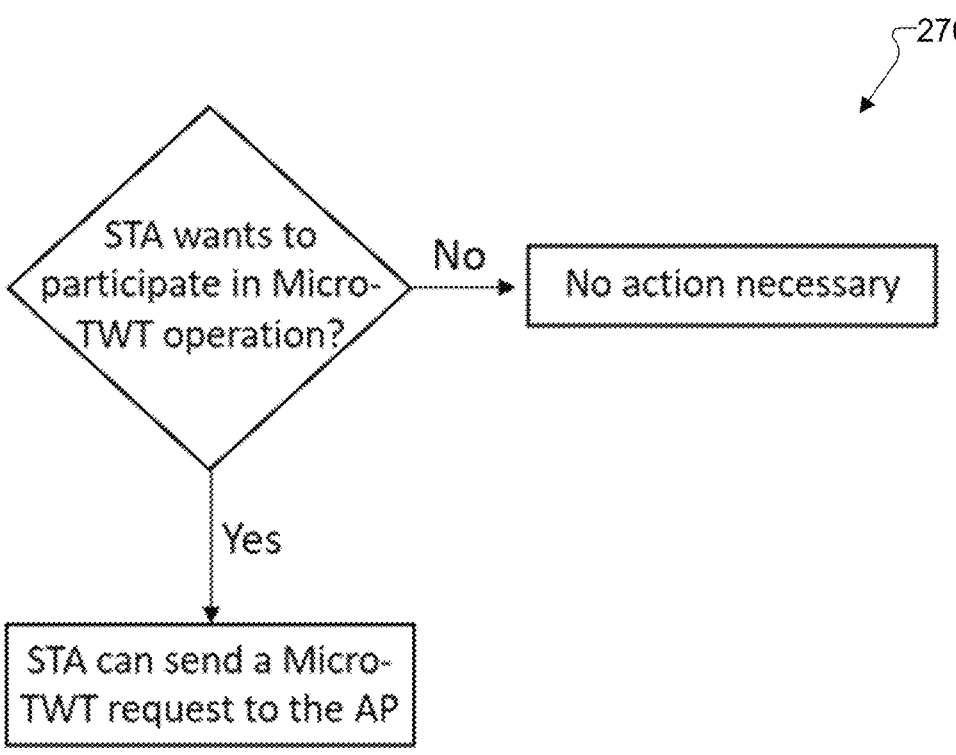
Figure 28:
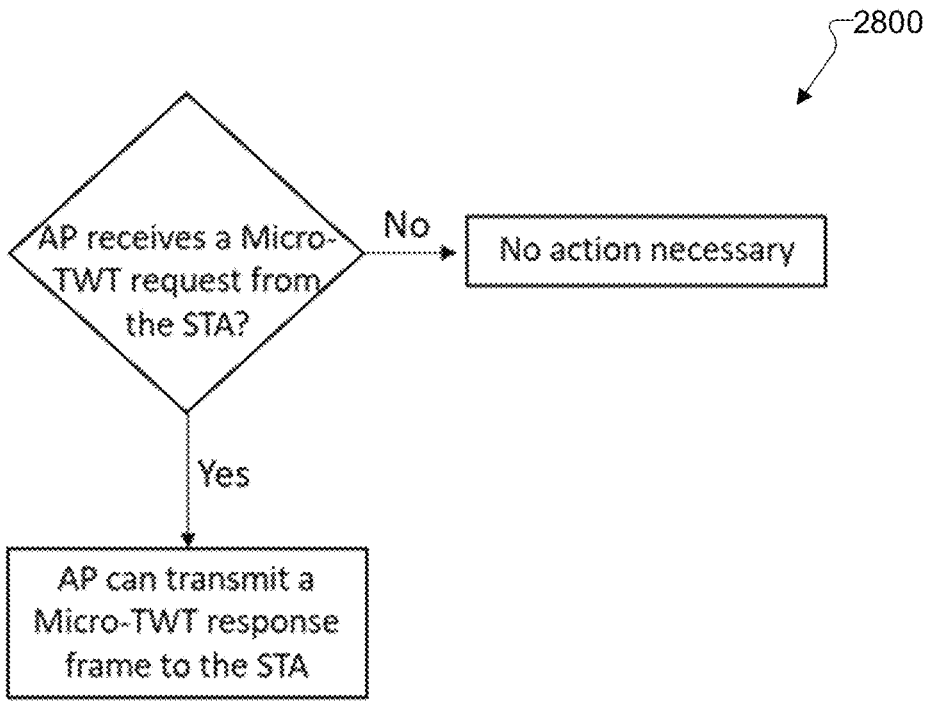
Figure 29:
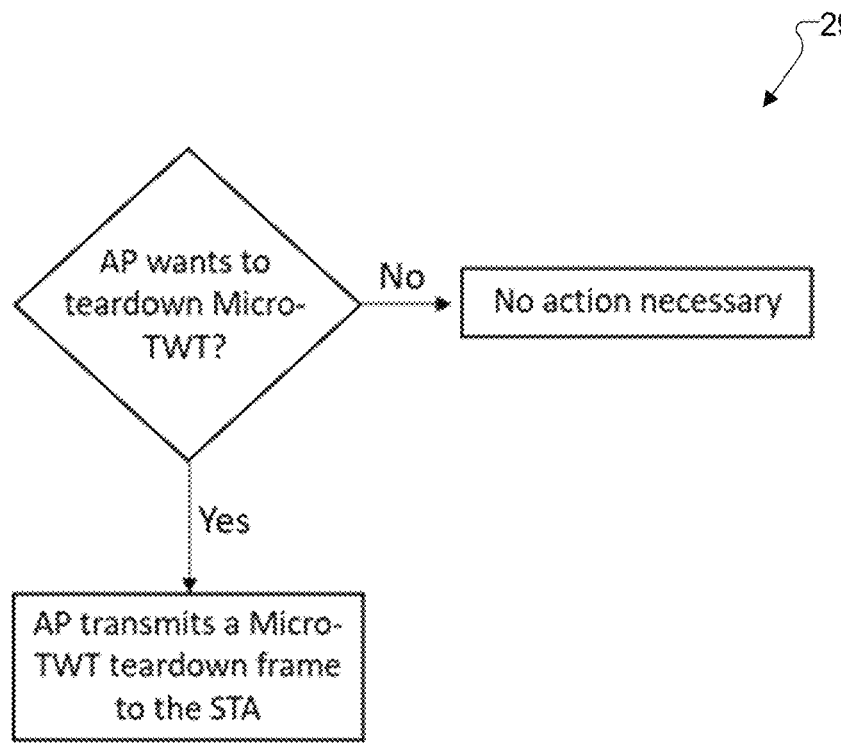
Figure 30:
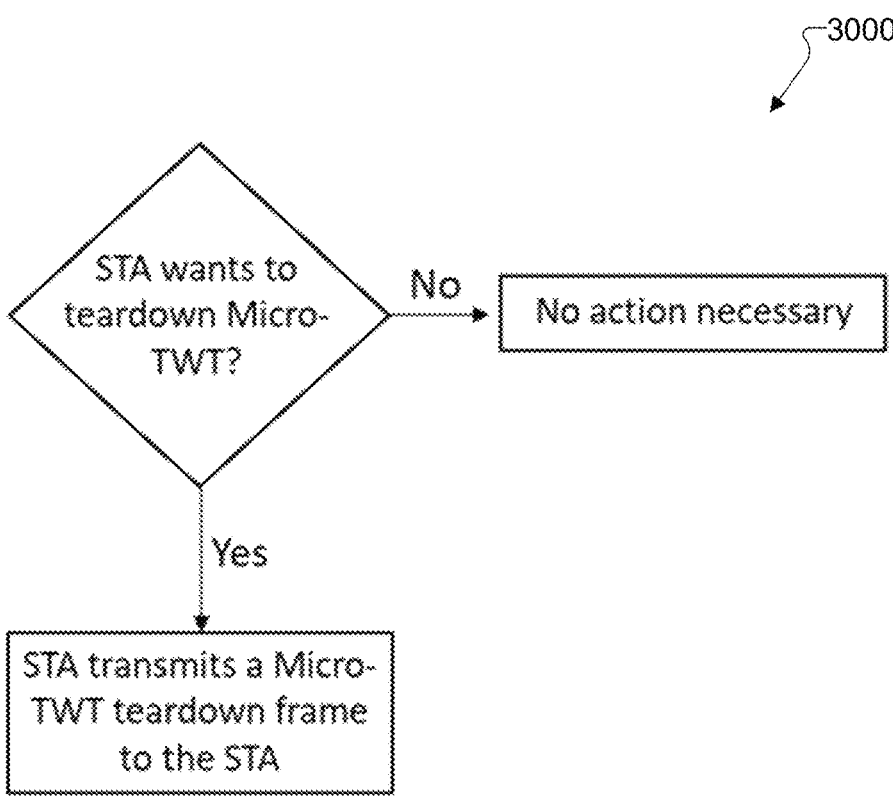
Figure 31:
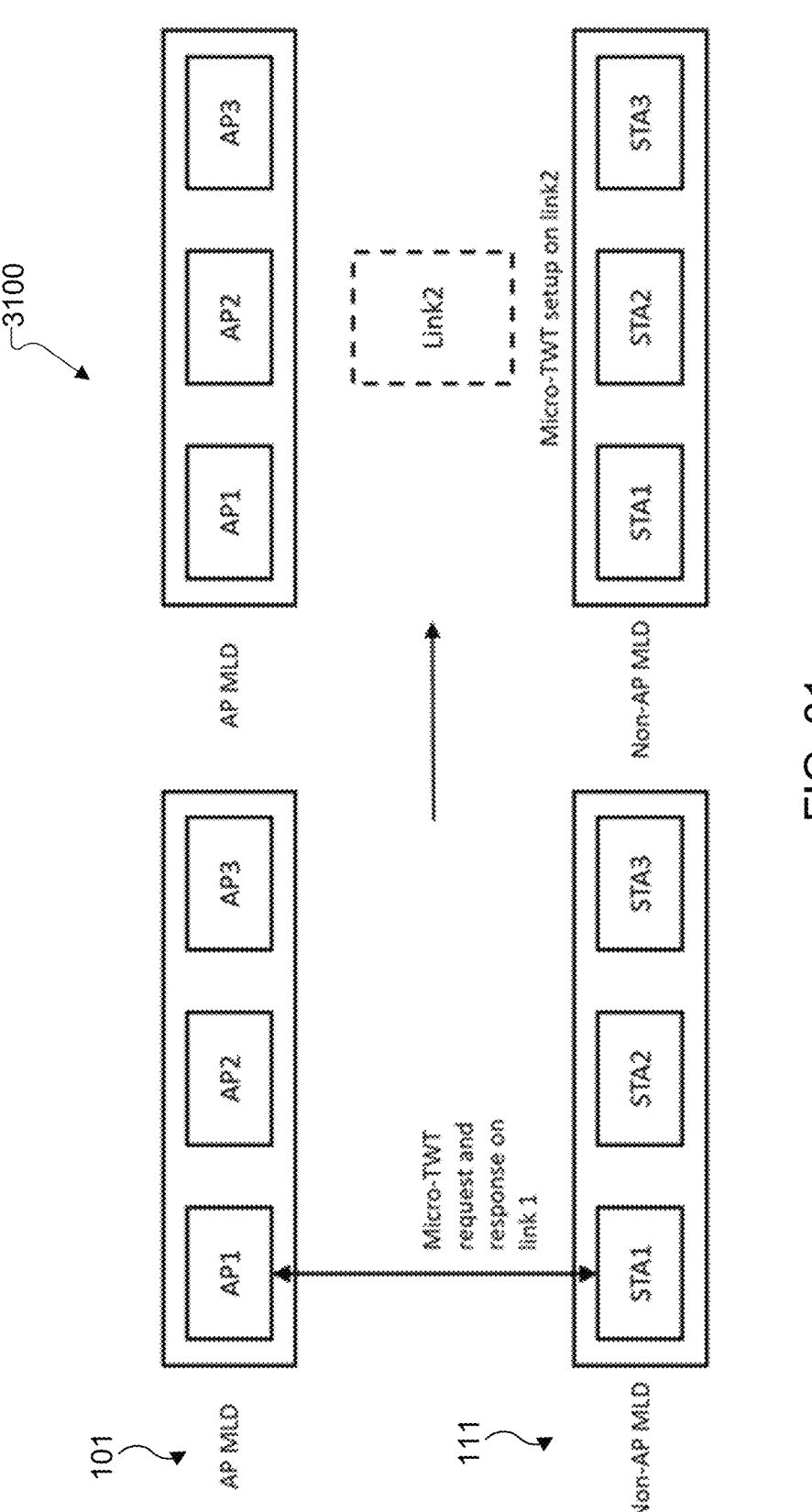
Figure 32:
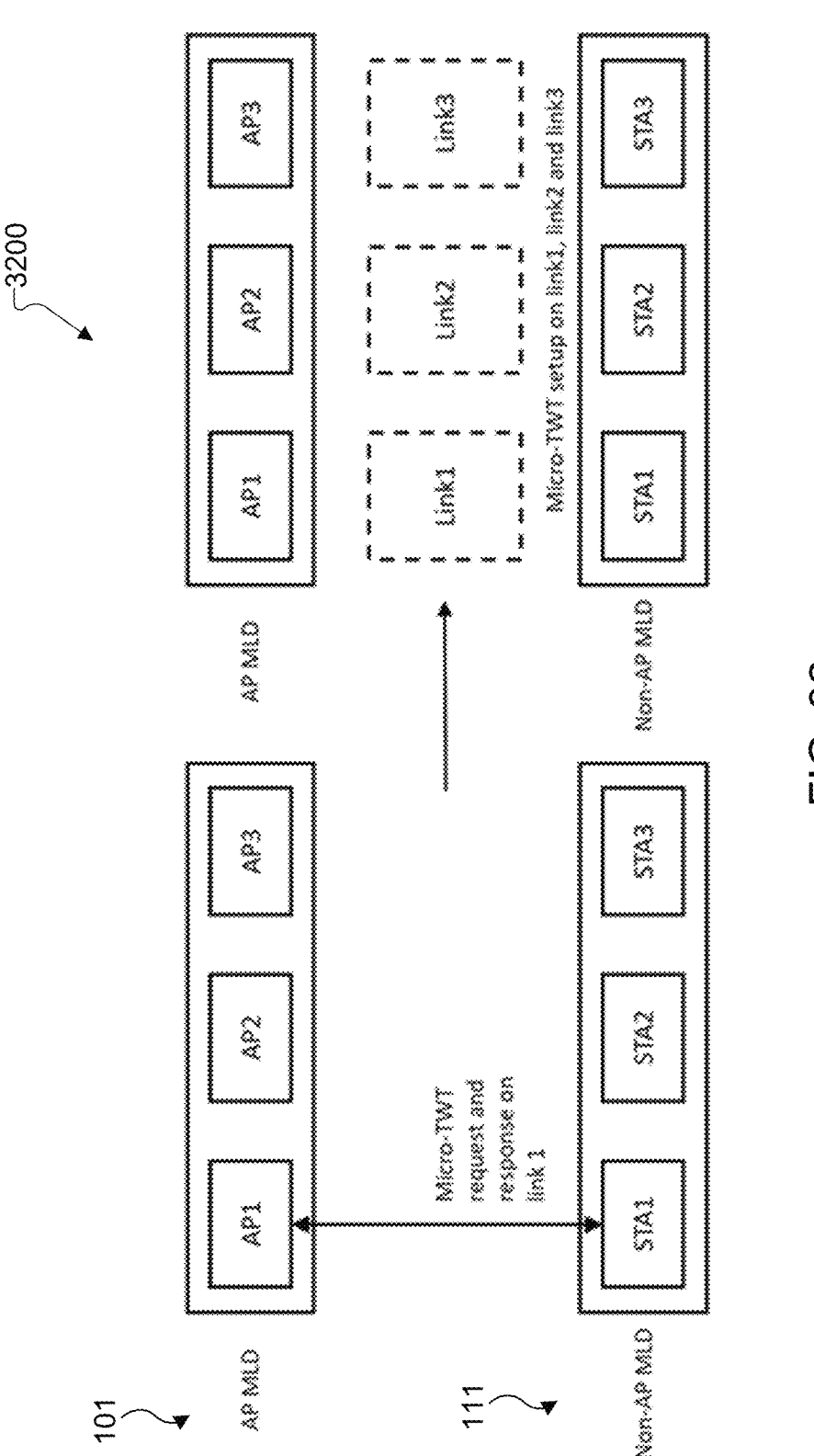
Figure 33:
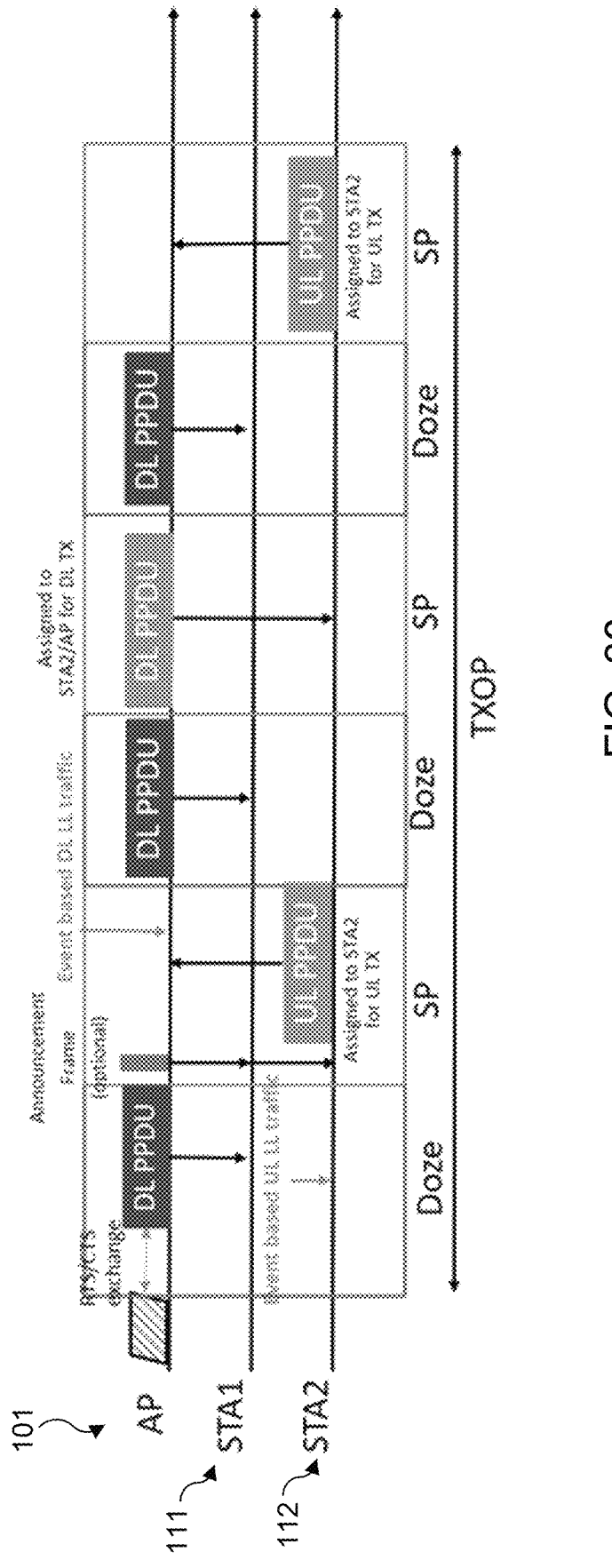
Figure 34:
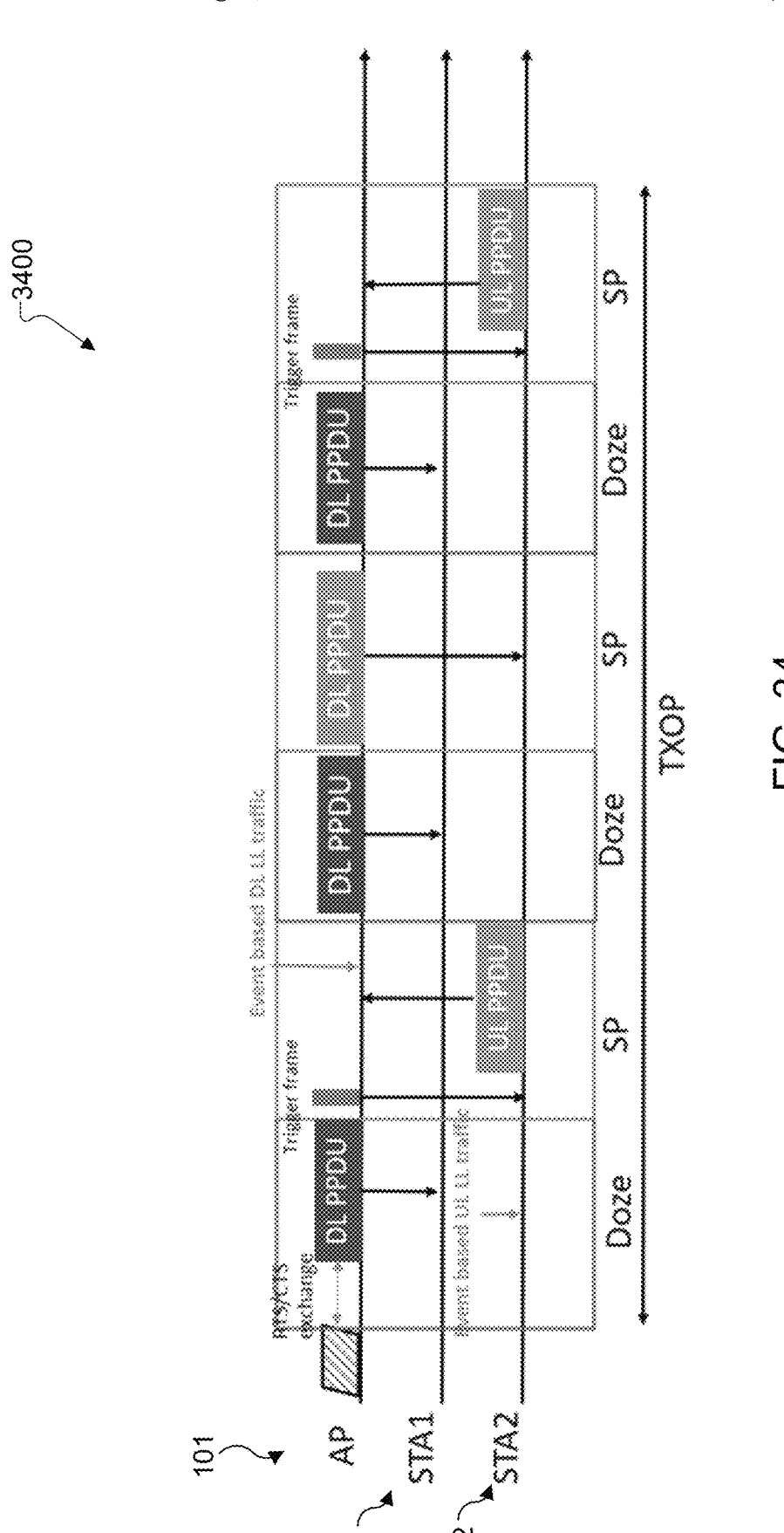
Figure 35:
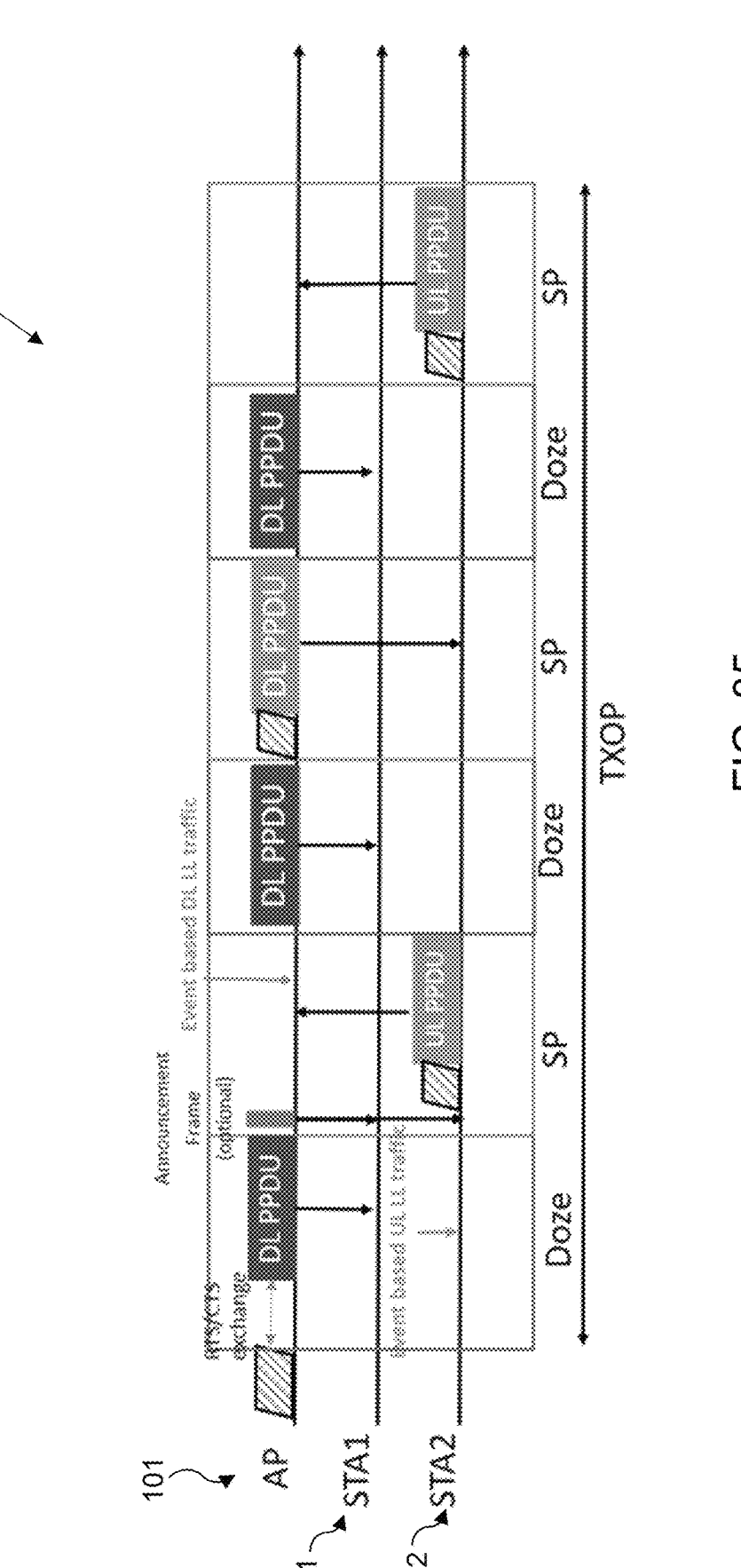
Figure 36:
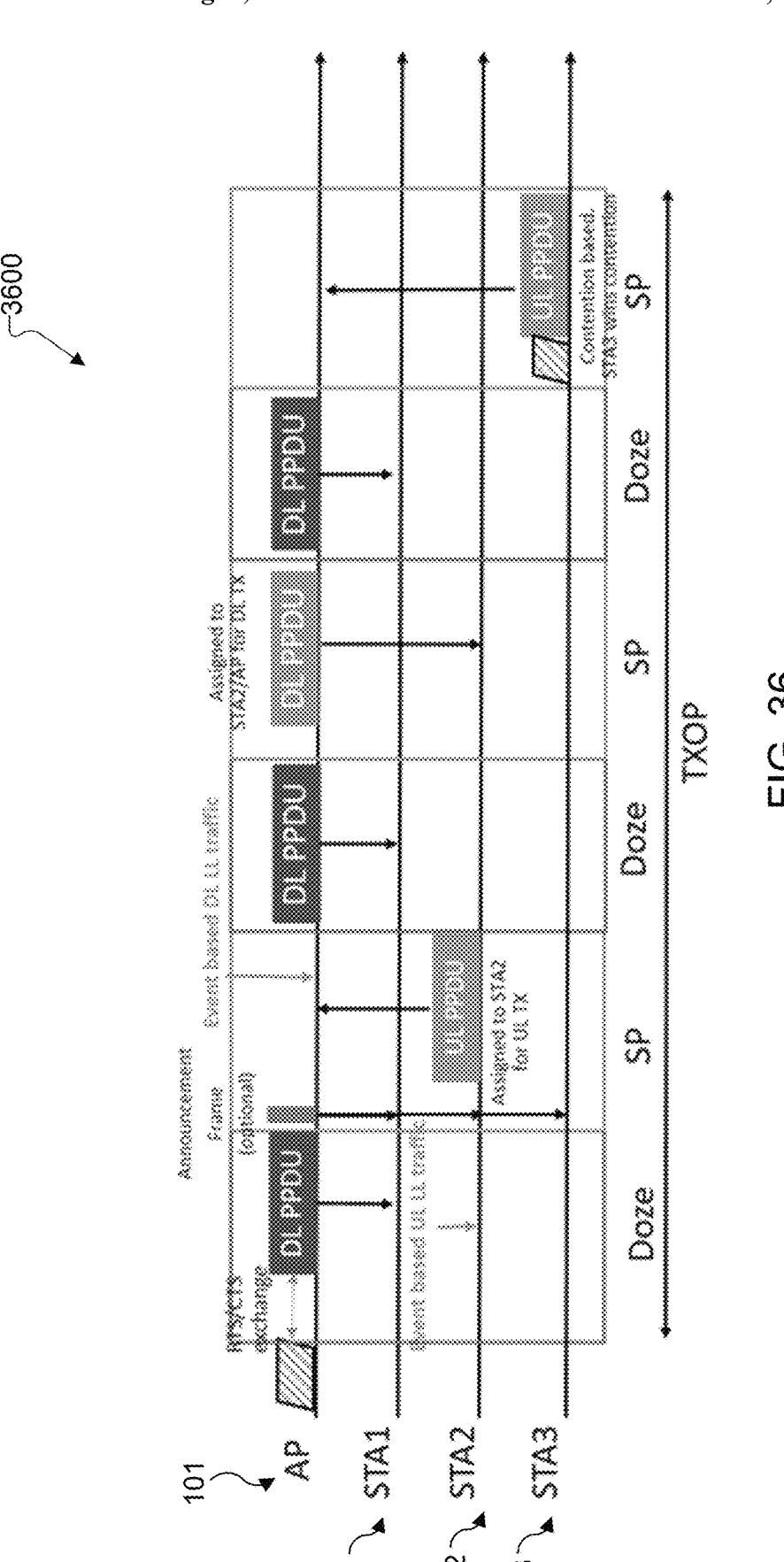
Figure 37:
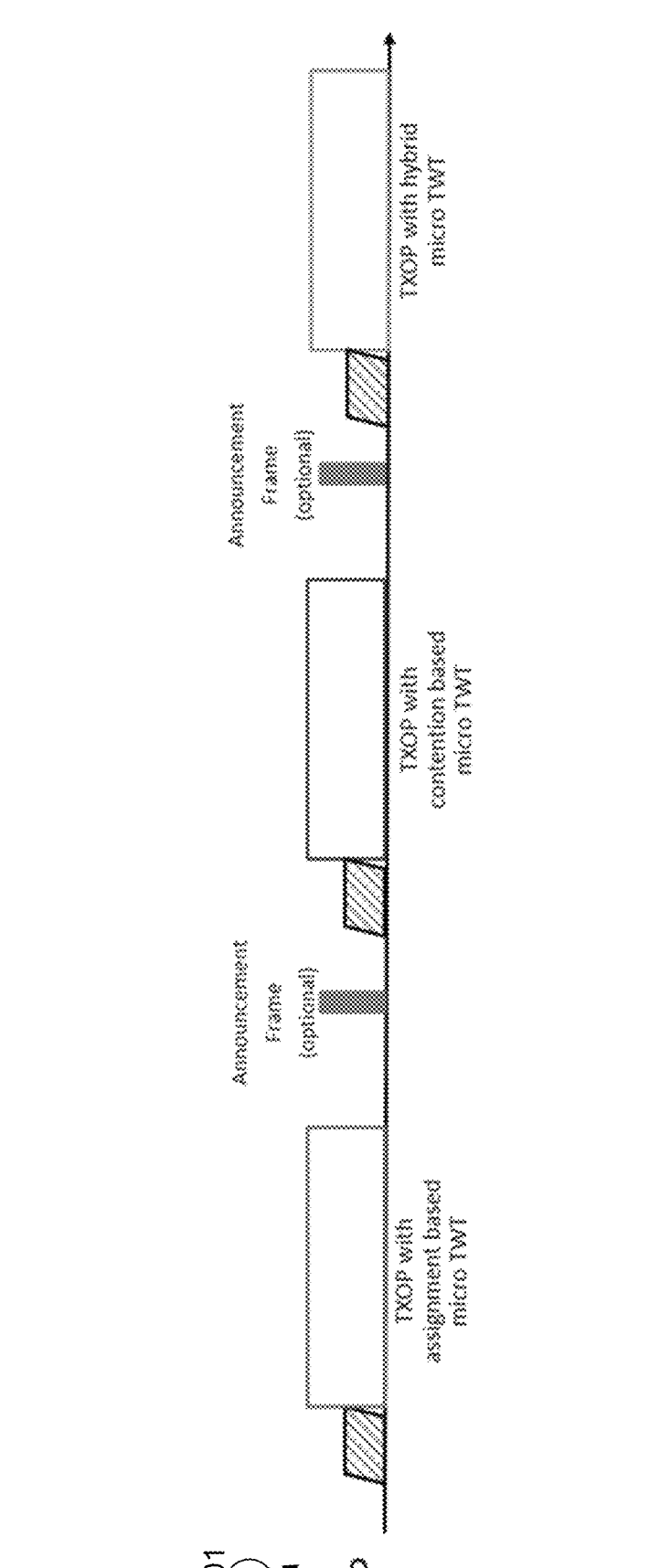
Figure 38:
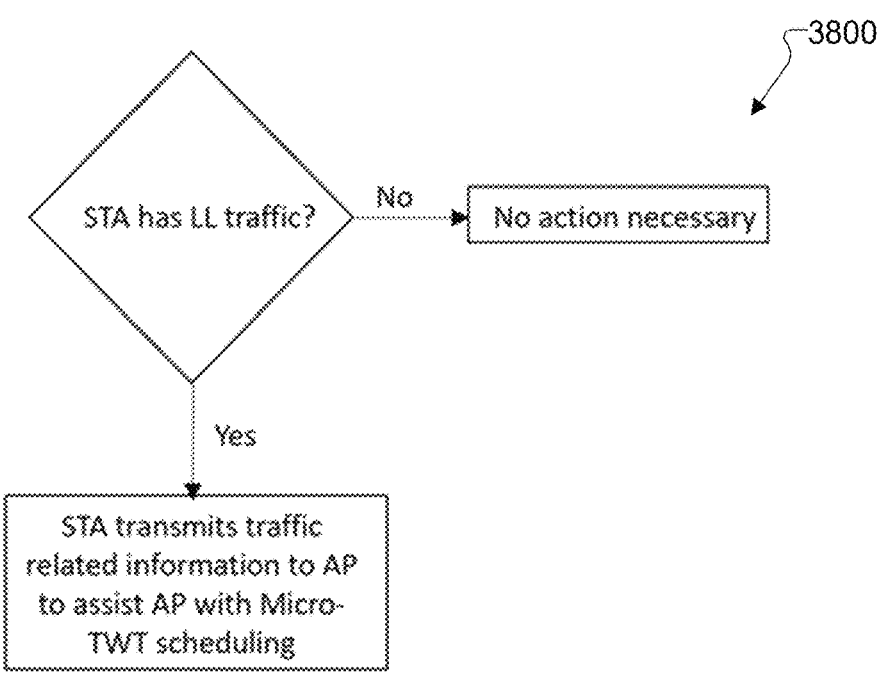
Figure 39:
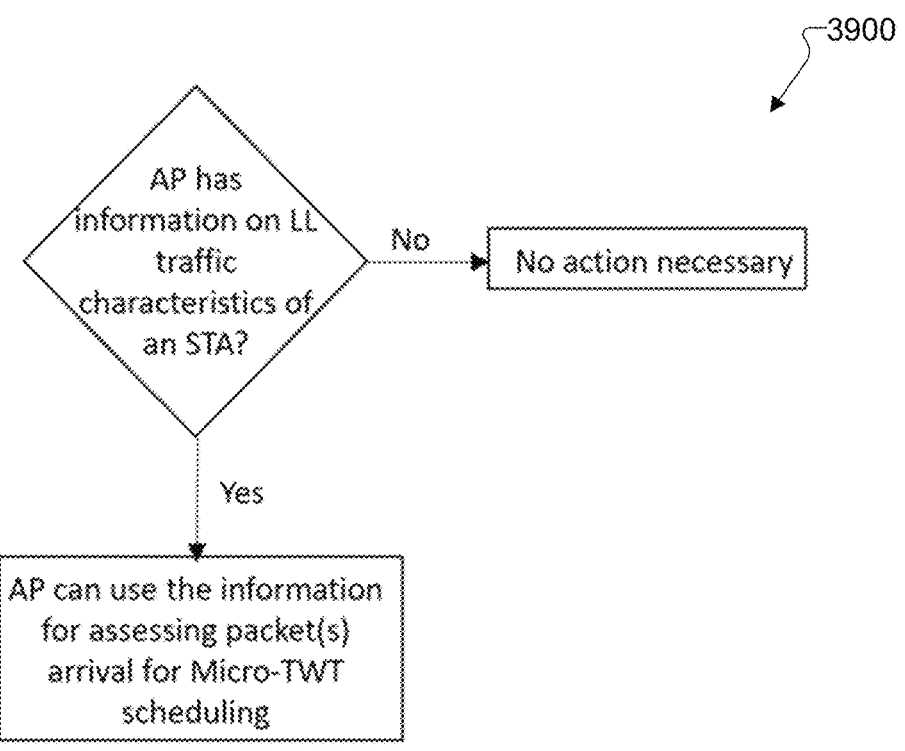
Figure 40:
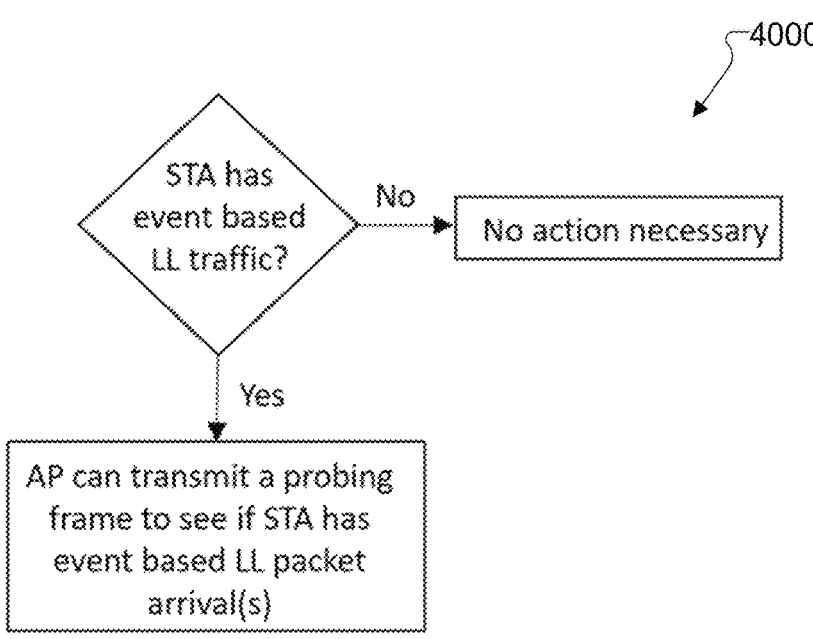
Figure 41:
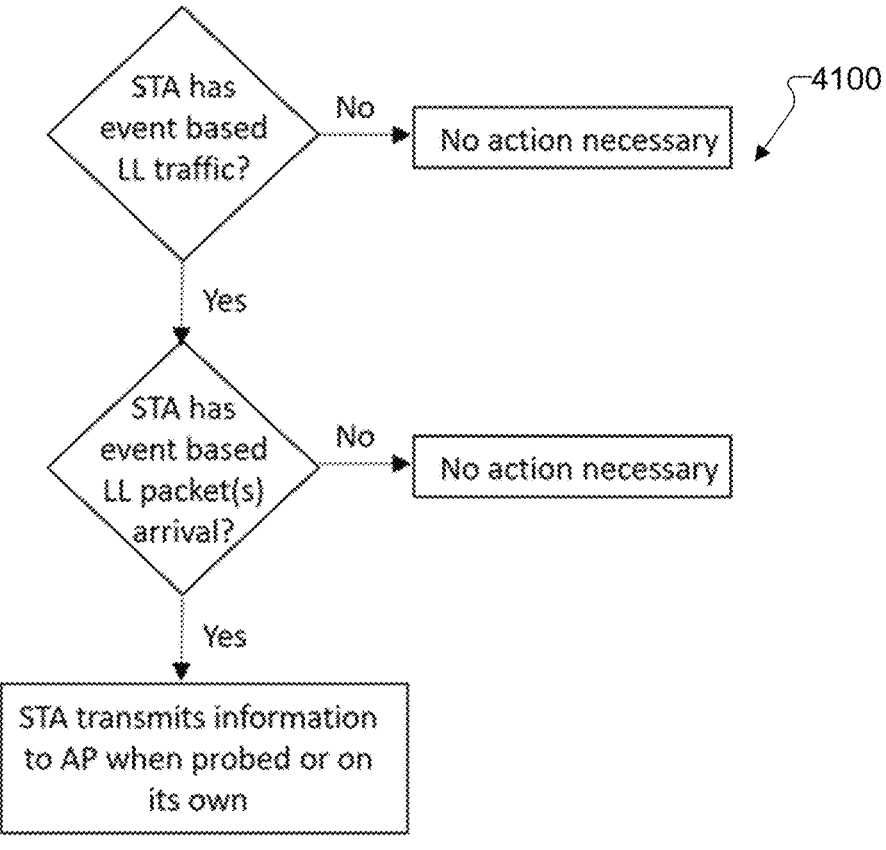
Figure 42:
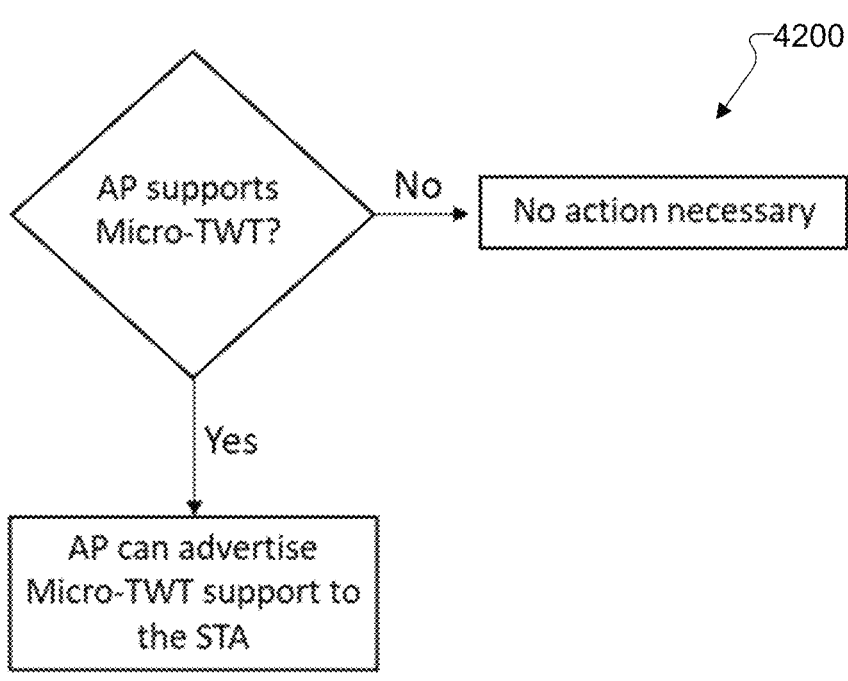

FIG. 23 illustrates a timing diagram with an example of a STA sending a blocking message in a slotted xIFS based channel access procedure according to embodiments of the present disclosure;

FIG. 24 illustrates a timing diagram with an example of a frequency division based triggered channel access procedure according to embodiments of the present disclosure;

FIG. 25 illustrates an example procedure performed by an AP to set up a Micro-TWT procedure according to embodiments of the present disclosure;

FIG. 26 illustrates a timing diagram with an example of a Micro-TWT operation according to embodiments of the present disclosure;

FIG. 27 illustrates an example procedure performed by a STA to request set up of a Micro-TWT procedure according to embodiments of the present disclosure;

FIG. 28 illustrates an example procedure performed by an AP to respond to a request for set up of a Micro-TWT procedure according to embodiments of the present disclosure;

FIG. 29 illustrates an example procedure performed by an AP to tear down Micro-TWT according to embodiments of the present disclosure;

FIG. 30 illustrates an example procedure performed by a STA to tear down Micro-TWT according to embodiments of the present disclosure;

FIG. 31 illustrates an example cross link procedure to setup a Micro-TWT session during MLO according to embodiments of the present disclosure;

FIG. 32 illustrates an example multi-link procedure to setup a Micro-TWT session during MLO according to embodiments of the present disclosure;

FIG. 33 illustrates a timing diagram with an example of an assignment based Micro-TWT operation according to embodiments of the present disclosure;

FIG. 34 illustrates a timing diagram with an example of a trigger based Micro-TWT operation according to embodiments of the present disclosure;

FIG. 35 illustrates a timing diagram with an example of a contention based Micro-TWT operation according to embodiments of the present disclosure;

FIG. 36 illustrates a timing diagram with an example of a hybrid Micro-TWT operation according to embodiments of the present disclosure;

FIG. 37 illustrates a timing diagram with an example of multiple TXOPs using different Micro-TWT operations according to embodiments of the present disclosure;

FIG. 38 illustrates an example procedure performed by a STA to transmit traffic information for assisting the AP with Micro-TWT scheduling according to embodiments of the present disclosure;

FIG. 39 illustrates an example procedure performed by an AP to use traffic information from the STA for Micro-TWT scheduling according to embodiments of the present disclosure;

FIG. 40 illustrates an example procedure performed by an AP to probe the STA for information on event based LL traffic packet arrivals according to embodiments of the present disclosure;

FIG. 41 illustrates an example procedure performed by a STA for event based LL traffic arrival notification to the AP according to embodiments of the present disclosure;

FIG. 42 illustrates an example procedure performed by an AP to advertise Micro-TWT capabilities to STAs according to embodiments of the present disclosure;

6

Figure 43:
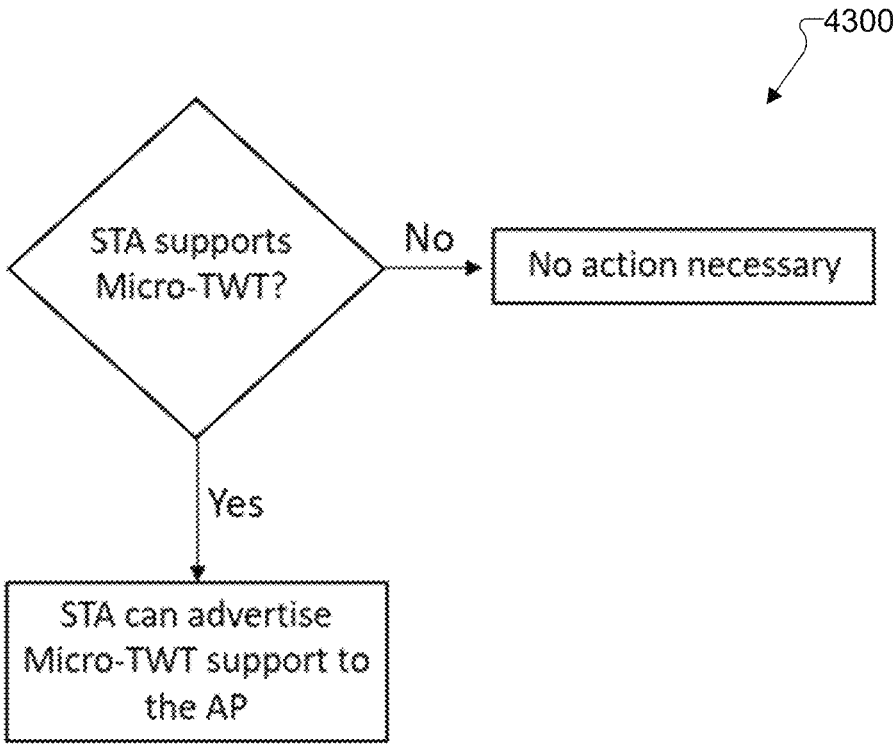
Figure 44:
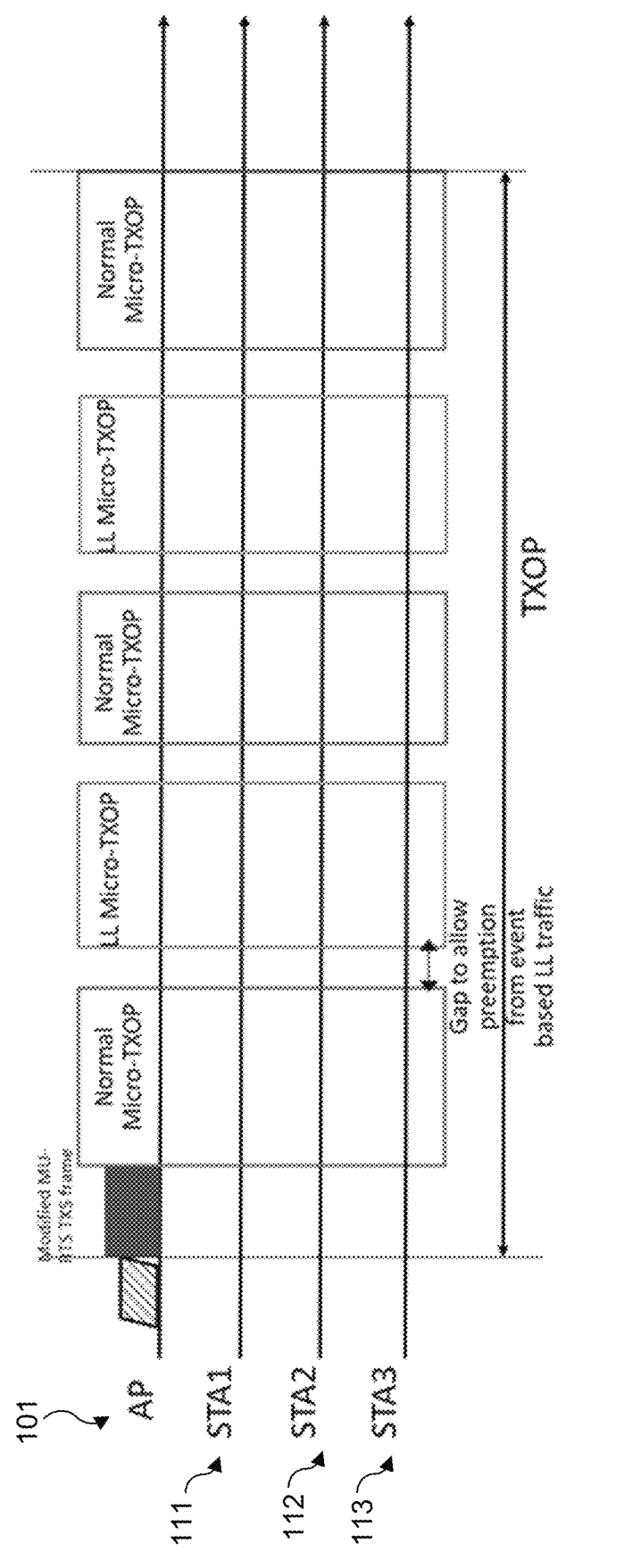
Figure 45:
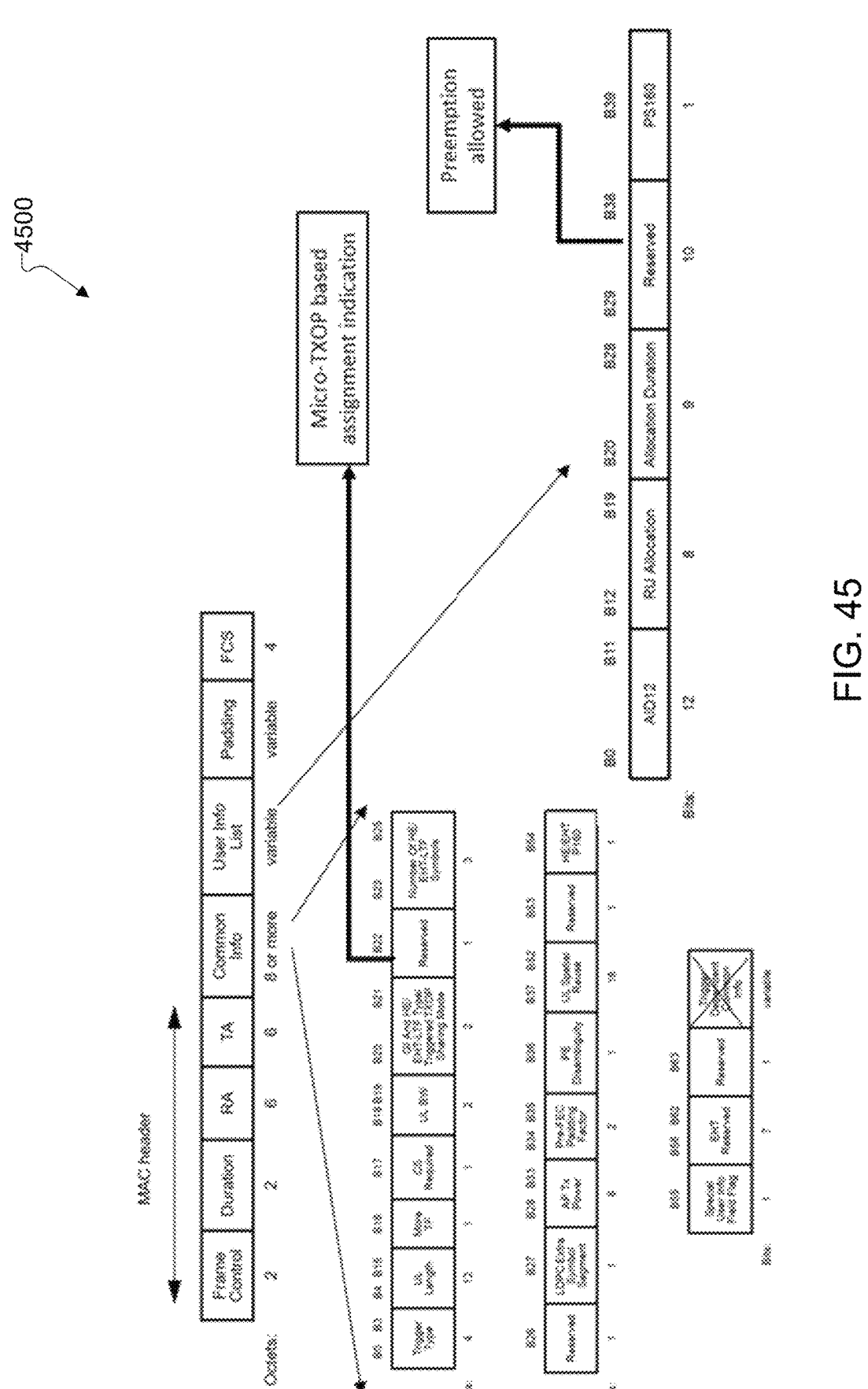
Figure 46:
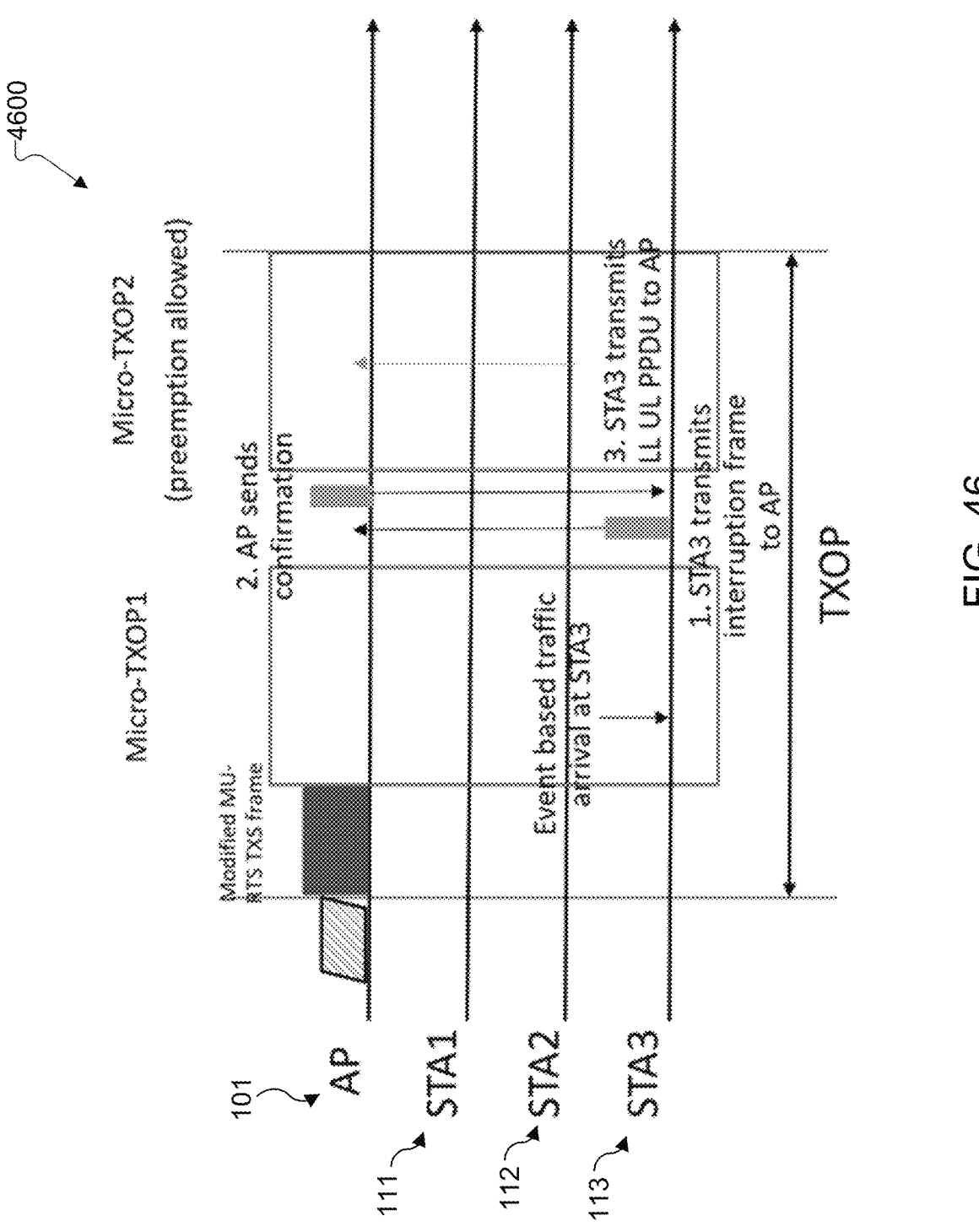
Figure 47:
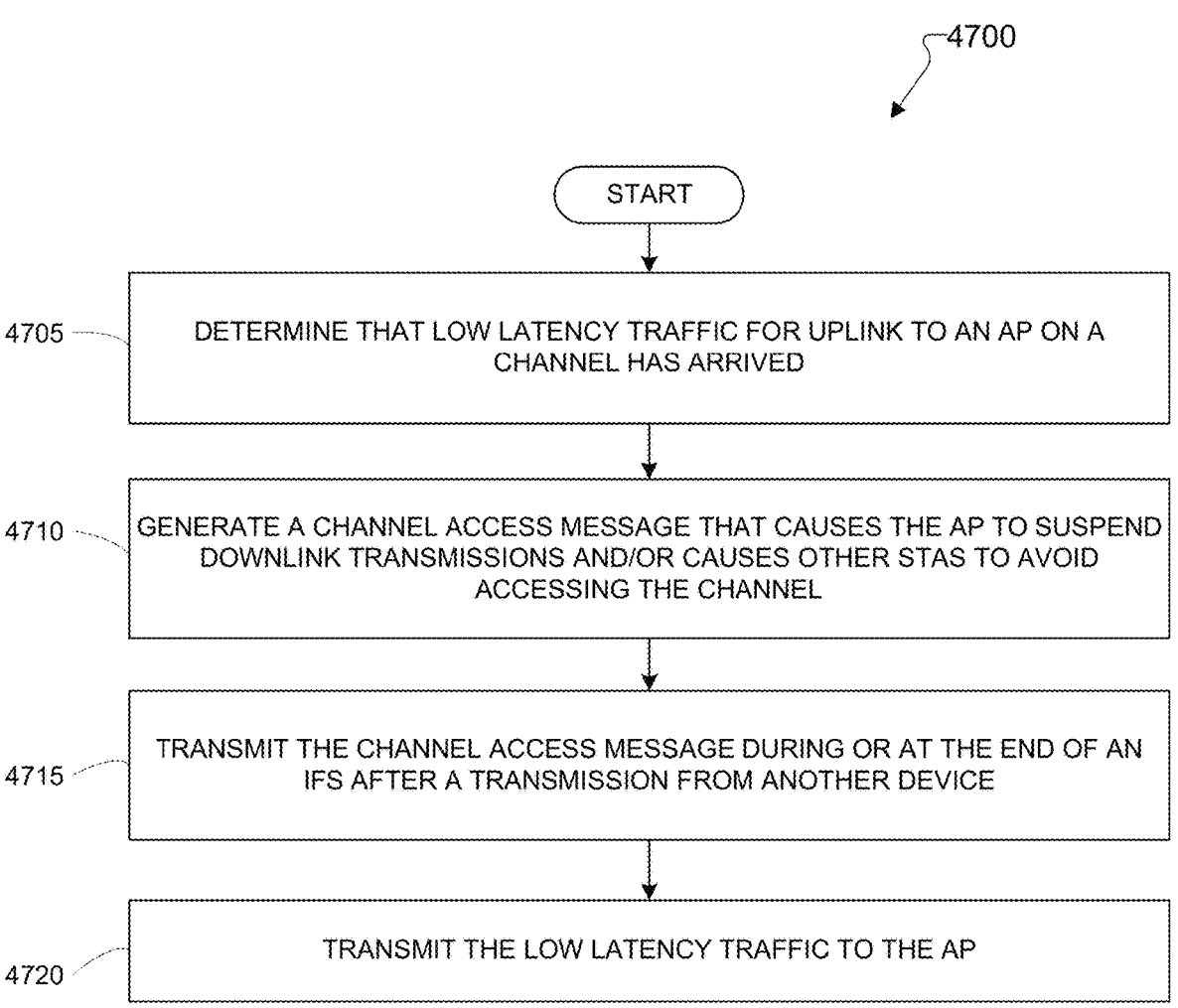

FIG. 43 illustrates an example procedure performed by a STA to advertise Micro-TWT capabilities to the AP according to embodiments of the present disclosure;

FIG. 44 illustrates a timing diagram with an example of a Micro-TXOP operation according to embodiments of the present disclosure;

FIG. 45 illustrates an example frame structure of a modified MU-RTS TXS frame for Micro-TXOP announcement according to embodiments of the present disclosure;

FIG. 46 illustrates a timing diagram with an example of a Micro-TXOP interruption with uplink LL PPDU due to aperiodic traffic according to embodiments of the present disclosure; and FIG. 47 illustrates an example process for facilitating channel access for TXOP preemption procedures according to various embodiments of the present disclosure.

DETAILED DESCRIPTION

FIGS. 1 through 47, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that, in present WI-FI systems, one of the fundamental bottlenecks in reducing latencies is the duration of channel access procedures that STAs encounter when attempting to transmit to an AP. This results from established channel access procedures such as distributed coordination function (DCF), which are intended to prevent collisions but which nevertheless result in an unavoidable minimum time required to obtain channel access. In some cases, the latencies resulting from the existing channel access procedures may be significantly detrimental to ultra-low latency (or ultra-high reliability) operations in upcoming WI-FI revisions.

Embodiments of the present disclosure further recognize that TXOP preemption procedures have been developed to work around channel access procedures to reduce latency further by allowing STAs to preempt an AP's TXOP for low latency traffic transmissions, but these preemption procedures may introduce new issues. Such issues include collisions between transmissions from devices attempting to preempt the TXOP, thus wasting channel resources, the AP losing its TXOP entirely and thus having its own throughput degraded, and increased power consumption from STAs unsuccessfully attempting to preempt the TXOP.

Accordingly, embodiments of the present disclosure provide procedures and devices for facilitating channel access by STAs for TXOP preemption procedures. The procedures discussed herein below allow multiple STAs and the associated AP to coordinate such that TXOP preemption can be performed without unnecessarily wasting channel resources, degrading throughput, or increasing power usage of other STAs or the AP.

Figure 1:
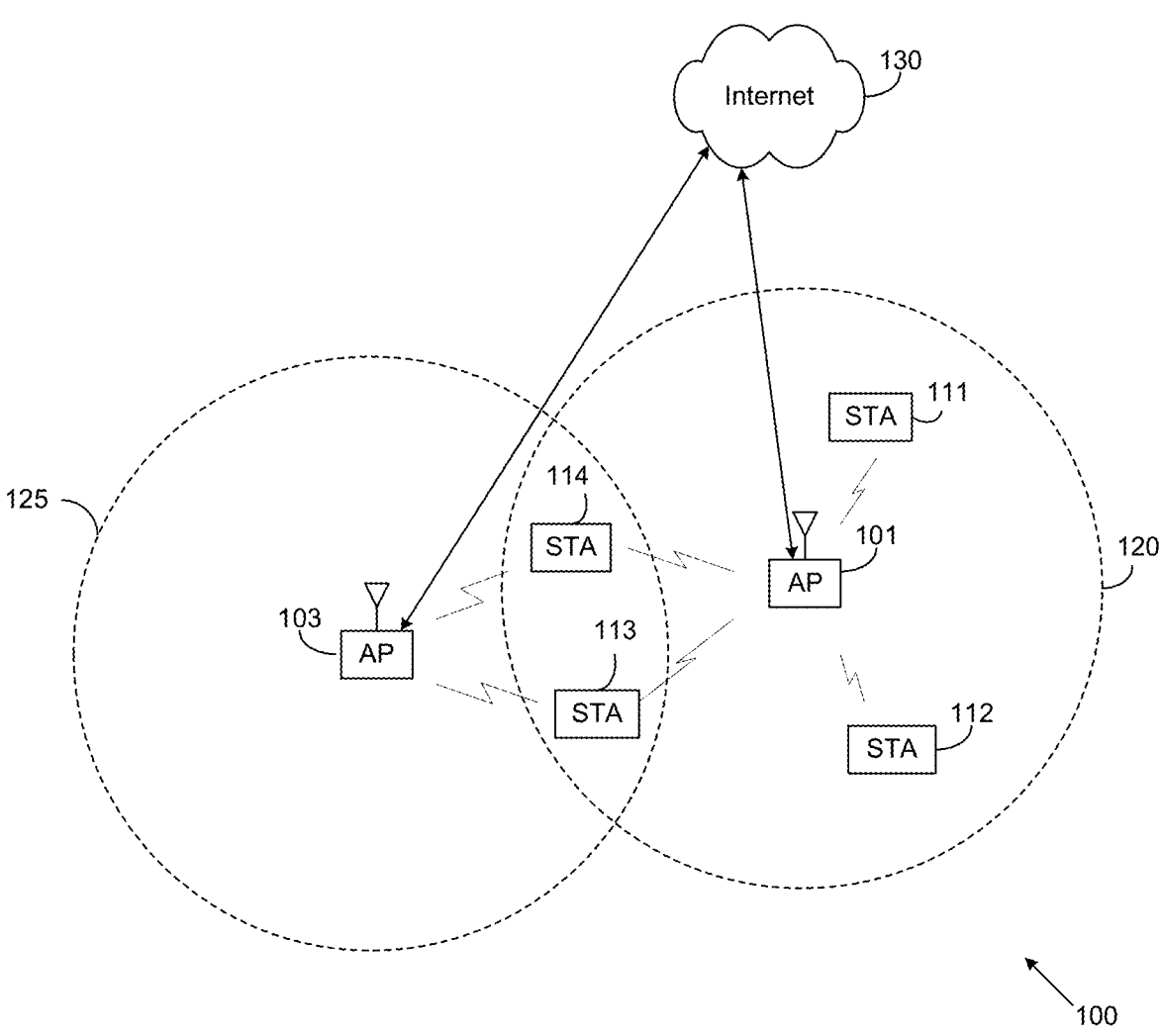
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
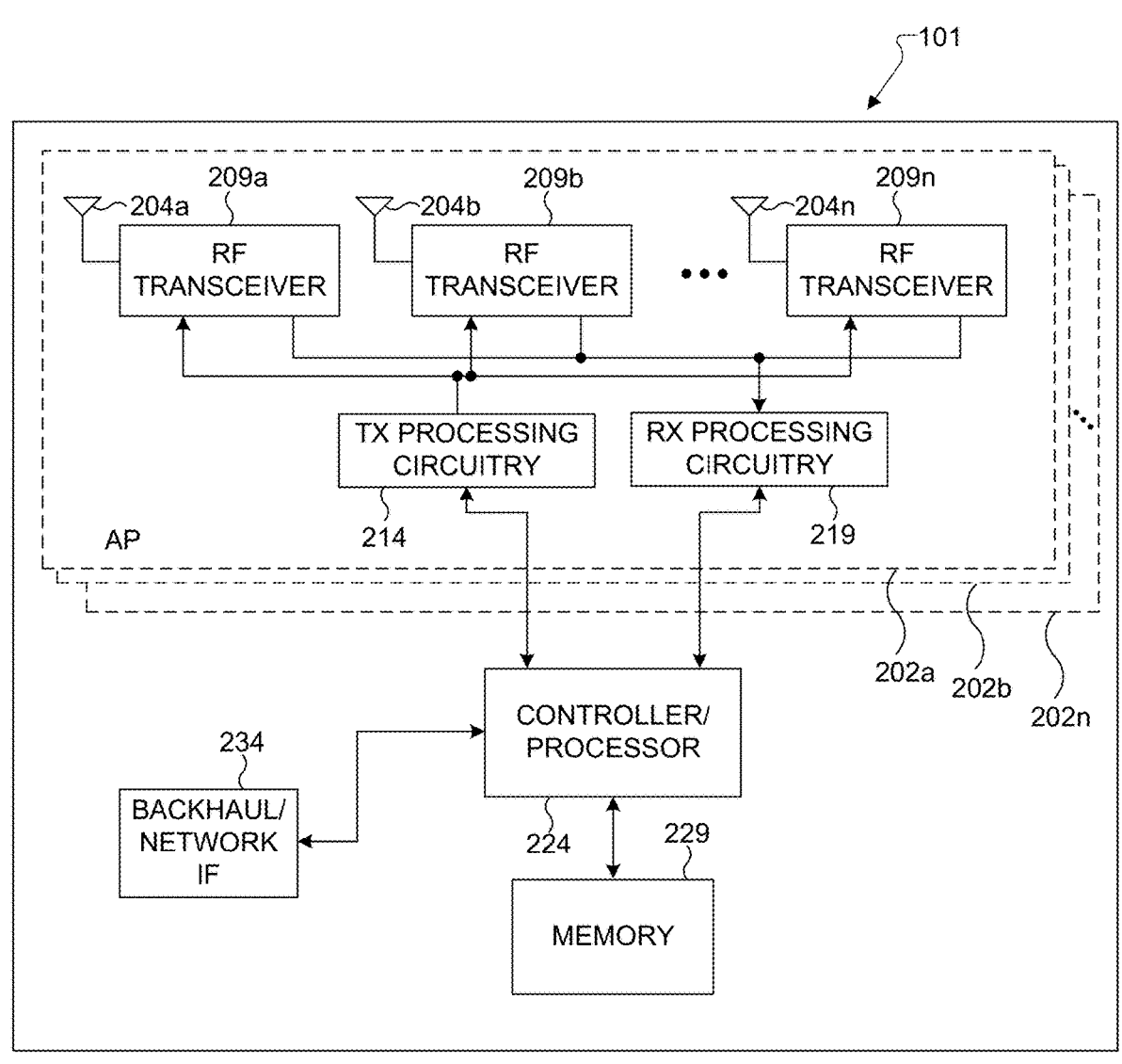
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn).

Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHZ, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). The controller/processor 224 could also facilitate channel access for TXOP preemption procedures by a STA. Any of a wide variety of other functions could be supported in the AP MLD 101 by the controller/processor 224. In some embodiments, the controller/processor 224 includes at least one microprocessor or microcontroller. The controller/processor 224 is also capable of executing programs and other processes resident
in the memory 229, such as operations for facilitating
channel access for TXOP preemption procedures by a STA.
The controller/processor 224 can move data into or out of
the memory 229 as required by an executing process.

The controller/processor 224 is also coupled to the back-
haul or network interface 234. The backhaul or network
interface 234 allows the AP MLD 101 to communicate with
other devices or systems over a backhaul connection or over
a network. The interface 234 could support communications
over any suitable wired or wireless connections. For
example, the interface 234 could allow the AP MLD 101 to
communicate over a wired or wireless local area network or
over a wired or wireless connection to a larger network (such
as the Internet). The interface 234 includes any suitable
structure supporting communications over a wired or wire-
less connection, such as an Ethernet or RF transceiver. The
memory 229 is coupled to the controller/processor 224. Part
of the memory 229 could include a RAM, and another part
of the memory 229 could include a Flash memory or other
ROM.

Although FIG. 2A illustrates one example of AP MLD
101, various changes may be made to FIG. 2A. For example,
the AP MLD 101 could include any number of each com-
ponent shown in FIG. 2A. As a particular example, an AP
MLD 101 could include a number of interfaces 234, and the
controller/processor 224 could support routing functions to
route data between different network addresses. As another
particular example, while each affiliated AP 202a-202n is
shown as including a single instance of TX processing
circuitry 214 and a single instance of RX processing cir-
cuitry 219, the AP MLD 101 could include multiple
instances of each (such as one per RF transceiver) in one or
more of the affiliated APs 202a-202n. Alternatively, only
one antenna and RF transceiver path may be included in one
or more of the affiliated APs 202a-202n, such as in legacy
APs. Also, various components in FIG. 2A could be com-
bined, further subdivided, or omitted and additional com-
ponents could be added according to particular needs.

Figure 2B:
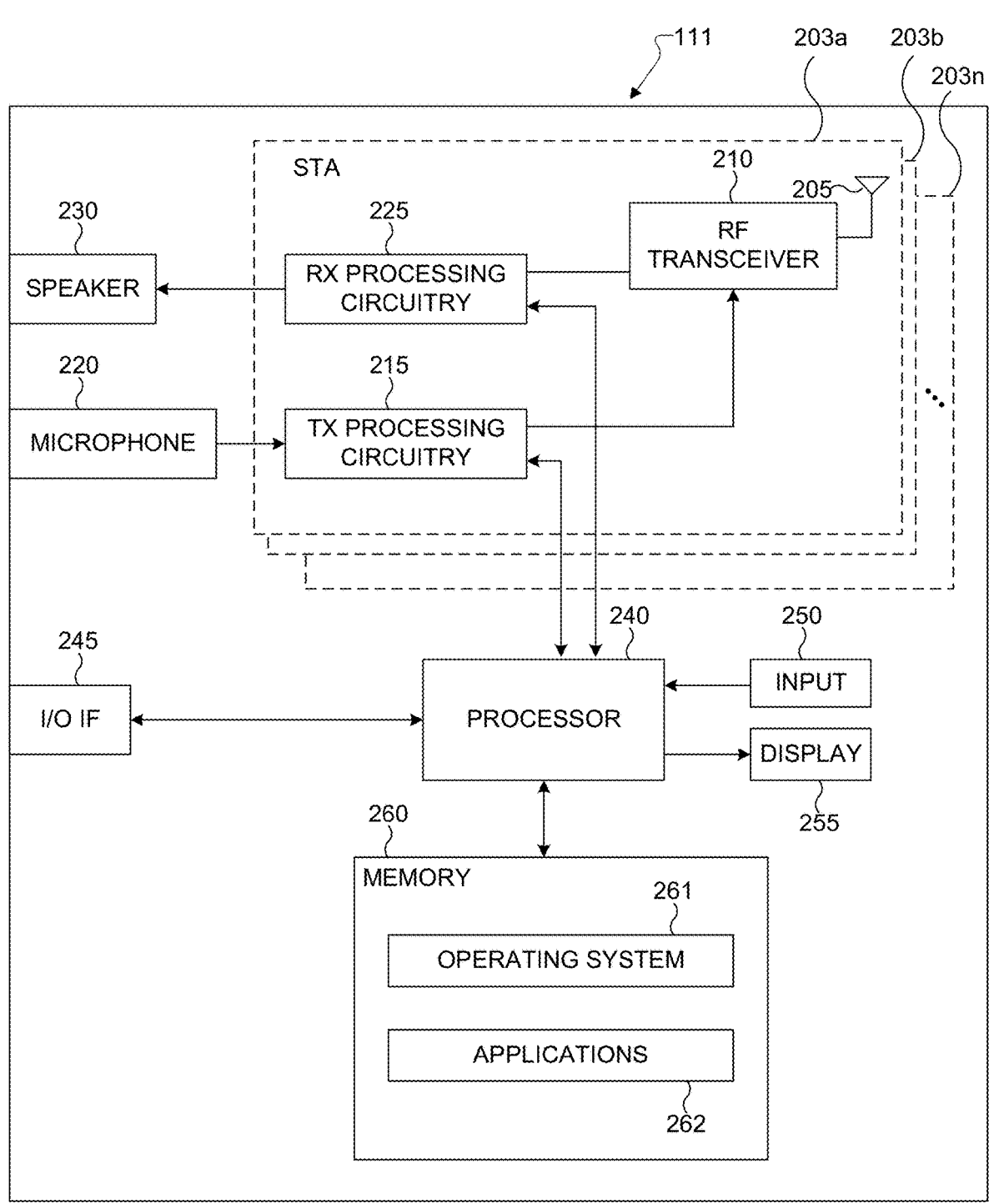
FIG. 2B illustrates an example STA according to various embodiments of this disclosure.

FIG. 2B illustrates an example STA 111 according to
various embodiments of this disclosure. The embodiment of
the STA 111 illustrated in FIG. 2B is for illustration only, and
the STAs 111-115 of FIG. 1 could have the same or similar
configuration. In the embodiments discussed herein below,
the STA 111 is a non-AP MLD. However, STAs come in a
wide variety of configurations, and FIG. 2B does not limit
the scope of this disclosure to any particular implementation
of a STA.

The non-AP MLD 111 is affiliated with multiple STAs
203a-203n (which may be referred to, for example, as
STA1-STAn). Each of the affiliated STAs 203a-203n
includes antennas 205, a radio frequency (RF) transceiver
210, TX processing circuitry 215, and receive (RX) pro-
cessing circuitry 225. The non-AP MLD 111 also includes a
microphone 220, a speaker 230, a controller/processor 240,
an input/output (I/O) interface (IF) 245, a touchscreen 250,
a display 255, and a memory 260. The memory 260 includes
an operating system (OS) 261 and one or more applications
262.

The illustrated components of each affiliated STA 203a-
203n may represent a PHY layer and an LMAC layer in the
OSI networking model. In such embodiments, the illustrated
components of the non-AP MLD 111 represent a single
UMAC layer and other higher layers in the OSI model,
which are shared by all of the affiliated STAs 203a-203n.

For each affiliated STA 203a-203n, the RF transceiver 210
receives from the antennas 205, an incoming RF signal transmitted by an AP of the network 100. In some embodi-
ments, each affiliated STA 203a-203n operates at a different
bandwidth, e.g., 2.4 GHz, 5 GHz, or 6 GHz, and accordingly
the incoming RF signals received by each affiliated STA may
be at a different frequency of RF. The RF transceiver 210
down-converts the incoming RF signal to generate an inter-
mediate frequency (IF) or baseband signal. The IF or base-
band signal is sent to the RX processing circuitry 225, which
generates a processed baseband signal by filtering, decoding,
and/or digitizing the baseband or IF signal. The RX pro-
cessing circuitry 225 transmits the processed baseband sig-
nal to the speaker 230 (such as for voice data) or to the
controller/processor 240 for further processing (such as for
web browsing data).

For each affiliated STA 203a-203n, the TX processing
circuitry 215 receives analog or digital voice data from the
microphone 220 or other outgoing baseband data (such as
web data, e-mail, or interactive video game data) from the
controller/processor 240. The TX processing circuitry 215
encodes, multiplexes, and/or digitizes the outgoing base-
band data to generate a processed baseband or IF signal. The
RF transceiver 210 receives the outgoing processed base-
band or IF signal from the TX processing circuitry 215 and
up-converts the baseband or IF signal to an RF signal that is
transmitted via the antennas 205. In embodiments wherein
each affiliated STA 203a-203n operates at a different band-
width, e.g., 2.4 GHz, 5 GHz, or 6 GHz, the outgoing RF
signals transmitted by each affiliated STA may be at a
different frequency of RF.

The controller/processor 240 can include one or more
processors and execute the basic OS program 261 stored in
the memory 260 in order to control the overall operation of
the non-AP MLD 111. In one such operation, the main
controller/processor 240 controls the reception of forward
channel signals and the transmission of reverse channel
signals by the RF transceiver 210, the RX processing
circuitry 225, and the TX processing circuitry 215 in accor-
dance with well-known principles. The main controller/
processor 240 can also include processing circuitry config-
ured to facilitate channel access for TXOP preemption
procedures by a STA. In some embodiments, the controller/
processor 240 includes at least one microprocessor or micro-
controller.

The controller/processor 240 is also capable of executing
other processes and programs resident in the memory 260,
such as operations for facilitating channel access for TXOP
preemption procedures by a STA. The controller/processor
240 can move data into or out of the memory 260 as required
by an executing process. In some embodiments, the con-
troller/processor 240 is configured to execute a plurality of
applications 262, such as applications for facilitating chan-
nel access for TXOP preemption procedures by a STA. The
controller/processor 240 can operate the plurality of appli-
cations 262 based on the OS program 261 or in response to
a signal received from an AP. The main controller/processor
240 is also coupled to the I/O interface 245, which provides
non-AP MLD 111 with the ability to connect to other devices
such as laptop computers and handheld computers. The I/O
interface 245 is the communication path between these
accessories and the main controller 240.

The controller/processor 240 is also coupled to the touch-
screen 250 and the display 255. The operator of the non-AP
MLD 111 can use the touchscreen 250 to enter data into the
non-AP MLD 111. The display 255 may be a liquid crystal
display, light emitting diode display, or other display capable
of rendering text and/or at least limited graphics, such as
from web sites. The memory 260 is coupled to the controller/ processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antennas 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

As discussed above, one of the fundamental bottlenecks in reducing latency for WI-FI transmissions is the duration of channel access procedures that a device encounters when attempting to transmit. As per the WI-FI medium access control protocol based on DCF, there is a use of carrier-sense multiple access with collision avoidance (CSMA/CA) coupled with a random backoff procedure. Furthermore, devices also need to defer to ongoing transmissions on the channel to avoid collisions/interference to ongoing transmissions. The duration of channel access increases with an increase in time spent deferring to other STAs on the same channel. In dense networks, this can act as another bottleneck that needs to be addressed to further reduce the delays and provide support to ultra-low latency applications. Furthermore, for STAs that have latency sensitive (i.e., low latency) traffic the impact of these defer times can be high, especially if the other STAs on the channel have large PPDU (physical protocol data unit) receptions (e.g., due to high throughput applications).

Figure 3:
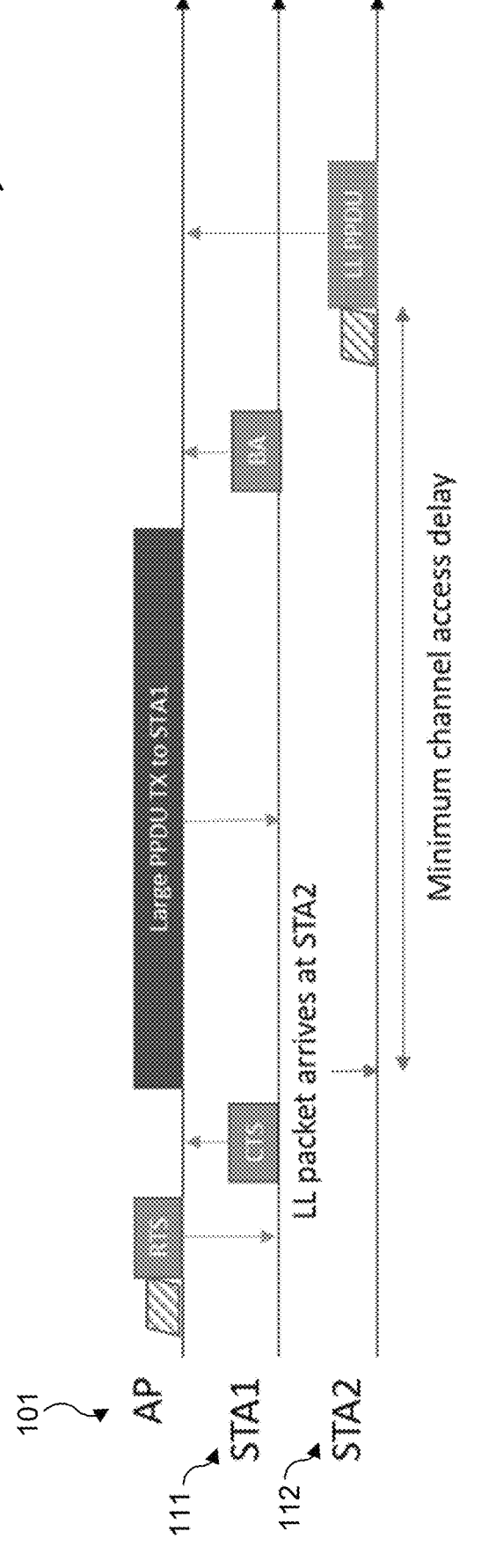
FIG. 3 illustrates a timing diagram with an example of channel access delay caused by a large PPDU transmission according to embodiments of the present disclosure.

FIG. 3 illustrates a timing diagram 300 with an example of channel access delay caused by a large PPDU transmission according to embodiments of the present disclosure. In this example, the AP may be an AP 101, and the STAs (STA1 and STA2) may be STAs 111-112. For ease of explanation, references to an AP in further embodiments below refer to the AP 101, and references to STA1 and STA2 in further embodiments below refer to STA 111 and STA 112, respectively. However, it is understood that the AP may be any suitable AP or AP MLD, and the STAs may be any suitable non-AP STA or non-AP MLD.

In the example of FIG. 3, STA2 has a low latency (LL) traffic stream and a packet of this traffic stream arrives when the AP has captured the channel for a downlink (DL) PPDU transmission to STA1. STA1 has a high throughput application and the DL PPDU results in a large airtime consumption.

In the middle of the large PPDU transmission, a LL packet can arrive at STA2 which can correspond to a low latency application that STA2 is running. The minimum channel access delay that this packet has to face is the remaining portion of the transmission opportunity (TXOP) obtained by the AP for transmission of the downlink PPDU to STA1. The airtime consumption for the large PPDU can be on the order of several milliseconds depending on the application running at STA1. This can result in STA2 facing untenably large delays.

For example, in UHR (11bn) support for ultra-low latency traffic with millisecond level delay tolerance is being considered. That is, this traffic can have a latency requirement on the order of a few milliseconds. If such an LL traffic packet arrives in the middle of an ongoing transmission, it is possible that by the time the transmission is complete, the packet can expire and be dropped. Referring to the example of FIG. 3, if the LL packet received by STA2 is such an LL packet having a latency tolerance of 3 ms, and the remaining portion of the TXOP secured by the AP is 4 ms, the LL packet will expire before STA2 can transmit the LL PPDU to the AP. Thus if the application running on STA2 is an ultra-low latency application, the hit on performance can be severe.

Consequently, to reduce the impact of large PPDU transmissions for high throughput applications on LL traffic but at the same time allow efficient TXOP utilization for high throughput applications, low latency transmitters may be provided an opportunity for channel preemption. To provide this opportunity, the large PPDU transmission may be broken down into several small PPDUs with a maximum length limitation. Furthermore, each of these small PPDUs can be transmitted with an xIFS (inter frame spacing) gap in between them. Consequently, this xIFS gap provides an opportunity for transmission of low latency PPDUs.

Figures 4, 5:
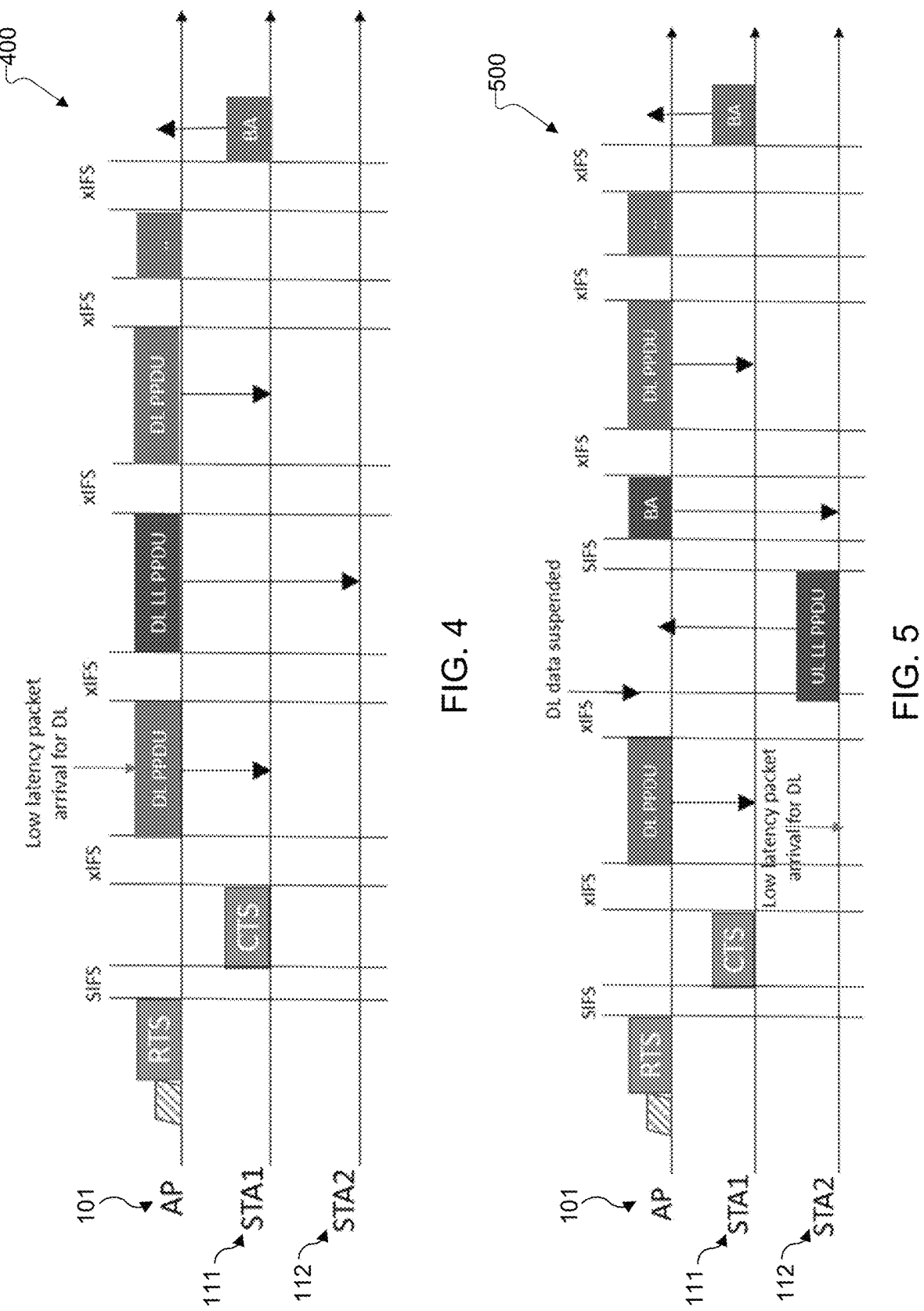
FIG. 4 illustrates a timing diagram with an example of preemption when a low latency packet is for a downlink transmission according to embodiments of the present disclosure.
FIG. 5 illustrates a timing diagram with an example of preemption when a low latency packet is for an uplink transmission according to embodiments of the present disclosure.

FIG. 4 illustrates a timing diagram 400 with an example of preemption when a low latency packet is for a downlink transmission according to embodiments of the present disclosure. As illustrated in FIG. 4, a low latency packet arrives at the AP for downlink transmission to STA2 when the AP already has a large DL PPDU transmission ongoing to STA1. However, since the AP is following the preemption procedure and has divided the ongoing PPDU transmission into multiple smaller PPDUs with opportunities for preemption after each one, the downlink LL traffic for STA2 can be transmitted prior to the completion of the ongoing PPDU transmission to STA1. That is, the LL traffic opportunistically preempts the ongoing PPDU transmission, allowing the LL traffic to be delivered prior to expiration.

FIG. 5 illustrates a timing diagram 500 with an example of preemption when a low latency packet is for an uplink transmission according to embodiments of the present disclosure. The example of FIG. 5 is similar to that of FIG. 4, except the low latency packet arrives at STA2 for uplink (UL) transmission to the AP while the large DL PPDU transmission is ongoing from the AP to STA1. As per the DCF mechanism for channel access, STA2 would normally have to wait until the large PPDU transmission from AP to STA1 is complete, causing additional delays to the LL packet. However, due to the preemption procedure, the AP has divided the ongoing PPDU transmission into multiple smaller PPDUs with opportunities for preemption after each one, and STA2 gets an opportunity to transmit after the AP finishes transmission of one DL data packet of the large PPDU but prior to the AP starting transmission of the next DL data packet. When the AP detects the UL LL PPDU transmitted by STA2, the AP temporarily suspends the DL PPDU transmission. Thus, the UL LL PPDU can be transmitted by STA2 without facing a long delay. Preemption can thus enable even lower delays in next generation WI-FI networks.

However, the preemption procedure can face some issues as the number of STAs with LL traffic increases and different LL traffic patterns are considered. For example, as the number of LL traffic STAs increases, the collision probability can increase for transmissions within the AP's TXOP. For instance, in the example of FIG. 5, if there is another STA3 that has an LL packet arrive for UL during the AP's TXOP, then STA3 can also transmit in the same xIFS gap as STA2, causing a collision. Such collisions can waste resources for the AP (i.e., portions of the AP's TXOP) while not accomplishing anything for the LL STA.

Additionally, when an LL STA starts the transmission of an LL UL PPDU, the duration of the PPDU may not be under the AP's control. Consequently, if the backlog of LL traffic at the STA is large, the STA can potentially take up a significant portion of the AP's TXOP leaving little time to transmit the DL PPDU for which the AP had obtained TXOP. This can be detrimental to the throughput of the application to which the DL PPDU corresponds.

Furthermore, STAs may also want to perform power saving functions. However, using the preemption procedure as described above, all LL STAs may compete for an opportunity to transmit their LL PPDUs but only a few of them can actually secure that opportunity. Nevertheless, all of those LL STAs will end up staying awake and lose power saving opportunities during the AP's TXOP.

To address these issues, the present disclosure provides embodiments of membership management procedures that enable an AP to provide membership to a select a set of STAs to participate in the preemption procedure. Only STAs with membership can participate. The other STAs can chose to perform other actions—e.g., defer, power save, etc.

The membership management procedure can comprise two steps: First, a notification/request step in which the STA can notify the AP with information that can enable the AP to understand if the STA has or can have LL packets during the TXOP. Second, an announcement step in which the AP-based on the notification and on its own assessment—can determine which STAs to grant membership to during a TXOP and can then make an announcement to inform the STAs.

Embodiments of the membership management procedure consider two types of LL traffic: First, periodic traffic, which is predictable. This allows the AP to assess the approximate or exact time at which packets can arrive. Second, event based traffic, which is aperiodic—i.e., event based packets can arrive without a known pattern. Consequently, the AP cannot assess on its own the approximate or exact time at which packets can arrive.

With respect to a notification/request step for periodic traffic, a STA can provide information to the AP about its LL traffic stream for the purpose of membership management for preemption procedures. According to one embodiment, the STA can transmit a frame to the AP containing information about the traffic characteristics. This frame can contain one or more of the information items specified in Table 1.

TABLE 1

| Information item | Description |
|---|---|
| Stream identifier | An identifier that can be used by the STA to refer to a particular stream. This can be an alphanumeric value that can indicate the stream id. |
| Traffic pattern info | An indication on whether the traffic is periodic or aperiodic. This can be a bit that is set to 1 to indicate that the traffic stream is periodic and set to 0 if it is not periodic. |
| Periodicity | Information related to the periodicity of the traffic stream. This information can enable the AP to make an estimate on the LL packet arrival for the STA. |
| Traffic characteristics | Information related to the characteristics of the traffic stream, e.g., mean arrival rate, packet size, burst length, etc. |

The above information can be transmitted by the STA to the AP in an independent frame or in any of the frames existing in the standard (e.g., SCS request and response frames with QoS characteristic element).

Figure 6:
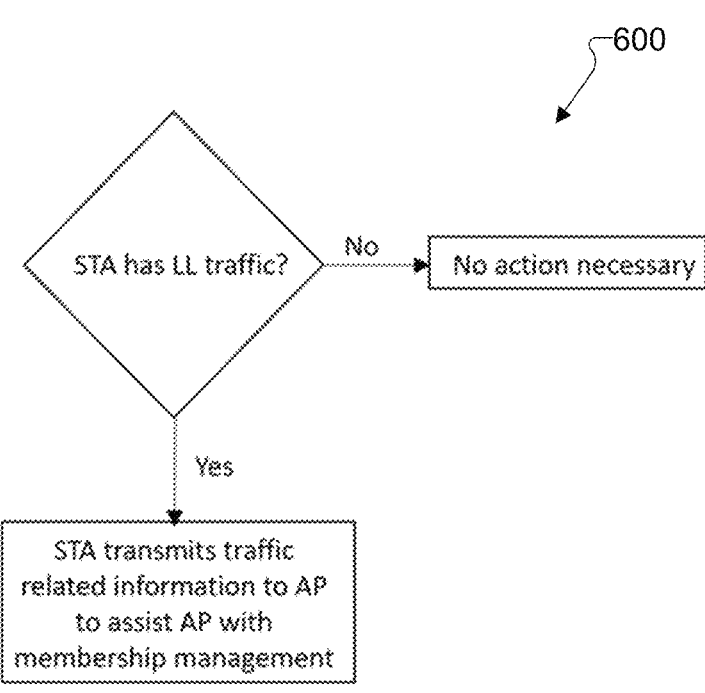
FIG. 6 illustrates an example procedure performed by a STA for transmitting traffic information to the AP to assist with membership management according to embodiments of the present disclosure.

FIG. 6 illustrates an example procedure 600 performed by a STA for transmitting traffic information to the AP to assist with membership management according to embodiments of the present disclosure. The STA can transmit this information on its own or when requested by the AP.

Figure 7:
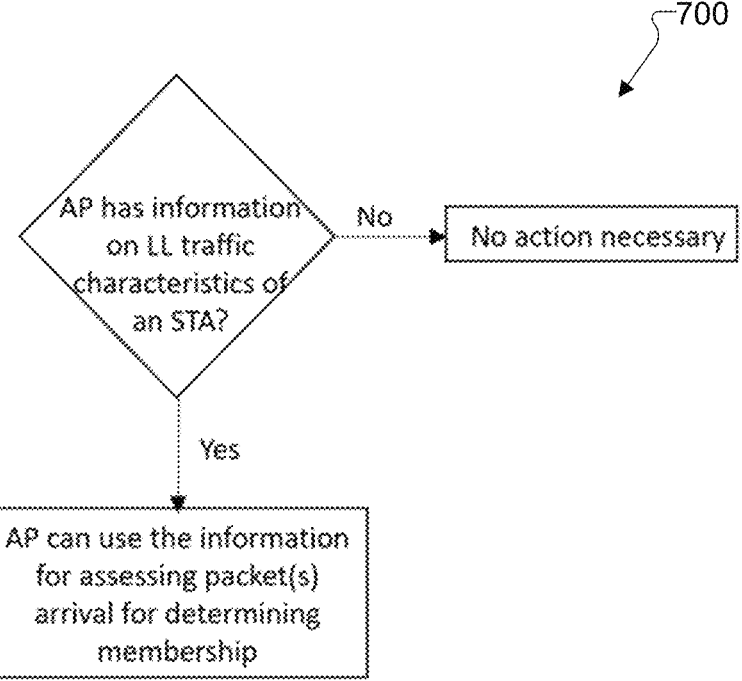
FIG. 7 illustrates an example procedure performed by an AP for using traffic information received from the STA to for membership management according to embodiments of the present disclosure.

FIG. 7 illustrates an example procedure 700 performed by an AP for using traffic information received from the STA to for membership management according to embodiments of the present disclosure. The AP can receive a frame containing one or more of the above pieces of information (e.g., from Table 1) from the STA based on a request made by the AP or when transmitted by the STA on its own. The AP can use this information to assess the approximate or exact packet arrival time for the periodic LL traffic of the STA. This can help the AP to understand if the STA can be expected to have LL traffic packet during a given TXOP.

With respect to a notification/request step for event based traffic, by nature the traffic is not periodic, so it is hard for the AP to assess beforehand the LL traffic packet arrival times for the DL or UL. The STA can provide a notification to the AP to assist the AP in making this assessment. According to one embodiment, the STA can transmit a frame to the AP containing one or more of the information items specified in Table 2.

TABLE 2

| Information item | Description |
| --- | --- |
| Packet arrival information | Indicates to the AP that STA has event based LL traffic. E.g., packet arrival timestamp or a bit reused from an existing frame and set to 1 to indicate that STA has LL traffic packet. |
| Airtime consumption info | How much airtime STA will need to transmit the packet(s). E.g., number of packets + data rate, overhead for the packets, raw airtime value, etc. This can be useful for AP to determine if STA can be granted membership or not. E.g., if STA's airtime requirement is very large and cannot be covered in this TXOP, AP can skip the STA and instead trigger it outside the TXOP. |
| Explicit Link info indication | The link on which this packet will be transmitted by the STA. AP can provide membership to STA for TXOP on that link. Alternatively, STA can make implicit indication by transmitting the info on the link on which it will transmit the packet. |
| TID/AC info | If there are more than one type of TID/AC for which STA has packet arrival. This helps the AP to know that STA may send multiple PPDUs if it does not aggregate multiple TID/AC as a part of a single PPDU. |
| Stream info | If STA has setup SCS for this traffic flow, STA can indicate SCS ID and then AP knows where to get the QoS characteristic information from. |

The above information can be transmitted by the STA to the AP in an independent frame or in any of the frames existing in the standard.

Figure 8:
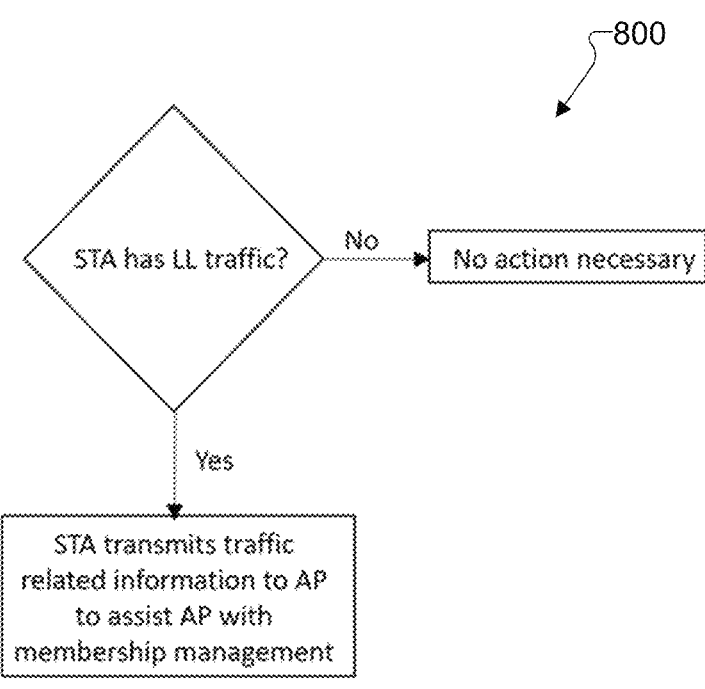
FIG. 8 illustrates an example procedure performed by an AP for probing a STA for event based LL traffic information according to embodiments of the present disclosure.

FIG. 8 illustrates an example procedure 800 performed by an AP for probing a STA for event based LL traffic information according to embodiments of the present disclosure. According to this embodiment, the AP can transmit a probing frame to check if there is any event based LL packet arrival at the STA.

In the case of MLO operation, an AP MLD can probe the non-AP MLD on any of the links that are setup between the AP MLD and the non-AP MLD. For example, if a non-AP MLD has three STAs-STA1, STA2 and STA3 which have setup three links-link 1, link 2 and link 3 respectively with AP 1, AP 2 and AP 3 affiliated with the AP MLD, then AP 2 affiliated with the AP MLD can transmit the probing frame to STA2 of the non-AP MLD to check for LL packet arrival at STA 1 of the non-AP MLD for participation in a preemption procedure with AP 1 of the AP MLD.

According to another embodiment, the AP can also receive a frame containing one or more of the information items indicated in Table 2 without probing the STA. The AP can use this information to assess the membership for preemption in a TXOP. In the case of MLO operation, any AP affiliated with an AP MLD can receive the frame for any of the other APs affiliated with the same AP MLD. Based on the above notations for AP and non-AP MLD setup, AP 2 can receive the frame which is meant for AP1.

According to one embodiment, when the STA is probed by the AP, the STA can transmit a frame containing one or more of the information items indicated in Table 2. In the case of MLO operation, any STA affiliated with a non-AP MLD can transmit the frame on behalf of any of the other STAs affiliated with the same non-AP MLD. Furthermore, when probed on one link, a non-AP MLD can transmit the frame to the AP MLD on any of the other links setup with the AP MLD.

According to another embodiment, the STA can transmit the frame on its own-without being probed-when an event based LL traffic packet arrives. In the case of MLO operation, any of the STAs affiliated with the non-AP MLD can transmit the frame on behalf of any of the other STAs affiliated with the same non-AP MLD.

Figure 9:
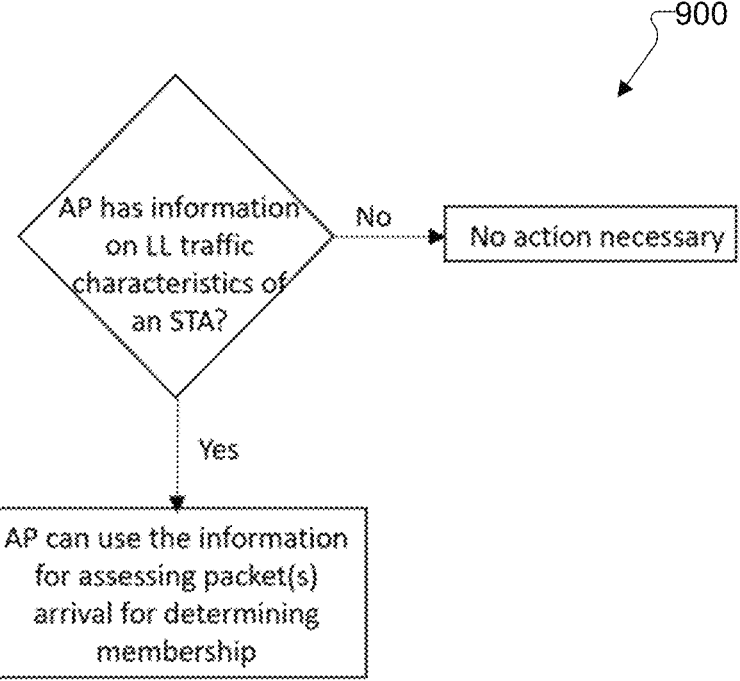
FIG. 9 illustrates an example procedure performed by a STA for transmitting an event based LL traffic notification to the AP to assist with membership management according to embodiments of the present disclosure.

FIG. 9 illustrates an example procedure 900 performed by a STA for transmitting an event based LL traffic notification to the AP to assist with membership management according to embodiments of the present disclosure.

The notification step in the above embodiments can be performed either prior to the start of the TXOP or after the TXOP begins.

The announcement step can involve at least the AP informing the STAs about the membership for participation in the preemption procedure. The AP can make a membership announcement by transmitting a frame containing one or more of the information items indicated in Table 3 below for each STA that is granted the membership.

TABLE 3

| Information items | Description |
| --- | --- |
| STA identifier | An identifier indicating for which STA this information is intended for. E.g., the STA MAC address. |
| Add/remove/modify | Information on what action the AP is performing with respect to the above specified STA. E.g., AP intends to add the STA to the membership, AP can remove the STA membership or can modify some of the below information related to STA's membership. |
| UL/DL traffic expectation (based on periodicity) | Indication of whether STA is being provided membership to receive downlink traffic or uplink traffic or both. E.g., this can be a field that can take a particular integer value depending on the case such as 0 for downlink traffic, 1 for uplink traffic and 2 for both. |
| PPDU breakdown info | Information on how AP will break down the large PPDU transmission. E.g., Max PPDU duration. |
| Timing info for power save | Timing information on when to expect to transmit/receive the UL/DL frame in the TXOP relative to TXOP start time. E.g., after the first PPDU. This and the above information can be useful for the STA to do some additional power save. Further, this information can also be useful to reduce the number of STAs for each transmission opportunity. E.g., AP can allow at most one STA between each DL PPDU transmission and specify when an STA should expect to transmit/receive. |
| Membership modification announcement expectation | If AP intends to make a modification to the membership, it can indicate when the modification announcement can be expected. E.g. Membership modification can be expected after the first PPDU/middle of the TXOP in which can AP can make such an indication to the STA. |
| Duration limit | AP can assign each STA a specific amount of time in each TXOP. If STA gets that much time, then it can stop its transmission. |
| Limit on how many times STA can transmit in a TXOP for preemption | AP can limit how many times an STA can transmit in a TXOP that allow preemption. E.g., An STA can be given only one attempt and STA may not attempt to transmit again in the same TXOP. |
| TXOP identification | AP can make an explicit indication in the announcement frame about which TXOP it refers to. This can be useful for the STAs to do power save. E.g., information about which STA will be the receiver STA or the first receiver STA in the TXOP, remaining countdown timer to start the particular TXOP, etc. STA can use this information to assess if a particular TXOP allows preemption or not. If preemption is not allowed, STA can perform some other action. E.g., power save. Alternatively, AP can transmit an indication frame at the start of the TXOPs that allow preemption. |
| Link indication | Indication of which link's preemption membership is being announced/modified. E.g., AP MLD can make an announcement on link 2 to announce/update the information for preemption membership on link 1. |

The AP can transmit the above information for multiple STAs in a single announcement frame. One or more of the above information items can be transmitted by the AP to the STAs in an independent frame or in any of the existing frames in the standard.

According to one embodiment, the AP can announce which LL STAs can participate in preemption during an upcoming TXOP. This can be done prior to the start of the TXOP. According to some embodiments, the AP can also use announcement to choose which TXOPs will allow preemption—e.g., only those TXOPs which are preceded by announcement can allow preemption. This information can be explicitly present in announcement frames or provided implicitly (e.g., by preceding the TXOP with a membership announcement). The AP can provide some details on which STA the TXOP is for (e.g., traffic will be for STA1). Thus, STA 2 knows how to identify the TXOP with preemption allowed when it sees the TXOP being started for STA1's reception. This can also enable the AP to disallow preemption in some TXOPs. If a TXOP does not allow preemption, there will not be an xIFS gap and a STA cannot capture the channel.

This type of membership announcement can be more relevant for periodic LL traffic. For event-based traffic, the AP can add some LL STAs in the announcement prior to TXOP acquisition if the event based packet has already arrived or if the AP makes an estimate based on implementation algorithm that the STA can be expected to have a packet in the upcoming TXOP.

According to one embodiment, the AP can modify a previous announcement and add some STAs, remove STAs, or modify membership information of one or more STAs after the TXOP is acquired. One case where this can be beneficial is for event based traffic if the LL packet arrives after the TXOP has been acquired by the AP. The timing of the announcement can either be arbitrary within the TXOP or can be fixed beforehand (e.g., via the announcement frame that is transmitted prior to TXOP acquisition). The AP can transmit information related to STAs for which there is an update—e.g., STAs that have event based packet arrival after TXOP acquisition and need to be granted membership.

In the case of MLO operation, an AP MLD can make the announcement on any of the links that are setup between the AP MLD and the non-AP MLD. The non-AP MLD can identify which STA the announcement corresponds to (e.g., by using the link indication in the announcement frame) and provide the information to that particular affiliated STA.

The announcement frame can be transmitted by the AP on a per-STA basis or the information for multiple STAs can be grouped together and transmitted in a single announcement frame. The announcement frame can be an independent frame or any of the frames existing in the standard (e.g., management frames such as beacons).

The announcement can be done using one or both of the above methods (that is, before TXOP acquisition or after TXOP acquisition).

According to one embodiment, the AP can transmit the announcement information within one or more PPDUs that are transmitted within the TXOP. For example, the AP can transmit an indication message in a PPDU to inform the STAs about the preemption opportunity following the PPDU. This announcement message can implicitly provide membership to STAs with LL traffic.

According to one embodiment, the membership can be obtained by the STA by transmitting an indication at the start of the gap. According to this embodiment, the STA can send an indication message at the start of the gap. Based on this indication message, membership can be implicitly obtained by one or more STAs.

Once a STA has been granted membership, the STA can stay awake during the particular TXOP and participate in the preemption procedure. If the AP has specified how many times the STA can participate in a TXOP, then the STA can participate that number of times and then perform other actions (e.g., power save).

If a STA has event based traffic and is not granted membership prior to TXOP start, then the STA can stay awake during the entire TXOP and/or for the time when an announcement is expected from the AP. If the STA is not granted membership, then the STA performs power saving after the final membership modification announcement in a TXOP.

If the STA is not granted membership, then the STA may not participate in preemption in that particular TXOP.

Figure 10:
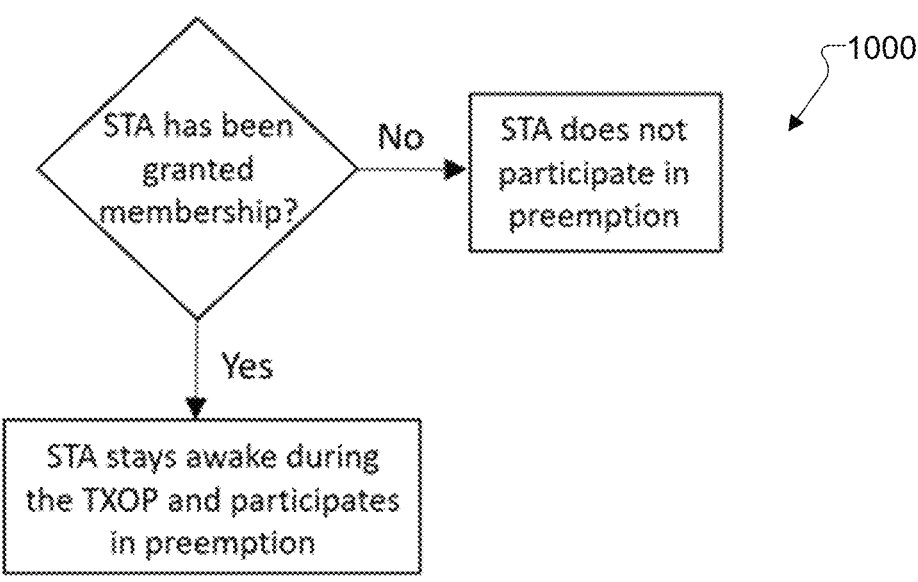
FIG. 10 illustrates an example procedure performed by a STA based on whether it is granted membership in the preemption procedure according to embodiments of the present disclosure.

FIG. 10 illustrates an example procedure 1000 performed by a STA based on whether it is granted membership in the preemption procedure according to embodiments of the present disclosure.

If the AP provides membership to a STA for downlink transmission, then the AP can transmit and/or receive UL PPDUs to/from the STA to which membership has been granted. If AP has not provided membership to a STA and the STA receives a DL LL PPDU, then the AP can either provide the STA membership (if possible) and transmit the PPDU, or buffer the PPDU for future transmissions either through preemption or based on the channel contention for that PPDU transmission.

Figure 11:
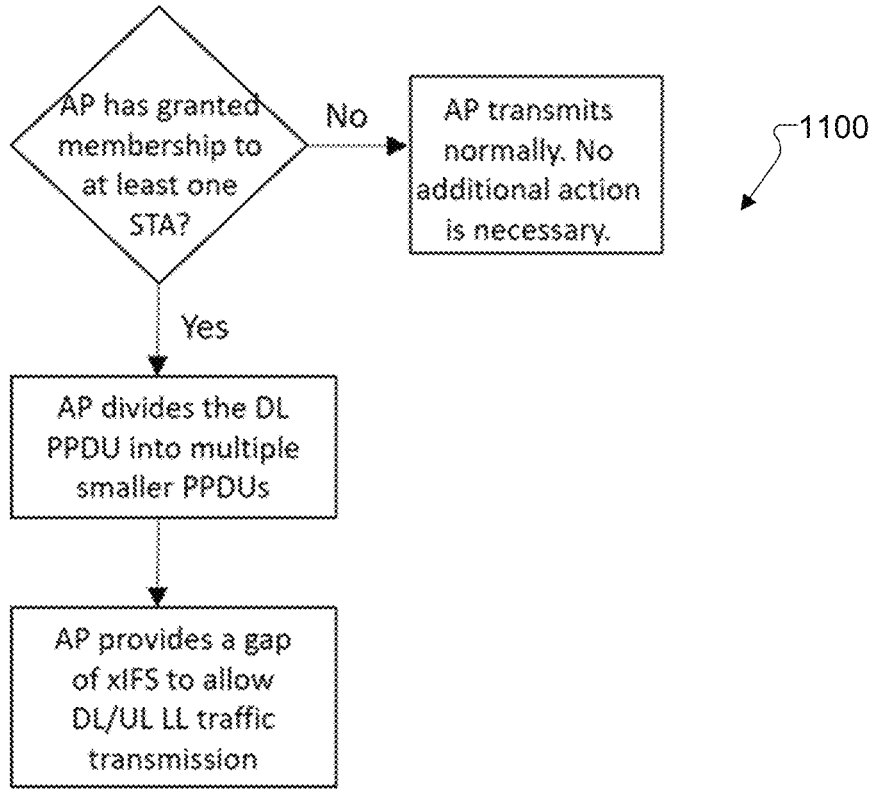
FIG. 11 illustrates an example procedure performed by an AP based on whether it has granted membership in the preemption procedure to a STA according to embodiments of the present disclosure.

FIG. 11 illustrates an example procedure 1100 performed by an AP based on whether it has granted membership in the preemption procedure to a STA according to embodiments of the present disclosure.

An AP that supports preemption procedure and/or announcement procedure can advertise this capability so that STAs with LL traffic can prepare accordingly. The AP can make an indication in a frame that it transmits to the STA (e.g., in management frames such as beacons). This can be done via a capability bit that can be set to a predetermined value (e.g., 1) to make the indication.

Figure 12:
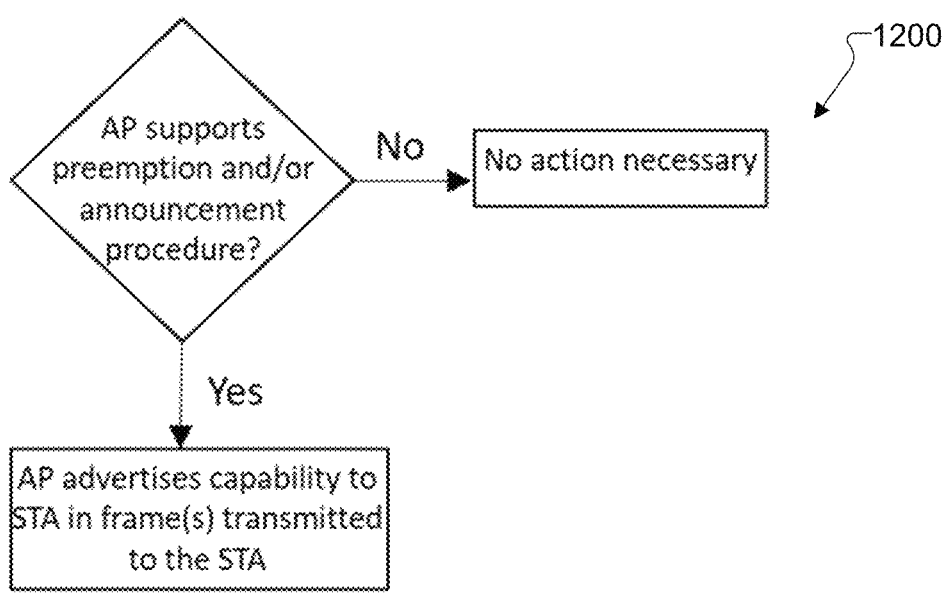
FIG. 12 illustrates an example procedure performed by an AP to advertise support for the preemption procedure and/or announcement procedures according to embodiments of the present disclosure.

FIG. 12 illustrates an example procedure 1200 performed by an AP to advertise support for the preemption procedure and/or announcement procedures according to embodiments of the present disclosure.

According to another embodiment, if a STA supports a notification capability to notify the AP about LL traffic information for the purpose of preemption (e.g., a notification for event based traffic), then the STA can provide this information to the AP in a frame transmitted to the AP. This frame can be a new frame or any of the existing frames in the standard (e.g., management frames such as beacons).

Figure 13:
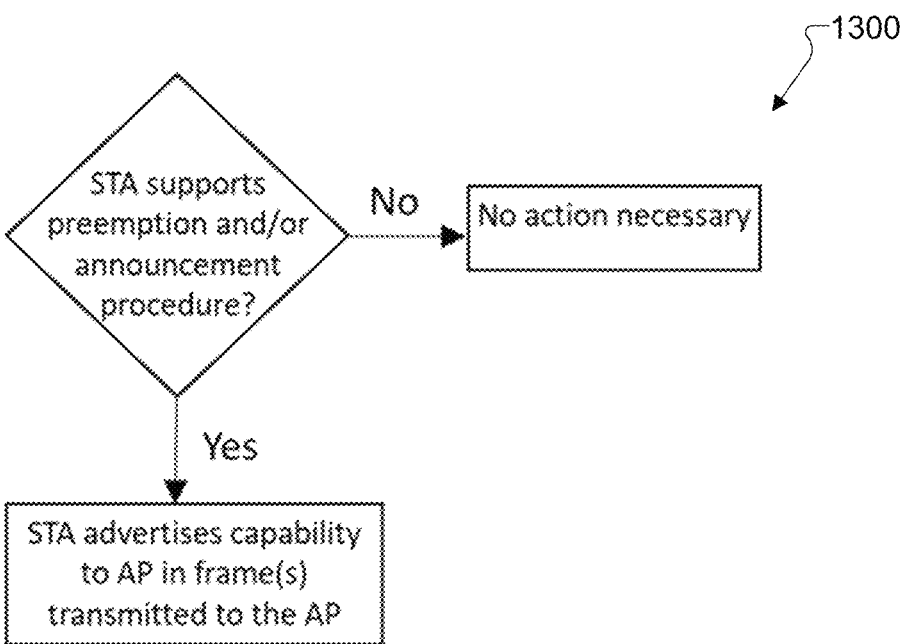
FIG. 13 illustrates an example procedure performed by a STA to advertise support for the preemption procedure and/or announcement procedures according to embodiments of the present disclosure.

FIG. 13 illustrates an example procedure 1300 performed by a STA to advertise support for the preemption procedure and/or announcement procedures according to embodiments of the present disclosure.

As noted above, the preemption procedure of FIGS. 4 and 5 faces an issue of potential collisions as more than one LL STA can attempt to send an LL UL PPDU in one xIFS gap. In particular, as the gap is an interframe spacing, there may not be sufficient time to perform 802.11 contention for channel access, and more than one STA can end up transmitting at the same time resulting in a collision. Such collisions can result in wastage of resources within the TXOP as neither the AP nor the STAs will end up sending any PPDUs successfully and TXOP time will be consumed.

Figure 14:
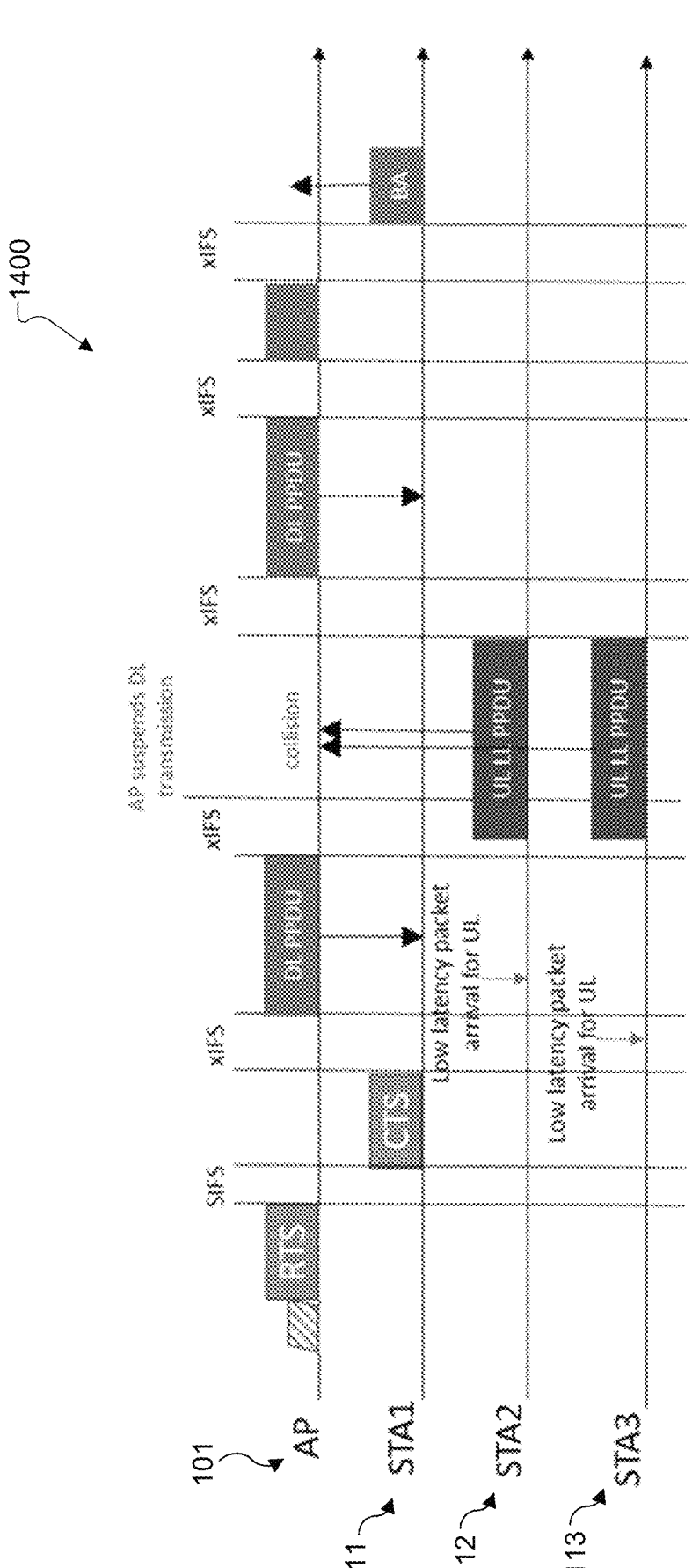
FIG. 14 illustrates a timing diagram with an example of collision during preemption according to embodiments of the present disclosure.

FIG. 14 illustrates a timing diagram 1400 with an example of collision during preemption according to embodiments of the present disclosure. As illustrated in FIG. 14, STA2 and STA3 receive LL PPDUs to transmit to the AP while the AP has an ongoing large DL PPDU transmission. Using the preemption procedure of FIGS. 4 and 5, STA2 and STA3 both transmit their LL PPDUs in the same xIFS gap, causing a collision. Since the AP detects that a UL transmission has already begun in the gap, the AP suspends DL PPDU transmission. Because the UL LL PPDUs sent by STA2 and STA3 collide and the AP suspends its DL PPDU transmission, airtime in the TXOP gets wasted. As TXOP duration is limited, such wastage should be reduced. Efficient channel access procedures for preemption are therefore provided herein to reduce such wastage.

The channel access procedure design should also account for another issue that can arise for preemption as follows. A number of STAs can end up preempting the AP in succession. It is therefore possible that the AP can lose its TXOP to other STAs and the AP may not be able to get back control of the TXOP for its own DL PPDU transmission.

Figure 15:
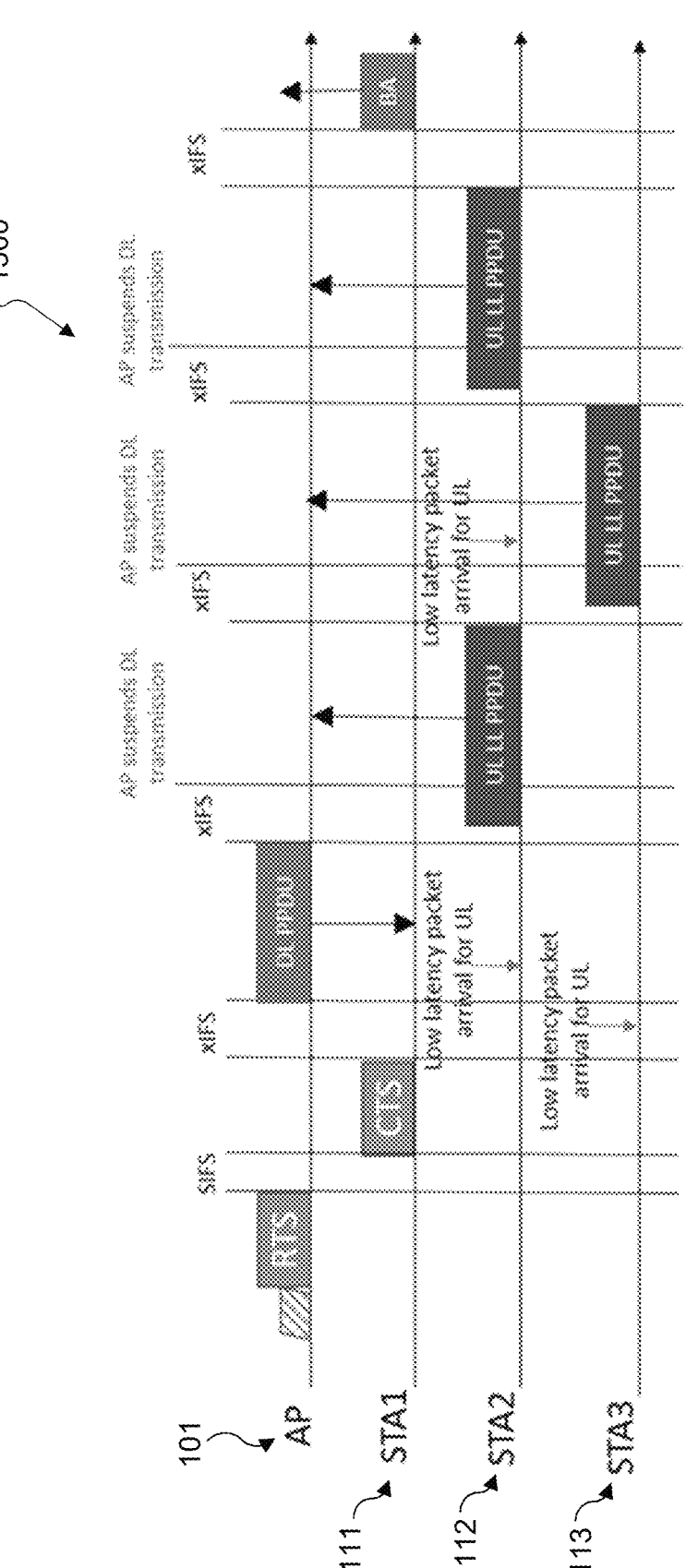
FIG. 15 illustrates a timing diagram with an example of LL STAs dominating the TXOP through preemption according to embodiments of the present disclosure.

FIG. 15 illustrates a timing diagram 1500 with an example of LL STAs dominating the TXOP through preemption according to embodiments of the present disclosure. As illustrated in FIG. 15, STA2 and STA3 receive LL PPDUs for transmission on the uplink while the AP has an ongoing large DL PPDU transmission. Using the preemption procedure of FIGS. 4 and 5, STA2 and STA3 end up preempting the AP repeatedly and the AP is unable to reobtain the TXOP for its own usage. This can impact the throughput of the high throughput application that the AP is transmitting the DL PPDU for. To address this, channel access procedures for preemption are provided herein which also provide the AP an ability to take back the control of the TXOP.

According to one embodiment, the xIFS gap can be divided into a number of slots to provide preemption opportunities. According to this embodiment, the slots can be assigned to various STAs for preempting and transmitting LL PPDUs, or to the AP for transmitting DL PPDUs. For example, the xIFS gap can be divided into K slots of duration $X_{slot}$ (e.g., 9 us) such that xIFS=$K*X_{slot}+T_{margin}$, where $T_{margin}$ is a time duration to account for various factors that can lead to errors in following tight slot boundaries (e.g., due to lack of tight synchronization between STAs, timing errors, any hardware artifacts, etc.).

Figure 16:
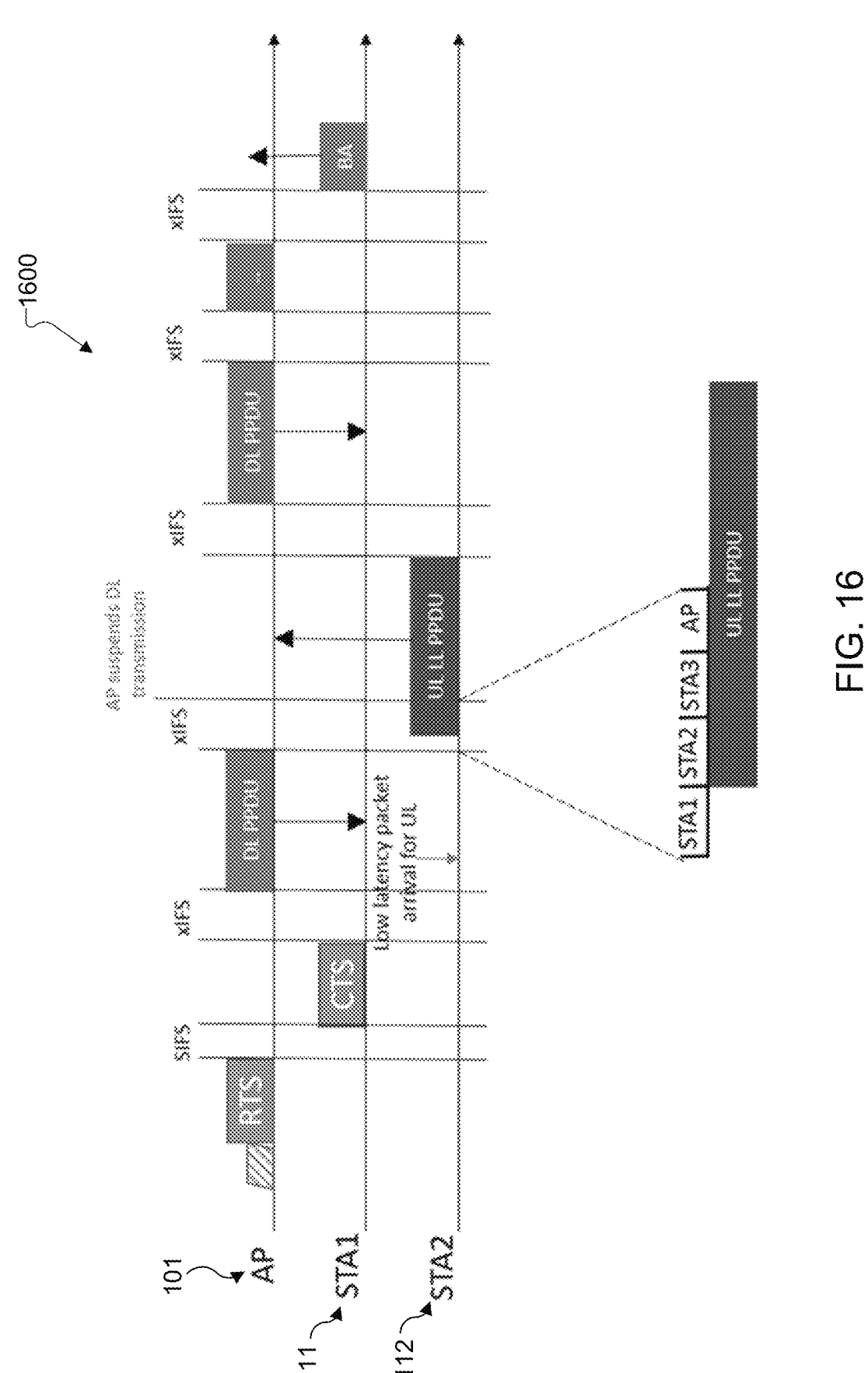
FIG. 16 illustrates a timing diagram with an example of a slotted xIFS based channel access procedure according to embodiments of the present disclosure.

FIG. 16 illustrates a timing diagram 1600 with an example of a slotted xIFS based channel access procedure according to embodiments of the present disclosure. As illustrated in FIG. 16, each slot can be assigned to one device (STA or AP) for the purpose of preemption. A STA can initiate a UL LL PPDU transmission within its assigned slot provided that another STA that was assigned an earlier slot has not already started a transmission.

In the example of FIG. 16, the xIFS gap is divided into four slots. Each slot is assigned to one STA/AP. As shown, the slots are assigned to STA1, STA2, STA3, and AP in that order. During the first slot, assigned to STA1, STA1 does not have any UL PPDU to transmit. Therefore, it relinquishes its slot and the slot remains empty. During the second slot which is assigned to STA2, STA2 has a LL UL PPDU and it initiates transmission when its slot begins. STA3 detects the transmission of STA2 on the channel (e.g., via energy detection) and defers its transmission. The same for the AP which is assigned slot four. After the xIFS gap is over, the AP suspends the DL PPDU transmission as it senses STA2's LL UL PPDU transmission.

According to one embodiment, the AP can assign xIFS slots to STAs and STAs can follow the order that is assigned by the AP. The AP can consider a number of factors for assigning slots. For example, the AP can consider factors such as the latency tolerance of a STA's traffic and how that compares with the latency tolerance of other STAs that are also being considered for slot assignment, which traffic can be transmitted in an assigned slot by a STA, etc.

The AP can have many STAs associated with it and the AP may not be able to give all of them a slot in the xIFS gap, as the gap may not be long enough to support that many slots. To address this, the AP can create a sequence of STAs that need a preemption opportunity, e.g., all STAs with LL traffic latency bound below a certain threshold. Both AP and STAs can be made aware of this sequence with the STA ordering information. The AP can achieve this by transmitting a frame to the STAs that can contain one or more of the information items as described in Table 4.

TABLE 4

| Information item | Description |
| --- | --- |
| STA sequence information | An information item that describes the sequence in which the STAs have been arranged. E.g., a list of STA AIDs, MAC addresses, etc. |
| Duration | The duration of time for which this sequence can be considered as valid. E.g., time as specified in TBTT, TU, etc. |

The above information can be transmitted by the AP to the STAs in an independent frame or in any of the frames in the standard (e.g., beacons).

According to one embodiment, for each xIFS, whichever STA used its slot in the previous xIFS (either used the slot and transmitted or relinquished its slot) can be replaced by a STA that has not been assigned a slot yet. The algorithm for choosing the next STA and the updated order can be the same on the AP and the STA side. Thus, the AP does not need to signal the STA prior to the next xIFS gap about which STA has been added to the xIFS slot assignment and its assigned position.

Figure 17:
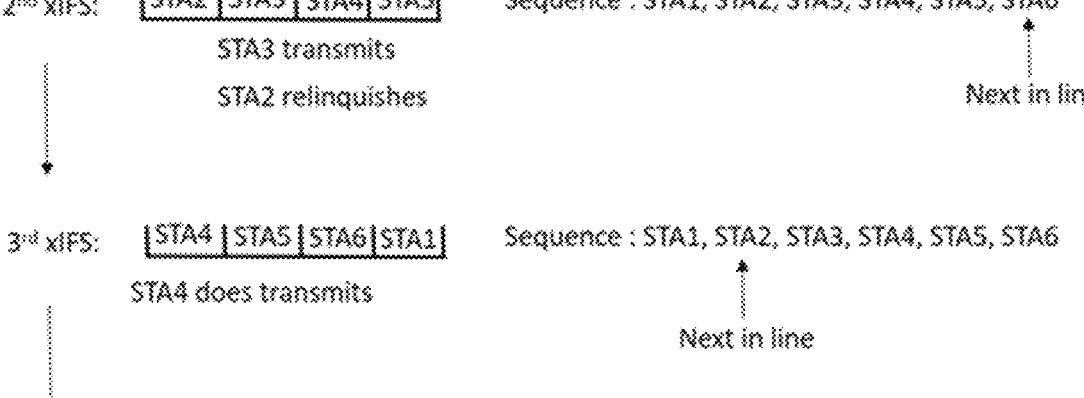
FIG. 17 illustrates an example procedure for xIFS slot assignment according to embodiments of the present disclosure.

FIG. 17 illustrates an example procedure 1700 for xIFS slot assignment according to embodiments of the present disclosure. As illustrated in FIG. 17, the AP creates a sequence of STAs in the following order: STA1, STA2, STA3, STA4, STA5, STA6. In the first xIFS gap, the slots are assigned to STA1, STA2, STA3 and STA4. In this slot, STA1 transmits. Thus, the first slot is used for starting the transmission of LL UL PPDU of STA1. In the second xIFS gap, the first slot can now be filled in with an STA that has not had an opportunity to transmit. The next STA in the sequence which are STA2-4 can be shifted one slot up leaving a slot for STA5 to take at the end.

In the second xIFS gap, STA2 relinquishes its slot as it does not have an LL UL PPDU. STA3 then uses the assigned slot to start its transmission. Thus, two more STAs can be assigned slots for the third xIFS gap. STA4 and STA5 are moved one slot up and STA6 is assigned a slot. As there are no more STAs in the sequence that have yet to be assigned a slot, the assignment can restart from the beginning, and STA1 is given a slot that is available at the end for the third xIFS gap.

In the third xIFS gap, STA4 does not transmit. Thus, in the fourth xIFS gap, the order is STA5, STA6, STA1 and STA2.

According to one embodiment, the AP can either start the sequence from the beginning in each TXOP or it can continue from where it left off in the last TXOP. The STAs can either be informed by the AP about its choice, or it can be mandated that the sequence needs to be started from the beginning in each TXOP and thus STA implementation can consider this behavior and calculate the next slot assignment without notification from the AP.

According to some embodiments, each STA can be assigned a slot as per the sequence decided by the AP, and if a STA relinquishes its slot, it needs to wait until its turn comes again. This may be referred to as a one-time assignment.

According to other embodiments, a reserved slot assignment may be given to STAs. For example, one or more of the STAs can have a very low latency requirement. If the AP has many STAs that can have LL UL/DL traffic, it is possible that such STAs can easily miss an assigned slot (e.g., due to not having a UL PPDU at the time its assigned turn comes, but having a UL PPDU arrive after the turn has passed) and by the time they are assigned another slot in one of the xIFS, the TXOP can be over. To address such a situation, the AP can keep one of the slots reserved for such STAs. In one example case, there are four STAs that need to be assigned slots-STA1, STA2, STA3 and STA4—and the latency tolerance for STA1 is 5 ms, for STA2, STA3 and STA4 is 30 ms, and the AP's TXOP is 3 ms long. Now if STA1 does not have a UL LL PPDU when its turn comes but has a UL PPDU at a later point in time in the same TXOP when it no longer gets a turn, this can result in a large degradation of performance for STA1. In comparison, the performance degradation may not be so large for the other STAs that have relatively longer latency tolerance. To address this, the AP can keep a few slots reserved for such STAs in one or more xIFS.

Figure 18:
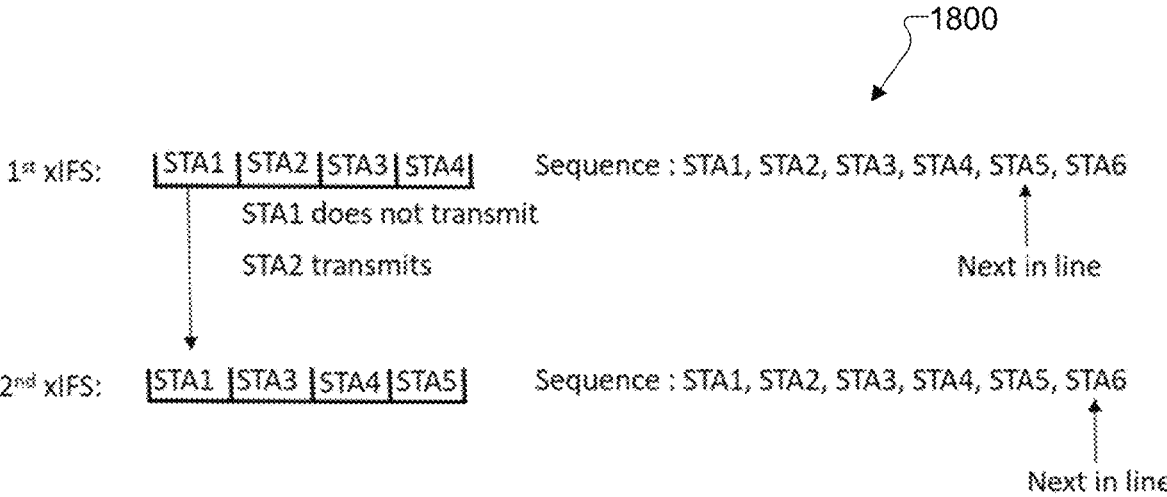
FIG. 18 illustrates an example procedure for xIFS slot assignment with reserved slots according to embodiments of the present disclosure.

FIG. 18 illustrates an example procedure 1800 for xIFS slot assignment with reserved slots according to embodiments of the present disclosure. In this example, the AP can keep the first slot reserved for STAs such as STA1 discussed above. Thus, in each xIFS gap, STA1 will get a channel access opportunity and only if it does not have a UL PPDU will other STAs be considered.

The AP can also reserve slots based on other criteria (e.g., some STAs can have emergency preparedness communication services (EPCS) traffic). The AP can convey the reserved slots and which STAs those slots are reserved for in advance. The AP can transmit a frame containing one or more of the information items indicated in Table 5 below to convey this information to the STAs.

TABLE 5

| Information item | Description |
|---|---|
| Slot and STA identifier | An information item that describes the reserved slots and the STAs for whom the slots are reserved. E.g., this can be a tuple of slot index and STA identifier such as AID. Thus, the STAs can know which STA this slot is reserved for. |
| Duration | The duration of time for which this reservation can be considered as valid. E.g., time as specified in TBTT, TU, etc. |

The AP can also advertise this information in beacons that it transmits so that the STAs know the sequence on their end.

According to another embodiment, the STA can also request a slot reservation by transmitting a request frame to the AP. Upon receiving the frame, the AP can send the above frame as a response frame. The request frame transmitted by the STA to the AP can contain at least one or more of the information items indicated in Table 6 below.

TABLE 6

| Information item | Description |
|---|---|
| STA identifier | An information item that describes the identification of the STA making the request. E.g., AID, MAC address, etc. |
| Slot index requested | The slot index that is request by the STA. E.g., an integer that can indicate the index of the slot that the STA is requesting for. |
| Duration | The duration for which the above reservation is being requested. E.g., time as specified in TBTT, TU, etc. |

The above information items can be included in independent frames or in any of the frames existing in the standard.

According to some embodiments, the AP can reserve the first slot in each xIFS for itself in order to be able to take control of the TXOP when needed. If the AP has the first slot reserved for itself, then the AP can use that slot to initiate the transmission of the DL PPDU and take back the control of the TXOP. According to other embodiments, instead of keeping an xIFS gap, the AP can keep a SIFS gap and start its DL PPDU transmission. According to this embodiment, the value of SIFS can be included in the $T_{margin}$ when computing the number of slots.

According to one embodiment, the STAs can seek membership for being assigned the slots in the xIFS gap. According to this embodiment, the STA can transmit a request frame to the AP to request this information. The request frame can contain one or more of the information items indicated in Table 7.

TABLE 7

| Information items | Description |
| --- | --- |
| STA identifier | An information item to indicate the STA's identification. E.g., the AID of the STA, MAC address, etc. |
| Preferred slot index | The slot index that the STA is requesting. E.g., an integer value that is set to the index of the preferred slot. |
| Duration | The duration for which the membership is being requested. E.g., time indicated in terms of TBTT, TU, etc. |
| Traffic information | An information item to indicate the traffic type for which this slot is being requested. E.g., this can be the TID, SCSID, etc. |
| Token | A token to indicate the request being made by the STA. The AP can include the same token in the response frame so that the STA knows that the response corresponds to the request frame. |
| Reason code | The reason for sending this frame. E.g., there can be a reason code that indicates that the STA is sending this frame for requesting STA's membership. |

When the AP receives the membership request from the STA, the AP can determine if it can provide membership to the STA, and transmit a response to the STA. The response frame can contain one or more of the information items indicated in Table 8.

TABLE 8

| Information items | Description |
| --- | --- |
| STA identifier | An information item to indicate the STA's identification. E.g., the AID of the STA, MAC address, etc. |
| Token | Same token value that was in the STA's request frame. |
| Duration | The duration for which the membership can be considered as valid. The STA can make another request after the duration is over. |
| Preferred slot index if granted | If AP was able to provide the preferred slot index to the STA, then AP can provide an indication. E.g., AP can indicate the slot index that was granted to the STA. |
| STA sequence | The sequence that the AP is using for slot assignment. STA can use the same sequence to compute when its turn would come. |

The above information can be transmitted in an independent frame or in any frame in the standard.

Either the STA or the AP can also make a request for tearing down the setup with the AP. When the STA makes a teardown request, it can transmit a teardown request frame containing one or more of the information items in Table 7 with an indication in the reason code that the frame is being transmitted for teardown. The AP can also send an unsolicited teardown frame to the STA to tear down the setup.

According to one embodiment during MLO, the setup and tear down can be performed on the same link on which the slot in the xIFS will be assigned. For example, if the AP MLD and a non-AP MLD have three links setup—link1, link2 and link3—and if the setup is for xIFS slot on link1, then the request and teardown frames can be transmitted on link1 itself.

According to another embodiment during MLO, the setup and teardown can be performed in a cross link manner. Thus, in the above example, for setup the non-AP MLD can transmit the setup request frame on link1 for setup on one or more of the links setup with the AP MLD. For example, the non-AP MLD can transmit a frame on link 1 carrying a setup request for all the other links as well. In this case, each link's request frame can be tagged with the link ID for that link. Thus, the AP MLD knows from the link ID which the request corresponds to. The same can be done for the AP's response and for teardown procedures.

Figure 19:
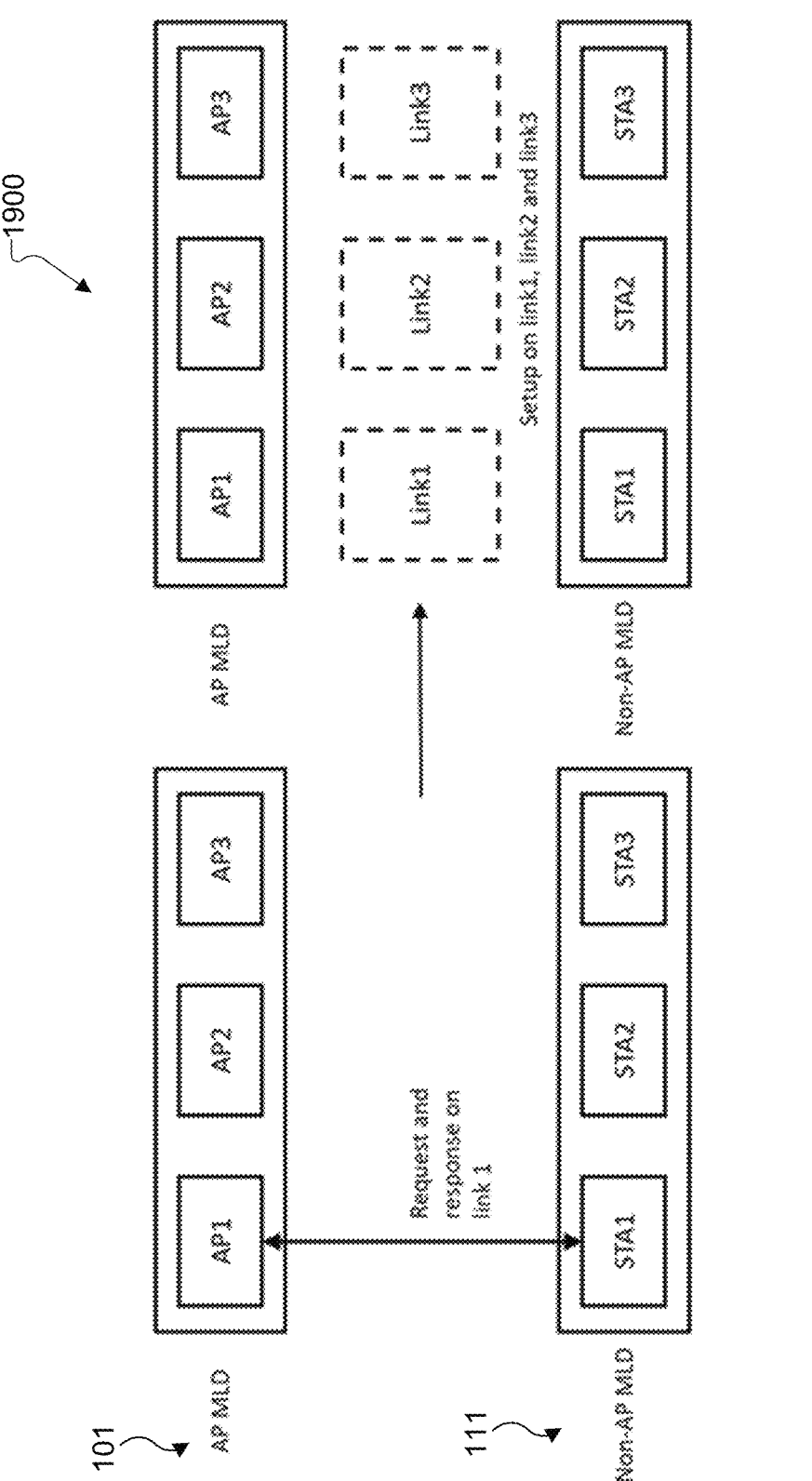
FIG. 19 illustrates an example cross link procedure to setup membership for slotted xIFS channel access during MLO according to embodiments of the present disclosure.

FIG. 19 illustrates an example cross link procedure 1900 to setup membership for slotted xIFS channel access during MLO according to embodiments of the present disclosure.

According to one embodiment, after the AP assigns the sequence that will be used for xIFS slot assignment, the AP can inform the STA about the sequence so that the STA can use the sequence for computing the slot which will be assigned to it. According to this embodiment, the frame can contain one or more of the information items as indicated in Table 9.

TABLE 9

| Information item | Description |
| --- | --- |
| Slot sequence number | An information item that describes the sequence of the STAs to be considered for slot assignment. E.g., a list that provides the sequence by provides a sequence of AIDs, MAC addresses, etc. |
| Duration | An information item that describes the duration for which the slot sequence numbering is considered as valid. E.g., time indicated as TBTT, TU, etc. |
| Link identifier | An information item that describes the link for which this information corresponds to. E.g., the link ID |
| xIFS value | An information item that describes the value of xIFS. Alternatively, this can also be fixed in the standard. |
| K value | An information item that describes the value of K in the equation described in this disclosure to specify the number of slots. |
| $X_{slot}$ | Value of the slot duration that is being used in the xIFS gap. |
| $T_{margin}$ | Value of $T_{margin}$ |

The above information can be transmitted by the AP to the STA in an independent frame or in any of the frames existing in the standard (e.g., Beacons).

An AP that supports the slotted xIFS procedure described in this disclosure can advertise this capability so that STAs with LL traffic can prepare accordingly and participate in any of the procedures described in this disclosure. The AP can make an indication in one or more frames that it transmits to the STA (e.g., management frames such as beacons).

Figure 20:
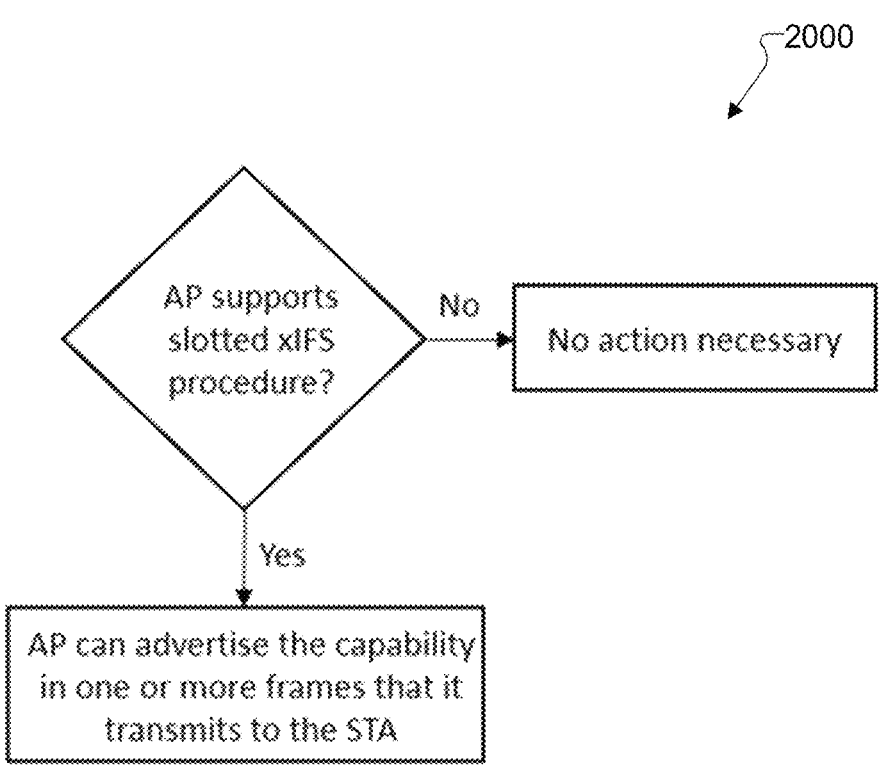
FIG. 20 illustrates an example procedure performed by an AP to advertise support for the slotted xIFS channel access procedure according to embodiments of the present disclosure.

FIG. 20 illustrates an example procedure 2000 performed by an AP to advertise support for the slotted xIFS channel access procedure according to embodiments of the present disclosure.

According to another embodiment, if a STA supports the slotted xIFS procedure described in this disclosure, then the STA can advertise this information to the AP in one or more frames transmitted to the AP. This frame can be a new frame or any of the existing frames in the standard (e.g., management frames such as probe responses). When the AP receives such frames from the STA, the AP can understand the STA's capability and initiate procedures described in this disclosure.

Figure 21:
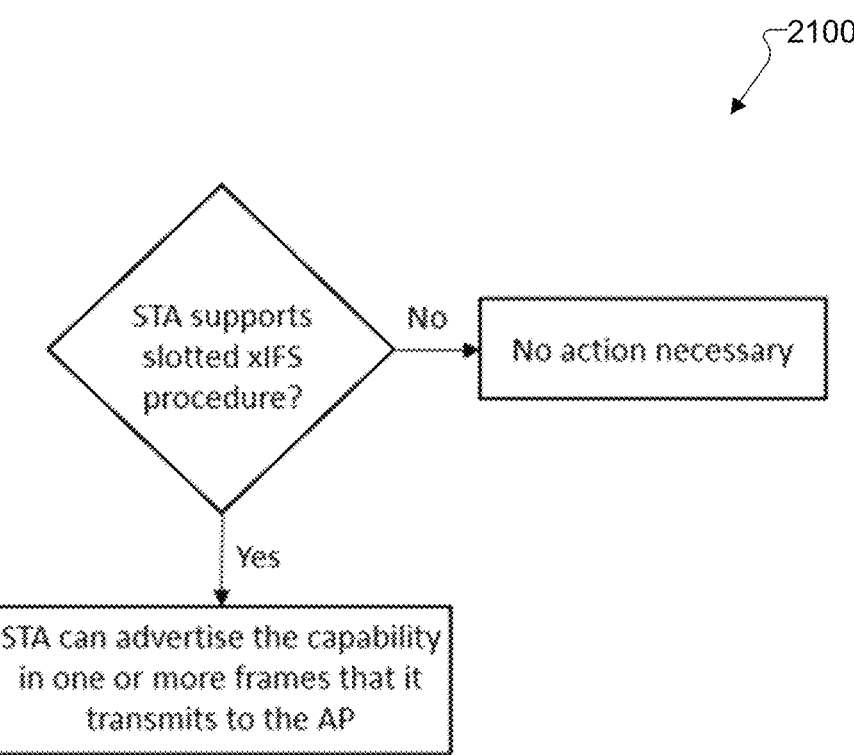
FIG. 21 illustrates an example procedure performed by a STA to advertise support for the slotted xIFS channel access procedure according to embodiments of the present disclosure.

FIG. 21 illustrates an example procedure 2100 performed by a STA to advertise support for the slotted xIFS channel access procedure according to embodiments of the present disclosure.

According to one embodiment, a contention based procedure can be considered for channel access for preemption during the xIFS duration. The contention procedure can occur with a reduced slot duration or with a reduced slot count. For instance, either a slot duration shorter than that for normal channel access can be used or the maximum contention window size for the slot can be reduced—e.g., the maximum number of slot count can be reduced to 2-3 for the first round of contention.

When the STA performs contention with a reduced slot count, the contention can be limited to that TXOP only and contention parameters can either be reset or set to their original values before the TXOP starts. For instance, if STAs contend for channel access in the first xIFS gap and a STA does not win the channel within the xIFS gap, then in the next gap, that STA can continue its contention again. However, at the end of the TXOP, that STA can reset its contention parameters to what they were prior to when the TXOP started. Thus, the MAC state machine of the STA can fall back to the original state prior to the start of the TXOP.

According to one embodiment, a STA can provide an indication that it has traffic to send to secure channel access for preemption. The STA can transmit such an indication message during an xIFS gap and then begin transmitting a UL LL PPDU after the xIFS gap. The indication message can contain one or more of the information items as indicated in Table 10.

TABLE 10

| Indication message | Description |
| --- | --- |
| Duration information | An information item that can provide information on the duration of the LL PPDU transmission. E.g., duration field. |
| STA identifier | An information item that can serve as an identifier for the STA. E.g., STA MAC address. |
| Traffic information | An information item that can provide an indication of the traffic type that can be transmitted in the gap. E.g., TID, AC, etc. |
| Timing information | An information item that can provide timing information about the transmission. E.g., expiration timer, enqueue time, etc. |

Figure 22:
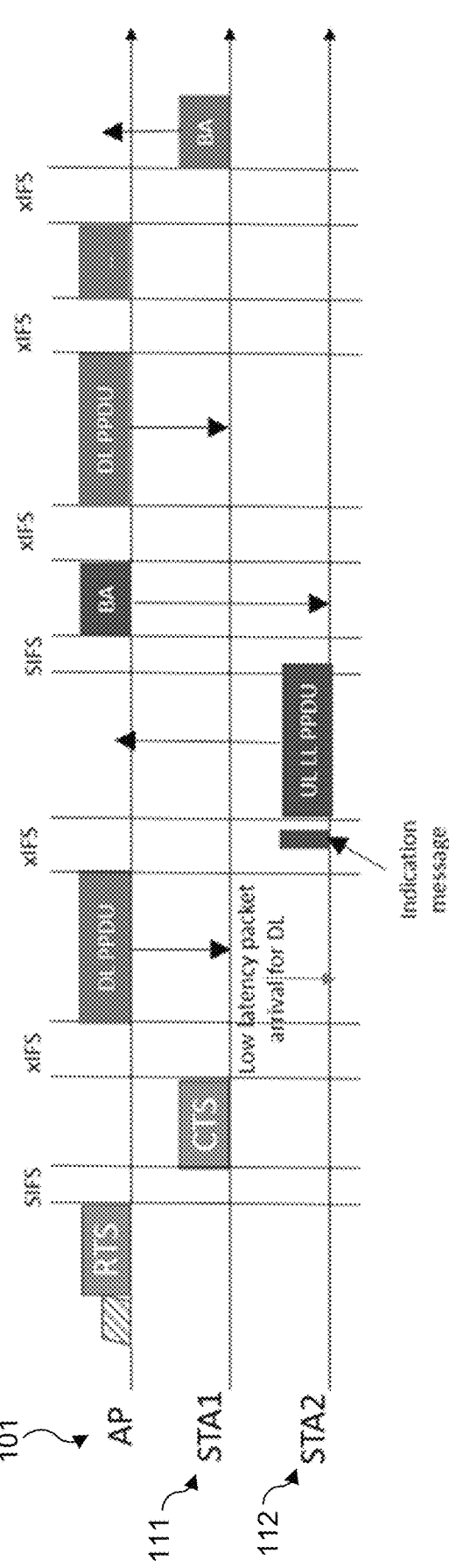
FIG. 22 illustrates a timing diagram with an example of a STA sending an indication message in a slotted xIFS based channel access procedure according to embodiments of the present disclosure.

FIG. 22 illustrates a timing diagram 2200 with an example of a STA sending an indication message in a slotted xIFS based channel access procedure according to embodiments of the present disclosure.

According to one embodiment, a blocking based mechanism can be followed to obstruct other STAs from transmitting in the xIFS gap. The blocking based procedure can comprise transmission of a message that can set a state at the legacy STAs that prevent them from contending in the gap (e.g., a state corresponding to extended inter frame spacing (EIFS)). This can prevent legacy STAs from contending in the xIFS gap so that only UHR STAs can contend.

FIG. 23 illustrates a timing diagram 2300 with an example of a STA sending a blocking message in a slotted xIFS based channel access procedure according to embodiments of the present disclosure.

According to one embodiment, all LL STAs can transmit backlog information in orthogonal frequency blocks at the same time during a gap after a DL PPDU transmitted by the AP. Following this, the AP can trigger STAs to transmit (e.g., by sending a trigger frame) and the triggered STAs can send their LL PPDUs.

FIG. 24 illustrates a timing diagram 2400 with an example of a frequency division based triggered channel access procedure according to embodiments of the present disclosure. In this example, STA2 and STA3 each send backlog information during an xIFS gap and the AP triggers STA2 to transmit after the xIFS gap. In other embodiments, the AP may trigger multiple STAs sequentially.

The above procedures can be used for any kind of interframe spacing/gap based preemption procedure.

According to one embodiment, the AP can define a target wake time (TWT)-like schedule within a TXOP. This TWT-like schedule can be short lived—e.g., its duration can be the duration of one TXOP. This procedure can be called a Micro-TWT. According to one embodiment, the AP can use a Micro-TWT schedule with the preemption procedure to support STAs with low LL traffic in TXOPs that are to be used for a large DL PPDU transmission.

FIG. 25 illustrates an example procedure 2500 performed by an AP to set up a Micro-TWT procedure according to embodiments of the present disclosure.

FIG. 26 illustrates a timing diagram 2600 with an example of a Micro-TWT operation according to embodiments of the present disclosure. As illustrated in FIG. 26, a Micro-TWT schedule can have alternating doze and service period (SP) states. In the doze state, the STAs for which the DL PPDU is not intended can perform power save actions (e.g., sleep). During the micro-TWT SP, the STA with LL traffic can transmit. The Micro-TWT schedule functions as a preemption procedure, since the AP divides its large DL PPDU into smaller PPDUs and each small DL PPDU is transmitted during the doze state of the LL STA-STA2 in FIG. 26. During the SP duration, the AP does not transmit any of the small DL PPDUs, and instead the SP duration is used for transmission of LL PPDUs.

According to one embodiment, a STA that intends to participate in Micro-TWT operations can send a Micro-TWT request to the scheduling AP.

FIG. 27 illustrates an example procedure 2700 performed by a STA to request set up of a Micro-TWT procedure according to embodiments of the present disclosure. The Micro-TWT request can contain one or more of the information items indicated in Table 11.

TABLE 11

| Information item | Description |
|---|---|
| Request ID | An information item that can be used to reference the request sent by the STA. This can be a token (e.g., a numerical value) which can be used by the STA when referring to this request in future communication/negotiations with the AP. The AP can also include this same ID in the response frame when it transmits one to the STA. Thus, the STA can know which request it refers to. |
| Service period duration info | An information item that indicates to the AP how much SP duration will be needed by the STA in a Micro-TWT schedule. E.g., the STA can indicate the SP duration itself or can indicate the expected airtime of the PPDUs that it intends to transmit in the SP. |
| Doze period duration info | An information item that indicates to the AP how much doze period the STA can tolerate. E.g., the STA can determine the doze period based on its own latency and power requirements. |
| Traffic info | An information item that describes the traffic stream whose PPDU will be transmitted in the SP. The STA can either provide an SCSID if the STA has performed SCS request and response for that particular traffic stream and the AP can use the corresponding QoS characteristic element to get the information. Alternatively, STA can provide required information about the traffic stream to the AP. E.g., the latency requirements, indication if the traffic stream is periodic or aperiodic, if periodic the periodicity of the traffic stream, etc. |
| Negotiation type | An information item to indicate the negotiation type for the request frame. E.g., if the request frame is of type suggest or demand. |
| Duration | An information item to indicate the duration for which this request can be considered as valid. For this duration of time, the STA does not need to send the request again and AP can assume that the current request is valid and restart the Micro-TWT session in each TXOP that is eligible. E.g., this duration can be in terms of TBTT or TU. |
| Direction | The direction of the traffic for which this assignment corresponds to. E.g., downlink, uplink. |
| Micro-TWT type | An information item to indicate the type of micro-TWT that the STA is sending this request for (The types of Micro-TWT are discussed in the sections that follow). E.g., this can be an integer value with a fixed value used to refer to each Micro-TWT type. |

The above information can be transmitted in an independent frame or in any of the existing frames in the standard.

Upon receiving the above information, the AP can transmit a response frame to the STA.

FIG. 28 illustrates an example procedure 2800 performed by an AP to respond to a request for set up of a Micro-TWT procedure according to embodiments of the present disclosure. The response frame can contain one or more of the information items described in Table 12.

TABLE 12

| Information item | Description |
|---|---|
| Request ID | The AP can use the request ID from the STA's request frame described in the previous table. Thus, the STA can know which request the AP is referring to. |
| Service period duration info | An information item that indicates to the STA how much SP duration is assigned by the AP to the STA in a Micro-TWT schedule. E.g., the STA can indicate the SP duration itself or can indicate the expected airtime of the PPDUs that it intends to transmit in the SP. |
| Negotiation type | An information item to indicate the negotiation type for the request frame. E.g., if the request frame is of type suggest or demand. |
| Duration | An information item to indicate the duration for which this request can be considered as valid. For this duration of time, the STA does not need to send the request again and AP can assume that the current request is valid. E.g., this duration can be in terms of TBTT or TU. |
| Direction | The direction of the traffic for which this assignment corresponds to. E.g., downlink, uplink. |
| Micro-TWT type | An information item to indicate the type of micro-TWT that the STA is sending this request for (The types of Micro-TWT are discussed in the sections that follow). E.g., this can be an integer value with a fixed value used to refer to each Micro-TWT type. |

The above information can be transmitted in an independent frame or in any of the existing frames in the standard.

The AP can also send an unsolicited response frame to the STA and setup the Micro-TWT for the STA. For example, if the AP assesses that the STA is facing poor latency performance, then the AP can send an unsolicited Micro-TWT response frame and setup Micro-TWT for the STA.

The Micro-TWT setup can be torn down from the AP side or the STA side. If torn down from the AP-side, the AP can transmit a teardown frame to the STA to inform the STA that the setup has been torn down.

FIG. 29 illustrates an example procedure 2900 performed by an AP to tear down Micro-TWT according to embodiments of the present disclosure. The frame transmitted by the AP to the STA for teardown can contain one or more of the information items as indicated in Table 13.

TABLE 13

| Information item | Description |
|---|---|
| Request ID | A reference for what is being torn down. The same request ID as the one from setup phase can be used. |
| Teardown time | An information item that can indicate when the Micro-TWT setup can be torn down. E.g., the time in terms of TBTT or TU after which the setup can be torn down. |
| STA identifier(s) | An information item that can indicate the STA(s) for whom this teardown frame is being transmitted. AP can teardown the setup for multiple STAs at the same time. In such a situation, AP can provide a list of the STA identifier information (e.g., STA MAC address). When AP teardowns the setup for multiple STAs, the AP can include a request ID list instead of a single request ID in the teardown frame. |

The above information can be transmitted in an independent frame or in any of the existing frames in the standard.

If the setup is torn down from the STA side, the STA can transmit a teardown frame to the AP to inform the AP that it wants to teardown the Micro-TWT setup. Upon receiving the teardown frame, the AP can either teardown on its own or can transmit an acknowledgement of the teardown request frame received from the STA.

FIG. 30 illustrates an example procedure 3000 performed by a STA to tear down Micro-TWT according to embodiments of the present disclosure.

According to one embodiment, during MLO, the Micro-TWT session can be setup in a cross link or multi-link manner.

FIG. 31 illustrates an example cross link procedure 3100 to setup a Micro-TWT session during MLO according to embodiments of the present disclosure. As illustrated in FIG. 31, there is an AP MLD with three AP STAs affiliated with it—AP1, AP2 and AP3. A non-AP MLD is associated with the AP MLD and has three non-AP STAs affiliated with it—STA1, STA2 and STA3. If a Micro-TWT setup needs to be established on link 2, then the request and response can be carried out on link 1. In such a case, an additional link ID indicator field can be present in the request and response frames. The link ID can indicate the link for which the request and response frames are being transmitted.

FIG. 32 illustrates an example multi-link procedure 3200 to setup a Micro-TWT session during MLO according to embodiments of the present disclosure. As illustrated in FIG. 32, a Micro-TWT agreement on one link can be used to establish a Micro-TWT agreement on all the links of the MLD. To setup the Micro-TWT in a multi-link manner, each of the per link Micro-TWT agreements can be tagged with the corresponding link's link ID (either by using a link ID field or by having a link ID bitmap which indicates the links and ordering the setup information for each link in the same manner as indicated in the link ID bitmap). One or more than one Micro-TWT setup request/response frame can be grouped together and exchanged between the AP and the STA.

Micro-TWT teardown can also be carried out in a cross-link or multi-link manner.

The above information can be transmitted in an independent frame or in any of the existing frames in the standard.

According to one embodiment, the Micro-TWT SPs can be assigned to specific STAs. According to this embodiment, the SPs can be assigned based on a notification from the STA (described further below) or based on the AP's knowledge of the STA's traffic characteristics (e.g., whether the STA's traffic is periodic). Each SP can be assigned to a STA. The AP can assign the SP to the STA in an announcement frame transmitted to the STAs beforehand or at the start of the SP. Alternatively, the AP can send one announcement frame at the start of the first SP to announce the assignment for all the subsequent SPs in that TXOP. The announcement frame can contain one or more of the information items that are indicated in Table 14.

TABLE 14

| Information item | Description |
|---|---|
| SP information | An information item that indicates which SP the AP is referring to. E.g., this can be an SP index. In this example, the AP can assign numbers to each SP and a number for which SP the AP is referring to can be indicated. This can also be a list of SPs instead of a single SP reference. |
| STA information | An information item that indicates which STA has been assigned which SP. E.g., the STA's MAC address. This can also be a list of STA instead of a single STA reference. According to one embodiment, the STA information can be arranged in the same manner as the SP information list so there can be a one to one correspondence. |
| Direction | The direction of the traffic for which this assignment corresponds to. E.g., downlink, uplink. |
| Announcement type | An information item to indicate the type of announcement. E.g., if the AP is modifying a previous announced assignment. |
| SP, STA, direction map | A map that indicates which SP is assigned to which STA. For example, this can be a list of tuples in which the STAs mapped to each SP can be indicated and the direction can also be indicated. |
| Duration | The duration for which this assignment can be considered as valid. E.g., this can be a time duration indicated in terms of TBTT or TUs. |
| Micro-TWT Type indicator | An indicator of which type of Micro-TWT this announcement is referring to. E.g., an integer value that can take a certain predetermined value for assignment based Micro-TWT type indication. |

The above information can be transmitted in an independent frame or in any of the existing frames in the standard.

FIG. 33 illustrates a timing diagram 3300 with an example of an assignment based Micro-TWT operation according to embodiments of the present disclosure. As illustrated in FIG. 33, the AP has assigned SP1 to STA2 for LL UL PPDU transmission, SP2 to STA2's DL PPDU transmission and SP3 for STA2's LL UL PPDU transmission. In this example, the announcement frame is sent at the start of SP1 and then not transmitted in the subsequent SPs as the announcement information remains unchanged. In each SP, the STAs can stay awake at the beginning for a period of time long enough to receive the announcement frame, until they hear another STA's transmission start, or until a timeout period expires. After this period the STA can go to doze state.

According to another embodiment, the Micro-TWT can be trigger based. According to this embodiment, in each SP the AP can trigger a STA for transmission or can transmit a frame to a particular STA on the downlink. Other STAs that don't get triggered or receive a DL PPDU can go to doze state to save power. The AP can also trigger multiple STAs in a single trigger frame by transmitting one trigger frame that carries information of the STAs and the sequence in which they should transmit.

FIG. 34 illustrates a timing diagram 3400 with an example of a trigger based Micro-TWT operation according to embodiments of the present disclosure. As illustrated in FIG. 34, in the first SP the AP sends a trigger frame to STA2 for UL PPDU transmission. In the second SP, the AP sends a DL PPDU to STA2. In the third SP, STA2 is triggered for UL PPDU transmission again. Meanwhile, STA1 may go to doze state in each SP. The trigger frame can be any trigger frame in the standard or an independent trigger frame.

The STA can also notify the AP when a packet arrives at the STA based on notification methods described further below, and the AP can use this information to either assign or modify an assignment of an SP.

According to another embodiment, the Micro-TWT can be contention based. In contention based Micro-TWT, the AP can assign each SP to one or more STAs—e.g., if there are 4 STAs that need to be assigned an SP, then 2 STAs can be assigned to SP1 and 2 STAs to SP2. The AP can decide the grouping based on a number of factors (e.g., latency tolerance, traffic urgency, traffic periodicity, etc.). A STA can also be assigned to more than one SP and can participate in contention in more than one SP.

FIG. 35 illustrates a timing diagram 3500 with an example of a contention based Micro-TWT operation according to embodiments of the present disclosure. As illustrated in FIG. 35, at the start of the first SP, the AP can send an announcement that can contain the information about which STAs have been assigned that SP (and possibly also the following SPs). The announcement frame can contain one or more of the information items as indicated in Table 15.

TABLE 15

| Information item | Description |
| --- | --- |
| SP information | An information item that indicates which SP the AP is referring to. E.g., this can be an SP index. In this example, the AP can assign numbers to each SP and a number for which SP the AP is referring to can be indicated. This can also be a list of SPs instead of a single SP reference. |
| STA information | An information item that indicates which STA(s) has been assigned which SP. E.g., the STA's MAC address. This can also be a list of STA instead of a single STA reference. According to one embodiment, the STA information can be arranged in the same manner as the SP information list so there can be a one to one correspondence. |
| Direction | The direction of the traffic for which this assignment corresponds to. E.g., downlink, uplink. |
| Announcement type | An information item to indicate the type of announcement. E.g., if the AP is modifying a previous announced assignment. |
| SP, STA, direction map | A map that indicates which SP is assigned to which STA. For example, this can be a list of tuples in which the STAs mapped to each SP can be indicated and the direction can also be indicated. |
| Duration | The duration for which this assignment can be considered as valid. E.g., this can be a time duration indicated in terms of TBTT or TUs. |
| Micro-TWT Type indicator | An indicator of which type of Micro-TWT this announcement is referring to. E.g., an integer value that can take a certain predetermined value for contention based Micro-TWT type indication. |

The above information can be transmitted in an independent frame or in any of the existing frames in the standard.

STAs that have not been assigned a particular SP can go to doze state for that SP as well. The other STAs can contend. The STAs that contend can ignore the NAV timer set for the TXOP and can either continue their contention or start a fresh contention for that Micro-TWT SP.

According to another embodiment, the Micro-TWT can be a hybrid Micro-TWT. In this type of Micro-TWT, each SP can correspond to a different flavor of Micro-TWT (e.g., contention based, assignment based, trigger based, etc.).

FIG. 36 illustrates a timing diagram 3600 with an example of a hybrid Micro-TWT operation according to embodiments of the present disclosure. As illustrated in FIG. 36, the first and second SPs are assignment based whereas the third SP is contention based. Each SP can follow the rules of the Micro-TWT type that is to be used for that SP.

The AP can also use different versions of Micro-TWT in each TXOP.

FIG. 37 illustrates a timing diagram 3700 with an example of multiple TXOPs using different Micro-TWT operations according to embodiments of the present disclosure. As illustrated in FIG. 37, in a first TXOP the AP can use assignment based Micro-TWT, in a second TXOP it can use contention based Micro-TWT and in a third TXOP it can use hybrid Micro-TWT.

According to one embodiment, a STA can provide information to the AP about its LL traffic stream for the purpose of Micro-TWT According to this embodiment, the STA can transmit a frame to the AP containing information about the traffic characteristics. This frame can contain one or more of the information items specified in Table 16.

TABLE 16

| Information item | Description |
| --- | --- |
| Stream identifier | An identifier that can be used by the STA to refer to a particular stream. E.g., this can be an alphanumeric value that can indicate the stream id. |
| Traffic pattern info | An indication on whether the traffic is periodic or aperiodic. E.g., this can be a bit that is set to 1 to indicate that the traffic stream is periodic and set to 0 if it is not periodic. |
| Periodicity | Information related to the periodicity of the traffic stream. This information can enable the AP to make an estimate on the LL packet arrival for the STA. |
| Traffic characteristics | Information related to the characteristics of the traffic stream. E.g., mean arrival rate, packet size, burst length, etc. |

The above information can be transmitted by the STA to the AP in an independent frame or in any of the frames existing in the standard (e.g., SCS request and response frames with QoS characteristic element).

FIG. 38 illustrates an example procedure 3800 performed by a STA to transmit traffic information for assisting the AP with Micro-TWT scheduling according to embodiments of the present disclosure. As illustrated in FIG. 38, the STA can transmit a frame containing one or more of the information items described above to the AP. The STA can transmit this information on its own or when requested by the AP.

The AP can receive a frame containing one or more of the above information items from the STA based on a request made by the AP or when transmitted by the STA on its own. The AP can use this information to assess the approximate or exact packet arrival time or intervals in between for the periodic LL traffic of the STA. This can help the AP to understand if the STA can be expected to have LL traffic packet during a given TXOP.

FIG. 39 illustrates an example procedure 3900 performed by an AP to use traffic information from the STA for Micro-TWT scheduling according to embodiments of the present disclosure.

In the case of event based traffic the nature of the traffic is not periodic. Thus, it is hard for the AP to know beforehand LL traffic packet arrival times for the DL and/or UL. The STA can provide notification to the AP to assist the AP in making that assessment. According to one embodiment, the STA can transmit a frame to the AP containing one or more of the information items described in Table 17.

TABLE 17

| Information item | Description |
|---|---|
| Packet arrival information | Indicates to the AP that STA has event based LL traffic. E.g., packet arrival timestamp or a bit reused from an existing frame and set to 1 to indicate that STA has LL traffic packet. |
| Airtime consumption info | How much airtime STA will need to transmit the packet(s). E.g., number of packets + data rate, overhead for the packets, raw airtime value, etc. This can be useful for AP to determine if STA can be accommodated in a TXOP or not. E.g., if STA's airtime requirement is very large and cannot be covered in this TXOP, AP can skip the STA and instead trigger it outside the TXOP. |
| Explicit Link info indication | The link on which this packet will be transmitted by the STA. AP can provide assign an SP to STA for Micro-TWT operation on that link. Alternatively, STA can make implicit indication by transmitting the info on the link on which it will transmit the packet. |
| TID/AC info | If there are more than one type of TID/AC for which STA has packet arrival. This helps the AP to know that STA may send multiple PPDUs if it does not aggregate multiple TID/AC as a part of a single PPDU. |
| Stream info | If STA has setup SCS for this traffic flow, STA can indicate SCS ID and then AP knows where to get the QoS characteristic information from. |

The above information can be transmitted in an independent frame or in any of the existing frames in the standard.

According to one embodiment, the AP can transmit a probing frame to check if there is any event based LL packet arrival. In the case of MLO operation, the AP MLD can probe the non-AP MLD on any of the links that are setup between the AP MLD and the non-AP MLD. E.g., if a non-AP MLD has three STAs—STA1, STA2 and STA3—which have setup three links—link 1, link 2 and link 3, respectively with AP 1, AP 2 and AP 3 affiliated with an AP MLD-then AP 2/AP 3 affiliated with the AP MLD can transmit the probing frame to STA2/STA3 respectively of the non-AP MLD to help to check for LL packet arrival of STA 1 of the non-AP MLD for participation in Micro-TWT with AP 1 of the AP MLD.

FIG. 40 illustrates an example procedure 4000 performed by an AP to probe the STA for information on event based LL traffic packet arrivals according to embodiments of the present disclosure. The AP can use this information to assess the SP assignment for Micro-TWT.

According to another embodiment, the AP can also receive a frame containing one or more of the information items indicated in Table 17 without probing the STA. The AP can use this information to assess the SP assignment for Micro-TWT.

According to some embodiments, any AP affiliated with an AP MLD can receive the frame for any of the other APs affiliated with the same AP MLD. Based on the above notations for AP and non-AP MLD setup, AP 2 can receive the frame which is meant for AP1.

According to one embodiment, when the STA is probed by the AP, the STA can transmit a frame containing one or more of the information items indicated in Table 17. In the case of MLO operation, any STA affiliated with a non-AP MLD can transmit the frame on behalf of any of the other STAs affiliated with the same non-AP MLD. Furthermore, when probed on one link, a non-AP MLD can transmit the frame to the AP MLD on any of the other links that are set up with the AP MLD.

According to another embodiment, the STA can transmit the frame on its own, without being probed, when an event based LL traffic packet arrives. In the case of MLO operation, any of the STAs affiliated with the non-AP MLD can transmit the frame on behalf of any of the other STAs affiliated with the same non-AP MLD.

FIG. 41 illustrates an example procedure 4100 performed by a STA for event based LL traffic arrival notification to the AP according to embodiments of the present disclosure. The notification step can be performed either prior to the start of the TXOP or after the TXOP begins.

According to some embodiments, an AP that supports Micro-TWT can advertise this capability so that STAs with LL traffic can prepare accordingly. The AP can make an indication in a frame that it transmits to the STA. (e.g., management frames such as beacons). STAs that receive such frames can understand the AP's support for Micro-TWT and can participate in Micro-TWT procedures.

FIG. 42 illustrates an example procedure 4200 performed by an AP to advertise Micro-TWT capabilities to STAs according to embodiments of the present disclosure.

According to another embodiment, if a STA supports Micro-TWT, then the STA can advertise this capability to the AP in one or more frames transmitted to the AP. This frame can be a new frame or any of the existing frames in the standard (e.g., management frames such as probe responses).

FIG. 43 illustrates an example procedure 4300 performed by a STA to advertise Micro-TWT capabilities to the AP according to embodiments of the present disclosure.

According to one embodiment, a Micro-TWT like behavior can also be performed by the AP, wherein the AP does ON/OFF type scheduling instead of SP and Doze states. The STA can doze during the OFF state or perform any other action. The AP can transmit DL PPDU during the OFF state. The remaining procedures can be reused accordingly. The above procedures can also apply to a UL PPDU reception by the AP. When used for UL PPDU reception, UL PPDU reception can occur in place of DL PPDU reception in doze state.

According to another embodiment, AP can divide a TXOP into multiple smaller TXOPs. Each of these smaller TXOPs can be called a Micro-TXOP. Micro-TXOPs can be of two types—(1) a Normal Micro-TXOP which are meant for transmission of a PPDU for non-LL traffic (this PPDU can be downlink or uplink or P2P), or (2) an LL Micro-TXOP which are meant for transmission of an LL PPDU of a STA running an application that generates an LL traffic stream. An LL Micro-TXOP is either negotiated before transmission for periodic traffic, or preempted during a gap and inserted in the next Micro-TXOP for event based traffic.

FIG. 44 illustrates a timing diagram 4400 with an example of a Micro-TXOP operation according to embodiments of the present disclosure. As illustrated in FIG. 44, the AP divides one TXOP into multiple Micro-TXOPs. There can be a pre-determined gap between two Micro-TXOPs which can provide an opportunity for preemption. Each micro-TXOP should be at least smaller than the TXOP obtained by the AP dividing the number of STAs. If there is some remaining portion of the TXOP that is not assigned to any STA, the AP can take over and perform its transmissions in the remaining portion of the TXOP.

According to one embodiment, the AP can announce the order of these TXOPs and the STAs to which they correspond. This can be done via a modified MU-RTS TXS frame.

FIG. 45 illustrates an example frame structure 4500 of a modified MU-RTS TXS frame for Micro-TXOP announcement according to embodiments of the present disclosure. The AP can assign the Micro-TXOPs to various STAs by adding information of each STA's assignment in the user info list field. If the user info list field includes information for more than one user, then the AP can make an indication to the STAs. E.g., the B22 bit in the common info field can be set to 1 if the user info list field includes information for more than one user using Micro-TXOP, otherwise it can be set to 0. The AP can also indicate in a user info field for a particular STA if that STA's Micro-TXOP can be interrupted by another LL STA or not. E.g., the AP can make use of the reserved bits in the user info field and a bit value can be used to make this indication. This bit can be set to 1 if the corresponding Micro-TXOP can be preempted, and 0 if it cannot be preempted.

The gap between the two Micro-TXOPs can be fixed or it can be indicated in the modified MU-RTS TXS frame by using the reserved bits in the user info field. E.g., the AP can use some of the reserved bits B29-B38 to indicate the gap value after that particular Micro-TXOP. For Micro-TXOPs that cannot be preempted, the AP can set the gap duration to zero. The same can be done for the last Micro-TXOP of the TXOP.

As discussed herein above, there can be two types of traffic-periodic and aperiodic. For periodic traffic, the AP already knows the approximate packet arrival times for the STA. The AP can insert LL Micro-TXOPs in a TXOP considering the approximate packet arrival times of LL periodic traffic for a particular STA. The STA can make use of any of the notification procedures described previously for informing the AP about the characteristics of the periodic traffic stream.

When a STA has aperiodic or event based traffic, the gap between two Micro-TXOPs can be used to insert the next LL Micro-TXOP (if the AP has indicated in the MU-RTS TXS frame that the next Micro-TXOP can be interrupted (or preempted), otherwise, a normal Micro-TXOP would be assigned as next). If the LL PPDU is for downlink transmission, i.e., the LL packet arrives at the AP, then the AP can send an interruption frame in the gap between two Micro-TXOPs and prior to a Micro-TXOP that can be interrupted. When the STAs that are scheduled for Micro-TXOPs for that TXOP receive the interruption frame, the next Micro-TXOP can be considered to be interrupted. When the LL PPDU is for uplink transmission at the STA side, the STA can preempt the next Micro-TXOP by sending an interruption frame to the AP.

FIG. 46 illustrates a timing diagram 4600 with an example of a Micro-TXOP interruption with uplink LL PPDU due to aperiodic traffic according to embodiments of the present disclosure. As illustrated in FIG. 45, the TXOP is divided into two Micro-TXOPs—Micro-TXOP1 and Micro-TXOP2. Micro-TXOP1 cannot be preempted and Micro-TXOP2 can be preempted. STA3 receives an event based LL traffic during Micro-TXOP1. In the gap between the two Micro-TXOPs, STA3 transmits an interruption frame to the AP and the AP transmits a confirmation to STA3. Then Micro-TXOP2 is used by STA3 for transmission of a LL UL PPDU to the AP. According to one embodiment, the Micro-TXOP2 can be scheduled to a periodic LL packet, in which case STA3 can wait until the LL Micro-TXOP2 is over, and preempt for the next or last Micro-TXOP if one exists (Micro-TXOP3 for example).

The interruption frame can contain one or more of the information items present in the user info field of the modified MU-RTS TXS frame, or the entire user info field itself. Upon receiving this field, the STAs can update the initial allocation of the AP by inserting the information in the newly transmitted user info field into the original schedule of the AP, and removing one or more Micro-TXOPs from the schedule if the total duration exceeds the TXOP duration.

When a STA receives an MU-RTS TXS frame that indicates a Micro-TXOP based TXOP that has some Micro-TXOPs that can be preempted, and if the STA has event based LL traffic, then the STA can ignore its NAV timer and preempt a Micro-TXOP if necessary.

In some embodiments, the capability advertisement embodiments discussed with respect to FIGS. 42 and 43 can apply to Micro-TXOP capability advertisement as well.

FIG. 47 illustrates an example process 4700 for facilitating channel access for preemption procedures according to various embodiments of the present disclosure. The process 4700 of FIG. 47 is discussed as being performed by a STA, but it is understood that a corresponding AP performs a corresponding process. Additionally, for convenience the process of FIG. 47 is discussed as being performed by a WI-FI STA, however, it is understood that any suitable wireless communication device could perform this process.

Referring to FIG. 47, at step 4705 the STA may determine that low latency traffic for uplink to an AP on a channel has arrived. This may occur, for example, during a TXOP obtained by the AP for the channel. The AP in this case is operating the TXOP according to preemption procedures discussed herein above, such that the AP transmits short DL PPDUs with gaps in between. Alternatively, the low latency traffic could arrive while another STA is accessing the channel (e.g., when another STA has already preempted the channel).

Next, the STA may generate a channel access message that causes the AP to suspend downlink transmissions and/or causes other STAs to avoid accessing the channel (step 4710). In some embodiments, the channel access message includes an indication that the STA has the low latency traffic to send. The channel access message may be a blocking message that causes the other STAs to enter a state that prevents them from contending for access to the channel. The channel access message may include information indicating a backlog status of the low latency traffic of the STA.

The STA then transmits the channel access message during or at the end of an IFS after a transmission from another device (step 4715). The IFS may be an xIFS as discussed herein above. The transmission may be a downlink transmission from the AP, such as a short DL PPDU that is part of a larger DL PPDU. Alternatively, the transmission may be a transmission from another STA (e.g., when another STA has already preempted the channel).

In some embodiments (e.g., when the channel access message is a blocking message) the STA transmits the low latency traffic after transmitting the channel access message.

In some embodiments (e.g., when the channel access message includes a backlog status of the low latency traffic of the STA) the STA transmits the channel access message using a frequency block that is orthogonal to other frequency blocks used by the other STAs to transmit respective channel access messages.

Finally, the STA transmits the low latency traffic to the AP (step 4720).

In some embodiments, the STA receives a trigger frame from the AP in response to the channel access message, and transmits the low latency traffic to the AP in response to the trigger frame.

In some embodiments, the IFS is divided into consecutive time slots and the STA is assigned one of the slots. In some such embodiments, the STA receives, from the AP, STA ordering information that indicates a sequence in which the STA and other STAs are assigned the time slots, and determines, based on a slot assignment algorithm and the STA ordering information, which of the time slots is the one assigned to the STA during the IFS. In some cases, the STA transmits a request to the AP to be included in the sequence, and receives the STA ordering information based on a determination by the AP to include the STA in the sequence.

When the IFS is divided into slots and the STA is assigned a slot, the channel access message can include the low latency traffic (e.g., the low latency traffic can function as the channel access message) and the STA can determine whether the channel is clear during the assigned slot, then transmit the channel access message with the low latency traffic during the assigned slot based on a determination that the channel is clear.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A wireless station (STA) device comprising:
a processor configured to:
    determine that low latency traffic for uplink to an access point (AP) on a channel has arrived, and
    generate a channel access message that causes the AP to suspend downlink transmissions and/or causes other STAs to avoid accessing the channel; and
a transceiver operably coupled to the processor, the transceiver configured to:
    transmit the channel access message during or at the end of an interframe space (IFS) after a transmission from another device, and
    transmit the low latency traffic to the AP.

2. The STA of claim 1, wherein:
the channel access message includes an indication that the STA has the low latency traffic to send, and
the transceiver is configured to transmit the low latency traffic after transmitting the channel access message.

3. The STA of claim 1, wherein:
the channel access message is a blocking message that causes the other STAs to enter a state that prevents them from contending for access to the channel, and
the transceiver is configured to transmit the low latency traffic after transmitting the blocking message.

4. The STA of claim 1, wherein:
the channel access message includes information indicating a backlog status of the low latency traffic of the STA, and
the transceiver is further configured to:
    transmit the channel access message using a frequency block that is orthogonal to other frequency blocks used by the other STAs to transmit respective channel access messages;
    receive a trigger frame from the AP in response to the channel access message; and
    transmit the low latency traffic to the AP in response to the trigger frame.

5. The STA of claim 1, wherein:
the IFS is divided into consecutive time slots,
the STA is assigned one of the slots,
the channel access message includes the low latency traffic,
the processor is further configured to determine whether the channel is clear during the assigned slot, and
the transceiver is further configured to transmit the channel access message with the low latency traffic during the assigned slot based on a determination that the channel is clear.

6. The STA of claim 5, wherein:
the transceiver is further configured to receive, from the AP, STA ordering information that indicates a sequence in which the STA and other STAs are assigned the time slots, and
the processor is further configured to determine, based on a slot assignment algorithm and the STA ordering information, which of the time slots is the one assigned to the STA during the IFS.

7. The STA of claim 6, wherein the transceiver is further configured to:
transmit, to the AP, a request to be included in the sequence, and
receive, from the AP, the STA ordering information based on a determination by the AP to include the STA in the sequence.

8. A wireless access point (AP) device comprising:
a transceiver configured to:
    receive a channel access message from a station (STA) during or at the end of an interframe space (IFS) after a transmission to the STA by the AP or another device,
    wherein the channel access message is transmitted by the STA based on arrival at the STA of low latency traffic for uplink to the AP on the channel; and
a processor operably coupled to the transceiver, the processor configured to suspend downlink transmissions based on the channel access message,
wherein the transceiver is further configured to receive the low latency traffic from the STA.

9. The AP of claim 8, wherein:
the channel access message includes an indication that the STA has the low latency traffic to send, and the low latency traffic is received after the channel access message is received.

10. The AP of claim 8, wherein:

the channel access message is a blocking message that causes other STAs to enter a state that prevents them from contending for access to the channel, and the low latency traffic is received after the blocking message is received.

11. The AP of claim 8, wherein:

the channel access message includes information indicating a backlog status of the low latency traffic of the STA, and the transceiver is further configured to:

receive the channel access message in a frequency block that is orthogonal to other frequency blocks used by other STAs to transmit respective channel access messages;

transmit a trigger frame to the STA in response to the channel access message; and receive the low latency traffic from the STA as a response to the trigger frame.

12. The AP of claim 8, wherein:

the IFS is divided into consecutive time slots, the STA is assigned one of the slots, the channel access message includes the low latency traffic, and the channel access message is received with the low latency traffic during the assigned slot based on a determination by the STA that the channel is clear.

13. The AP of claim 12, wherein:

the transceiver is further configured to transmit, to the STA, STA ordering information that indicates a sequence in which the STA and other STAs are assigned the time slots, and the STA determines, based on a slot assignment algorithm and the STA ordering information, which of the time slots is the one assigned to the STA during the IFS.

14. The AP of claim 13, wherein:

the transceiver is further configured to receive, from the STA, a request to be included in the sequence, the processor is further configured to determine to include the STA in the sequence, and the transceiver is further configured to transmit, to the STA, the STA ordering information based on the determination to include the STA in the sequence.

15. A method performed by a wireless station (STA) device, the method comprising:

determining that low latency traffic for uplink to an access point (AP) on a channel has arrived;

generating a channel access message that causes the AP to suspend downlink transmissions and/or causes other STAs to avoid accessing the channel;

transmitting the channel access message during or at the end of an interframe space (IFS) after a transmission from another device; and transmitting the low latency traffic to the AP.

16. The method of claim 15, wherein:

the channel access message includes an indication that the STA has the low latency traffic to send, and the method comprises transmitting the low latency traffic after transmitting the channel access message.

17. The method of claim 15, wherein:

the channel access message is a blocking message that causes the other STAs to enter a state that prevents them from contending for access to the channel, and the method further comprises transmitting the low latency traffic after transmitting the blocking message.

18. The method of claim 15, wherein:

the channel access message includes information indicating a backlog status of the low latency traffic of the STA, and the method further comprises:

transmitting the channel access message using a frequency block that is orthogonal to other frequency blocks used by the other STAs to transmit respective channel access messages;

receiving a trigger frame from the AP in response to the channel access message; and transmitting the low latency traffic to the AP in response to the trigger frame.

19. The method of claim 15, wherein:

the IFS is divided into consecutive time slots, the STA is assigned one of the slots, the channel access message includes the low latency traffic, and the method further comprises:

determining whether the channel is clear during the assigned slot; and transmitting the channel access message with the low latency traffic during the assigned slot based on a determination that the channel is clear.

20. The method of claim 19, further comprising:

receiving, from the AP, STA ordering information that indicates a sequence in which the STA and other STAs are assigned the time slots; and determining, based on a slot assignment algorithm and the STA ordering information, which of the time slots is the one assigned to the STA during the IFS.

* * * * *